United States Patent
Oh et al.

(10) Patent No.: US 11,095,765 B2
(45) Date of Patent: Aug. 17, 2021

(54) ELECTRONIC DEVICE AND METHOD FOR CONNECTION TO EXTERNAL DEVICE

(71) Applicant: Samsung Electronics Co., Ltd., Gyeonggi-do (KR)

(72) Inventors: Hyunah Oh, Gyeonggi-do (KR); Hyunkee Min, Gyeonggi-do (KR); Junhak Lim, Gyeonggi-do (KR); Yongseok Jang, Gyeonggi-do (KR); Hongchan Park, Gyeonggi-do (KR); Geonsoo Kim, Gyeonggi-do (KR); Sunkee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/976,849

(22) PCT Filed: Feb. 26, 2019

(86) PCT No.: PCT/KR2019/002325
§ 371 (c)(1),
(2) Date: Aug. 31, 2020

(87) PCT Pub. No.: WO2019/172565
PCT Pub. Date: Sep. 12, 2019

(65) Prior Publication Data
US 2020/0412862 A1  Dec. 31, 2020

(30) Foreign Application Priority Data
Mar. 8, 2018 (KR) .......... 10-2018-0027570

(51) Int. Cl.
*H04W 4/02* (2018.01)
*H04M 1/72412* (2021.01)
(Continued)

(52) U.S. Cl.
CPC ...... *H04M 1/72412* (2021.01); *G06F 3/0488* (2013.01); *H04W 4/80* (2018.02); *H04W 8/005* (2013.01); *H04W 76/14* (2018.02)

(58) Field of Classification Search
CPC ...................................... H04W 4/02
See application file for complete search history.

(56) References Cited

U.S. PATENT DOCUMENTS 8,789,131 B2 * 7/2014 Choi .............. G06F 3/1454
725/148
9,565,241 B2 * 2/2017 Kim .............. G06F 3/1454
(Continued)

FOREIGN PATENT DOCUMENTS

KR  10-1575991 B1  12/2015
KR  10-1709715 B1  2/2017
(Continued)

*Primary Examiner* — Cindy Trandai
(74) *Attorney, Agent, or Firm* — Cha & Reiter, LLC.

(57) ABSTRACT

An electronic device according to various embodiments may comprise: at least one wireless communication circuit; a touch screen display; a processor operatively connected to the at least one wireless communication circuit and the touch screen display; and a memory operatively connected to the processor, wherein the memory stores instructions that, when executed, cause the processor to: receive first information on a first external electronic device and a second external electronic device through the at least one wireless communication circuit; determine a location and/or a direction of the first external electronic device and a location and/or a direction of the second external electronic device at least partly on the basis of a signal acquired through the at least one wireless communication circuit and/or second information received through the at least one wireless communication circuit; provide the touch screen display with a graphical user interface (GUI) indicating the first external electronic device and the second external electronic device, (Continued)

at least partly on the basis of the determined location and/or the determined direction; receive, through the touch screen display, a gesture input for selection of the first external electronic device and the second external electronic device; and transmit, through the wireless communication circuit, third information related to an operation of using the first external electronic device and the second external electronic device. Various embodiments are possible.

15 Claims, 48 Drawing Sheets

(51) Int. Cl.
*H04W 76/14* (2018.01)
*H04W 4/80* (2018.01)
*G06F 3/0488* (2013.01)
*H04W 8/00* (2009.01)

(56) References Cited

U.S. PATENT DOCUMENTS

| | | | | |
|---|---|---|---|---|
| 10,432,893 B2* | 10/2019 | Nace | | H04M 3/567 |
| 2008/0311957 A1* | 12/2008 | Jantunen | | H04W 8/005 |
| | | | | 455/560 |
| 2015/0296553 A1* | 10/2015 | DiFranco | | H04W 76/14 |
| | | | | 455/41.2 |
| 2015/0347114 A1* | 12/2015 | Yoon | | H04L 12/2832 |
| | | | | 235/375 |
| 2016/0007152 A1* | 1/2016 | Johnsson | | H04W 72/0473 |
| | | | | 370/329 |
| 2016/0142703 A1* | 5/2016 | Park | | G09G 3/001 |
| | | | | 348/39 |
| 2016/0150357 A1* | 5/2016 | Jung | | H04W 4/80 |
| | | | | 455/41.1 |
| 2016/0165397 A1* | 6/2016 | Yang | | G01S 13/765 |
| | | | | 455/456.5 |
| 2016/0196042 A1* | 7/2016 | Laute | | G06F 3/0304 |
| | | | | 715/845 |
| 2017/0134553 A1 | 5/2017 | Jeon et al. | | |
| 2017/0135061 A1* | 5/2017 | Park | | H04W 4/02 |
| 2017/0142681 A1* | 5/2017 | Chen | | H04B 17/318 |
| 2017/0180489 A1 | 6/2017 | Oh et al. | | |
| 2017/0185281 A1* | 6/2017 | Park | | G06F 3/0482 |
| 2017/0230461 A1 | 8/2017 | Verma et al. | | |
| 2018/0054796 A1 | 2/2018 | Edge | | |
| 2019/0200275 A1* | 6/2019 | Blair, II | | H04W 4/02 |
| 2019/0208395 A1* | 7/2019 | Chau | | H04W 64/00 |
| 2020/0035248 A1* | 1/2020 | Torfs | | G06F 21/32 |

FOREIGN PATENT DOCUMENTS

| | | |
|---|---|---|
| KR | 10-2017-0055295 A | 5/2017 |
| KR | 10-2017-0074732 A | 6/2017 |
| KR | 10-2017-0121891 A | 11/2017 |

* cited by examiner

ELECTRONIC DEVICE AND METHOD FOR CONNECTION TO EXTERNAL DEVICE

CROSS REFERENCE TO RELATED APPLICATIONS

This application is a National Phase Entry of PCT International Application No. PCT/KR2019/002325, which was filed on Feb. 26, 2019, and claims a priority to Korean Patent Application No. 10-2018-0027570, which was filed on Mar. 8, 2018, the contents of which are incorporated herein by reference.

TECHNICAL FIELD

Various embodiments relate to an electronic device for performing connection to an external device, and an operation method thereof.

BACKGROUND ART

Recently, with the development of the semiconductor technology and wireless communication technology, a network is established while communication functions are included in various objects, and thus the objects may be conveniently controlled. Connecting, to a network, objects including communication functions is referred to as Internet-of-Things (IoT), which is widely used in daily life. IoT devices may communicate with each other via wireless communication and may operate in line with each other.

DISCLOSURE OF INVENTION

Technical Problem

In a situation where multiple IoT devices should be connected, a user may experience inconvenience because the user should connect multiple IoT devices via different screens (for example: applications or menus) from each other. Accordingly, a solution for simultaneously performing connection by displaying objects indicating IoT devices on one screen may be required.

The technical subjects pursued in the disclosure may not be limited to the above-mentioned technical subjects, and other technical subjects which are not mentioned may be clearly understood, through the following descriptions, by those skilled in the art to which the disclosure pertains.

Solution to Problem

An electronic device according to various embodiments may include: at least one wireless communication circuit; a touch screen display; a processor operatively connected to the at least one wireless communication circuit and the touch screen display; and a memory operatively connected to the processor, wherein the memory stores instructions that, when executed, cause the processor to: receive first information on a first external electronic device and a second external electronic device through the at least one wireless communication circuit; determine, at least partly based on a signal acquired through the at least one wireless communication circuit and/or second information received through the at least one wireless communication circuit, a location and/or a direction of the first external electronic device and a location and/or a direction of the second external electronic device; provide, at least partly based on the determined location and/or the determined direction, the touch screen display with a graphical user interface (GUI) indicating the first external electronic device and the second external electronic device; receive, through the touch screen display, a gesture input for selection of the first external electronic device and the second external electronic device; and transmit, through the wireless communication circuit, third information related to an operation of using the first external electronic device and the second external electronic device.

An electronic device according to various embodiments may include: a display; a communication module; and a processor functionally connected to the display and the communication module, wherein the processor is configured to: receive, from an access point, first data for indicating a location relation between each of a plurality of external electronic devices related to the access point and the access point; acquire, at least based on the first data, second data for indicating a location relation of the electronic device and each of the plurality of external electronic devices; display, within a user interface of an application for connecting at least one external electronic device among the plurality of external electronic devices and the electronic device, a plurality of objects indicating the plurality of external electronic devices and arranged based on the second data; detect an input for at least one object among the plurality of objects; and transmit, to at least one external electronic device indicated by the at least one object among the plurality of external electronic devices, a signal for connection.

A method of an electronic device according to various embodiments may include: receiving first information on a first external electronic device and a second external electronic device through at least one wireless communication circuit of the electronic device; determining, at least partly based on a signal acquired through the at least one wireless communication circuit and/or second information received through the at least one wireless communication circuit, a location and/or a direction of the first external electronic device and a location and/or a direction of the second external electronic device; providing, at least partly based on the determined location and/or the determined direction, the touch screen display with a graphical user interface (GUI) indicating the first external electronic device and the second external electronic device; receiving, through the touch screen display, a gesture input for selection of the first external electronic device and the second external electronic device; and transmitting, through the at least one wireless communication circuit, third information related to an operation of using the first external electronic device and the second external electronic device.

Advantageous Effects of Invention

In accordance with an electronic device and an operation method thereof according to various embodiments, the electronic device may provide a user interface for connecting at least one external electronic device by identifying, based on at least one signal received from an access point, a location of the at least one external electronic device.

Effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

Figure 1:
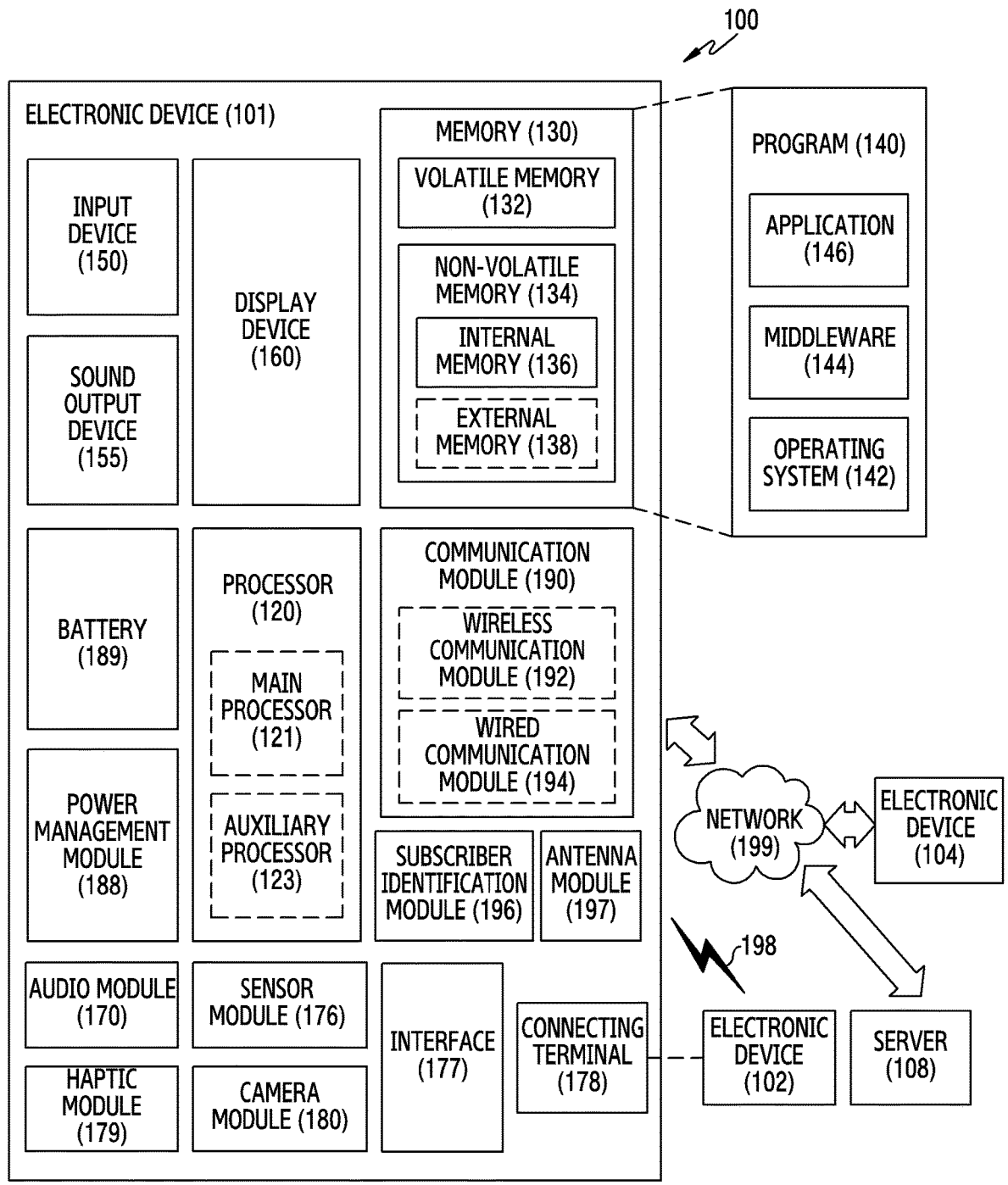
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related therereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
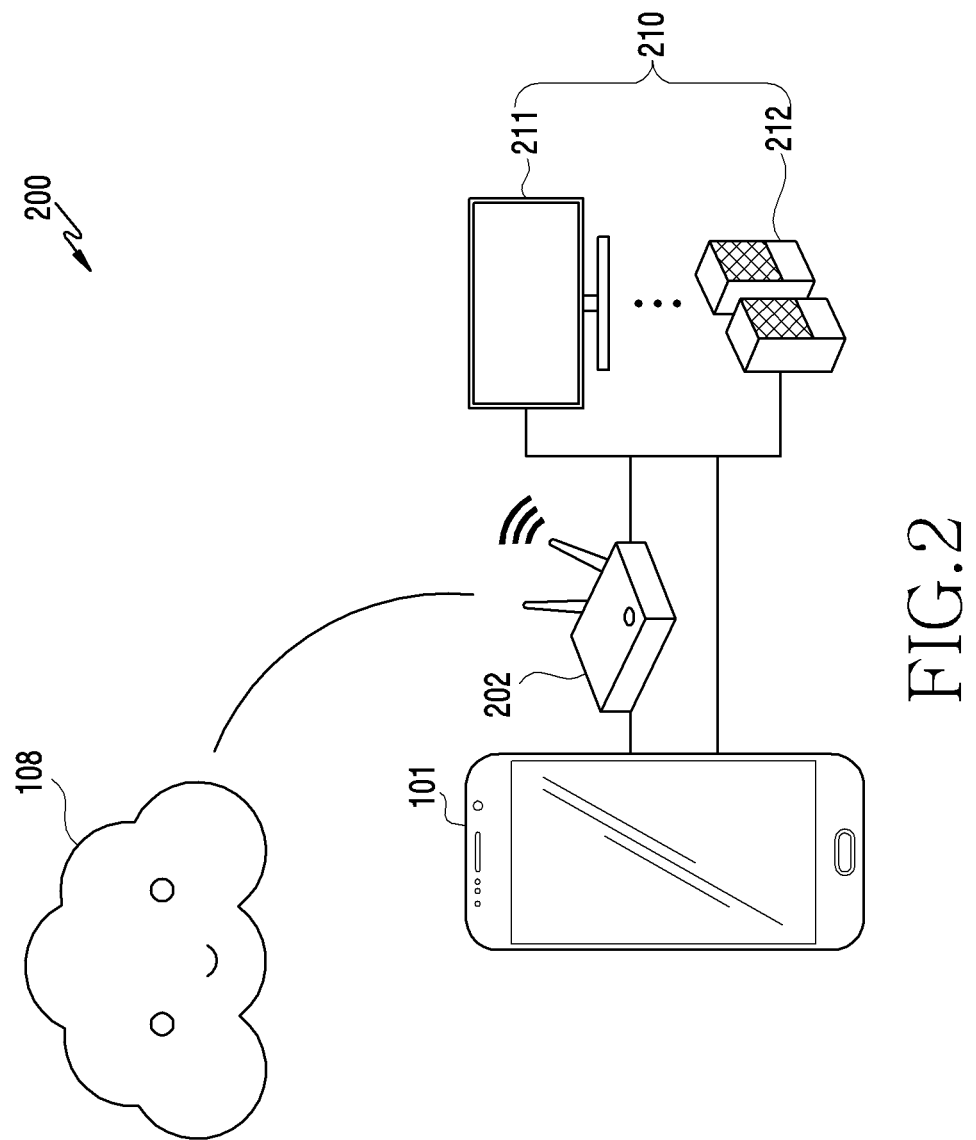
FIG. 2 illustrates an example of a system according to various embodiments.

FIG. 2 illustrates an example of a system 200 according to various embodiments.

Referring to FIG. 2, a system 200 may include, for example, an electronic device 101, an access point 202 (for example: an electronic device 102 of FIG. 1), a plurality of external electronic devices 210 (for example: an electronic device 102 or an electronic device 104 of FIG. 1), or a server 108 (for example: a cloud server). The plurality of external electronic devices 210 may include a first external electronic device 211 and a second external electronic device 212.

An electronic device 101 may be connected to an access point 202, a server 108, or a plurality of external electronic devices 210 via wireless communication or wired communication. In addition, an electronic device 101, an access point 202, a server 108, and a plurality of external electronic devices 210, which constitute a system 200, may be connected to each other via wireless communication or wired communication, respectively. In various embodiments, an electronic device 101 may be connected to a plurality of external electronic devices 210 via wireless communication or wired communication through an access point 202. Moreover, an electronic device 101 may be connected to a plurality of external electronic devices 210 via direct wireless communication or wired communication. For example, an electronic device 101 may be connected to a plurality of external electronic devices 210 via a wireless fidelity (Wi-Fi) direct technique through an access point 202. For another example, an electronic device 101 may be connected to a plurality of external electronic devices 210 via a Bluetooth technique.

In various embodiments, an electronic device 101 may provide a service via an application (or an application program) stored in the electronic device 101. For example, an electronic device 101 may control an operation of an access point 202 or a plurality of external electronic devices 210 by using the application. An electronic device 101 may receive a user input for controlling an operation of an access point 202 or a plurality of external electronic devices 210 through an application stored in the electronic device 101. The user input may be received through, for example, a physical button, a touch pad, or a microphone of the electronic device 101. The electronic device 101 may detect an input for connecting a plurality of external electronic devices 210. In various embodiments, an electronic device 101 may include a cell phone, a smart phone, a personal digital assistant (PDA), a notebook computer, a computer, or an electronic device capable of performing wireless communication.

In various embodiments, an access point 202 may acquire information on a location relation of a plurality of external electronic devices 210. An access point 202 may transmit acquired information for indicating a location relation of a plurality of external electronic devices 210 to an electronic device 101. In various embodiments, an access point 202 may include a portable terminal, a notebook computer, a computer, or a router.

In various embodiments, a plurality of external electronic devices 210 may include an electronic device registered in an electronic device 101. In various embodiments, a plurality of external electronic devices 210 may include an electronic device which is not registered in an electronic device 101. A plurality of external electronic devices 210 may receive a signal for controlling each of the plurality of external electronic devices 210 from an electronic device 101 or an access point 202. For example, a plurality of external electronic devices 210 receives a signal for controlling each of the plurality of external electronic devices 210, and based thereon, a driving mode of each of the plurality of external electronic devices 210 may be changed. The driving mode may include an operation (for example: an image output or a sound output) state of each of a plurality of external electronic devices 210. In various embodiments, a plurality of external electronic devices 210 may include various IoT devices such as a cell phone, a notebook computer, a computer, an IoT bulb, or a refrigerator.

In various embodiments, a server 108 may receive information on a location relation of a plurality of external electronic devices 210 from an electronic device 101 and store the received information. A server 108 may receive information on an input for connecting a plurality of external electronic devices 210 from an electronic device 101 and store the received information. A server 108 may receive account information of an electronic device 101 and information on a plurality of external electronic devices 210 registered in an electronic device 101 and store the received information.

In various embodiments, a server 108 may receive information on a location relation of a plurality of external electronic devices 210 from an access point 202 and store the received information. A server 108 may receive information on an input for connecting a plurality of external electronic devices 210 from an access point 202 and store the received information. A server 108 may receive account information of an access point 202 and information on a plurality of external electronic devices 210 registered in the access point 202 and store the received information.

Figure 3:
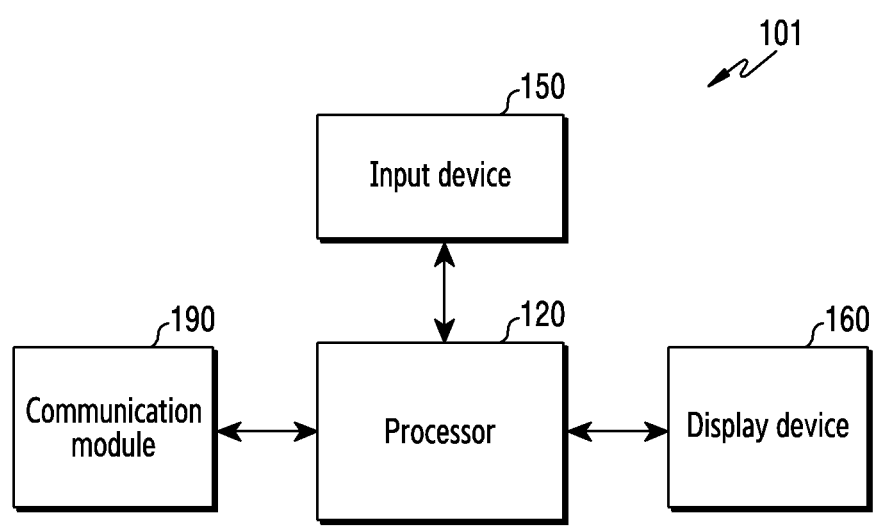
FIG. 3 illustrates an example of functional composition of an electronic device, according to various embodiments.

FIG. 3 illustrates an example of functional composition of an electronic device 101, according to various embodiments. At least a part of the functional composition illustrated in FIG. 3 may be included in an electronic device 101 illustrated in FIG. 1.

Referring to FIG. 3, an electronic device 101 may include a processor 120, an input device 150, a display device 160, and a communication module 190, and the processor 120, the input device 150, the display device 160, and the communication module 190 may be operatively connected to each other. However, an electronic device 101 is not limited thereto, and partial elements may be omitted.

A processor 120 may control, for example, an overall operation of an electronic device 101. A processor 120 may be operatively coupled to other elements, such as an input device 150, a display device 160, and a communication module 190, in an electronic device 101 to control an overall operation of the electronic device 101. A processor 120 may receive commands of other elements (for example: an input device 150, a display device 160, and a communication module 190). A processor 120 may interpret a received command. A processor 120 may perform calculation according to an interpreted command, and may process data. A processor 120 may be implemented in software, may be implemented in hardware such as a chip or a circuitry, or may be implemented in an assembly of software and hardware. A processor 120 may be one or an assembly of a plurality of processors.

A processor 120 may interpret a message, data, an instruction, or a signal received from an input device 150, a display device 160, or a communication module 190. A processor 120 may process a message, data, an instruction, or a signal received from an input device 150, a display device 160, or a communication module 190. A processor 120 may produce, based on a message, data, an instruction, or a signal which has been received, a message, data, an instruction, or a signal which is new. A processor 120 may provide, to an input device 150, a display device 160, or a communication module 190, a message, data, an instruction, or a signal which has been processed or produced.

An input device 150 may receive a touch signal or an audio signal produced by a user related to an electronic device 101. An input device 150 may convert the received signal into an electrical signal. An input device 150 may provide the converted electrical signal to a processor 120.

A display device 160 may be used to provide information to a user. For example, a display device 160 may include one or more among a speaker, a display for providing information to a user through a graphical user interface (GUI), or an indicator module (for example: a light emitting diode (LED) module) for providing information to a user through light. Based on information, data, or a signal provided from a processor 120, a display device 160 may provide information.

A communication module 190 may be used to produce (generate) or establish a communication path between various electronic devices (for example: an access point 202, a plurality of external electronic devices 210, and a server 108) and an electronic device 101 (for example: a communication path between an electronic device 101 and an access point 202 (for example: an electronic device 102), a communication path between an electronic device 101 and a plurality of external electronic devices 210, or a communication path between an electronic device 101 and a server 108). For example, a communication module 190 may be a module for at least one among a Bluetooth communication technique, a Bluetooth low energy (BLE) communication technique, a wireless fidelity (Wi-Fi) communication technique, a cellular (or mobile) communication technique, or wired communication technique. A communication module 190 may provide, to a processor 120, a signal, information, data, or a message received from the various electronic devices. A communication module 190 may transmit, to the various electronic devices, a signal, information, data, or a message provided from a processor 120.

A processor 120 may receive first data related to a location relation of a plurality of external electronic devices 210 through a communication module 190. For example, a processor 120 may transmit, to an access point 202 through a communication module 190, a signal for requesting first data related to a location relation of a plurality of external electronic devices 210. A processor 120 may receive information on a location relation of a plurality of external electronic devices 210 from an access point 202 in response to the request.

A processor 120 may acquire, from a communication module 190, second data produced based on first data related to a location relation of a plurality of external electronic devices 210. The second data may include data related to a location relation of a plurality of external electronic devices 210 with reference to at least one external electronic device located in an area corresponding to a direction which a first point of an electronic device 101 faces. At least one external electronic device located in an area corresponding to a direction which a first point of an electronic device 101 faces will be described later in FIG. 19. For example, a processor 120 may identify at least one external electronic device located in an area corresponding to a direction which a first point of an electronic device 101 faces. Based on first data received from a communication module 190, a processor 120 may acquire second data related to a location relation of a plurality of external electronic devices 210 with reference to at least one external electronic device located in an area corresponding to a direction which a first point of an electronic device 101 faces.

Based on second data, a processor 120 may display, through a display device 160 in a user interface, a plurality of objects indicating a plurality of external electronic devices 210. For example, based on a distance or a direction between an electronic device 101 and a plurality of external electronic devices 210, a processor 120 may display, through a display device 160, a plurality of objects indicating a plurality of external electronic devices 210. For example, a plurality of objects may be indicated by the names of a plurality of external electronic devices 210, respectively, or a plurality of objects may be indicated by shapes corresponding to a plurality of external electronic devices 210, respectively.

A processor 120 may detect an input for at least one object among a plurality of objects through an input device 150. The input may include a drag input, a voice command input, a tap input, a double tap input, or a long press.

A processor 120 may transmit, through a communication module 190 to at least one external electronic device indicated by an at least one input object, a signal for connection. For example, based on detecting an input for selecting an object indicating a speaker and an object indicating a computer from among a plurality of objects, a processor 120 may transmit, to each of the speaker or the computer through the communication module 190, a signal for allowing the speaker and the computer to interwork.

Figure 4:
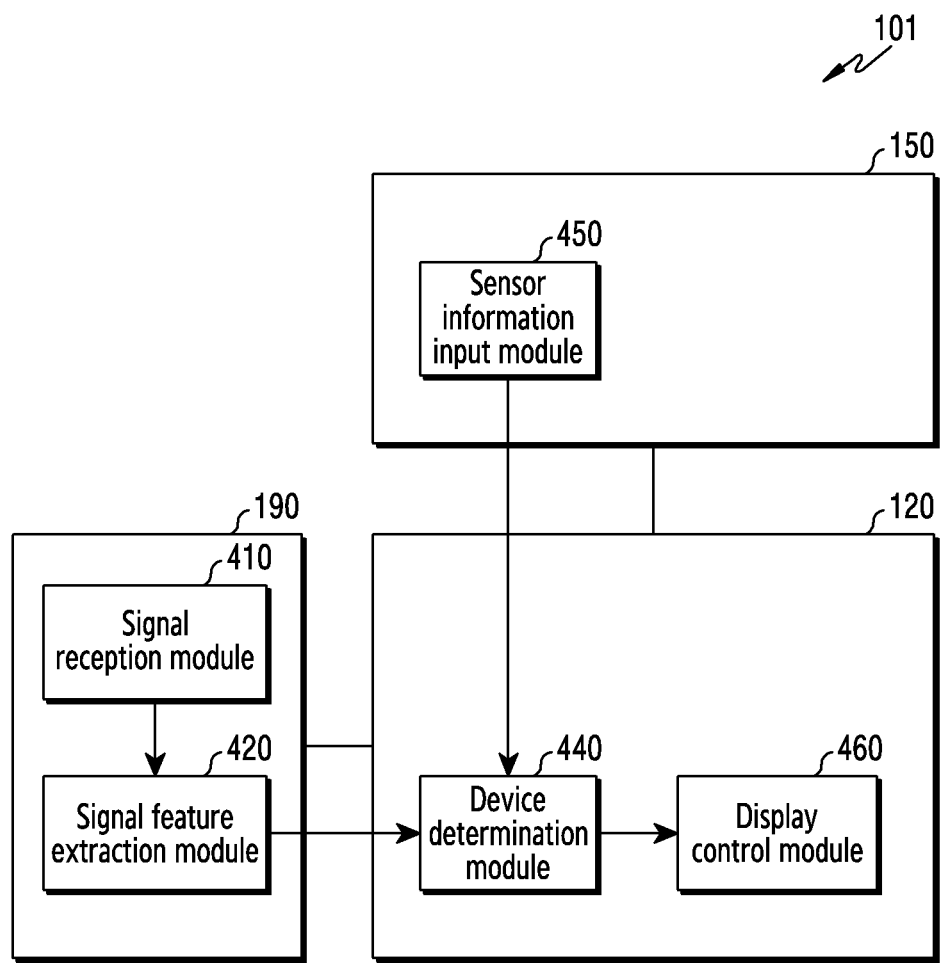
FIG. 4 illustrates another example of functional composition of an electronic device, according to various embodiments.

FIG. 4 illustrates another example of functional composition of an electronic device, according to various embodiments. At least a part of the functional composition illustrated in FIG. 4 may be included in an electronic device 101 illustrated in FIG. 1.

Referring to FIG. 4, a communication module 190 may include a signal reception module 410 and a signal feature extraction module 420. An input device 150 may include a sensor information input module 450. A processor 120 may include a device determination module 440 and a display control module 460. An electronic device 101 may not be limited to the composition of FIG. 4. According to an embodiment, a processor 120 may include a signal reception module 410 or a signal feature extraction module 420 according to the type of an electronic device 101.

In various embodiments, a signal reception module 410 may receive one or more signals received to each of antennas through two or more wireless communication antennas. For example, a signal reception module 410 may distinguish signals of different devices, input to antennas, respectively. According to an embodiment, a signal reception module 410 may analyze a signal received from an antenna to determine signal presence or absence. When a received signal is determined as a signal for communication, a signal reception module 410 may transmit the signal to a signal feature extraction module 420 to request interpretation of the transmitted signal.

In various embodiments, a signal feature extraction module 420 may acquire, based on the received signal, phase information of the signal. A signal feature extraction module 420 may extract information on the unique characteristics of signals received from a first antenna and a second antenna and transmit the information together with the phase information to a device determination module 440. The information on the unique characteristics of the received signal may include information indicating the characteristics of signals received from a first antenna and signals received from a second antenna. For example, the information indicating the characteristics of the received signals may include information such as information related to a signal strength pattern between antennas, received signal strength indication (RSSI), a signal to noise ratio (SNR), or a communication channel. At least based on the information including the phase information, a signal feature extraction module 420 may acquire information such as whether an antenna of another device is in a line of sight (LoS) or whether a received signal is a multipath signal. According to an embodiment, a signal feature extraction module 420 may calculate a phase difference value for one signal and a deviation value of a plurality of phase difference values and transmit the calculated values to a device determination module 440. According to an embodiment, a signal feature extraction module 420 may calculate the phase of each of one or more signals respectively received from different devices. A signal feature extraction module 420 may transmit, to a device determination module 440 through individual paths, signals of different devices, input to antennas, respectively.

A sensor information input module 450 may receive input information from an acceleration sensor, a gravity sensor, or a magnetic sensor of an electronic device 101. Based on the input information, a sensor information input module 450 may identify location and state information of an electronic device 101. A sensor information input module 450 may transmit location and state information of an electronic device 101 to a device determination module 440.

Based on pieces of information received from a signal feature extraction module (420), a device determination module 440 may identify at least one external electronic device located in an area corresponding to a direction which a first point (for example: an antenna location or the upper end of an electronic device) of an electronic device 101 faces. At least one external electronic device located in an area corresponding to a direction which a first point of an electronic device 101 faces will be described later in FIG. 19. At least based on signal unique characteristic information and phase information provided from a signal feature extraction module 420 or information provided from a sensor information input module 450, a device determination module 440 may acquire weighted phase difference information. A device determination module 440 may identify, by using acquired weighted phase difference information, at least one external electronic device located in an area corresponding to a direction which a first point of an electronic device 101 faces.

In various embodiments, a device determination module 440 may receive information on functions (for example: a screen display function and a data storage function) of external electronic devices (for example: a first external electronic device 211 and a second external electronic device 212) connected to a server 108 or an access point 202. Based on the received information, a device determination module 440 may identify the type of an external electronic device (for example: a speaker, a television (TV), a computer, or a projector). An input device 150 may detect an input to a driving mode of a plurality of external electronic devices 210. A device determination module 440 may receive an input to the driving mode from an input device 150. Based on context information, a device determination module 440 may determine external electronic devices to be displayed on a screen. The context information may correspond to information on an internal state and an external state of an electronic device 101. The context information may include an input to the driving mode, information on a function of an electronic device 101, a global positioning system (GPS), a cell signal of a base station, location information of the electronic device 101, an application identification (ID), the type of a called function, or a keyword input with a voice command. For example, in case that a display control module 460 indicates, based on a cell signal of a GPS or a base station or location information of an electronic device 101, the electronic device 101 may differently configure objects indicating external electronic devices 210 to be displayed according to a location of the electronic device 101. For example, in case that an electronic device 101 is located outdoors, the electronic device 101 may not display an object indicating an indoor earphone on a screen of the electronic device 101. For another example, an electronic device 101 may display an object indicating an indoor earphone even in case that the electronic device 101 is outdoors.

According to an embodiment, an electronic device 101 may receive an input to a driving mode from an input device 150 via a voice input. For example, the input to a driving mode via a voice input may correspond to an input related to music playback. Based on the input related to music playback, an electronic device 101 may not display an object indicating a refrigerator. For another example, an electronic device 101 may display a refrigerator even in case that an input related to music playback is received from a voice input.

In various embodiments, based on an input to a driving mode and information on functions of external electronic devices, a device determination module 440 may determine the external electronic devices to be displayed as objects on a screen. A device determination module 440 may produce a list of external electronic devices to be displayed on the screen. A device determination module 440 may transmit, to a display control module 460, a list of external electronic devices to be displayed on the screen.

In a device determination module 440, for example, in case that an electronic device 101 receives an input for configuring driving modes of a plurality of external electronic devices 210 as file sharing, the electronic device 101 may produce a list of external electronic devices (for example: a first external electronic device 211 and a second external electronic device 212) capable of performing operations related to file sharing.

In various embodiments, based on a driving mode of an external electronic device, a device determination module 440 may add, to a list, an external electronic device controllable by an electronic device 101 by using an account registered in the electronic device 101 and external electronic devices registered in the electronic device 101. In case that it is identified that an external electronic device is capable of performing an operation for a driving mode of a current external electronic device although the external electronic device has not been previously registered or has no usage history, a device determination module 440 may add, to the list, an external electronic device which has no usage history or is capable of performing an operation for a driving mode of a current external electronic device.

In various embodiments, a device determination module 440 may identify an object indicating an external electronic device to be displayed on a screen, according to a driving mode of an external electronic device (for example: a first external electronic device 211 or a second external electronic device 212). A device determination module 440 may transmit the object to a display control module 460. A device determination module 440 may identify an external electronic device which is not connected to an electronic device 101 but is capable of performing an operation for the driving mode. A device determination module 440 may transmit information on an identified external electronic device to a display control module 460.

A display control module 460 may receive first data for indicating a location relation between each of a plurality of external electronic devices 210 received from an access point 202 and the access point 202. The first data may include at least one piece of information on a distance or a direction of an access point 202 and an external electronic device. Based on the first data, a display control module 460 may acquire, from a device determination module 440, second data for indicating a location relation of a plurality of external electronic devices 210 with reference to at least one external electronic device located in an area corresponding to a direction which a first point of an electronic device 101 faces. The second data may include information on a location relation of external electronic devices with reference to at least one external electronic device located in an area corresponding to a direction which a first point of an electronic device 101 faces. A display control module 460 may indicate a plurality of external electronic devices 210 as a plurality of objects, converted based on the size of a display of an electronic device 101. In addition, based on an input to at least one object among the plurality of objects, a display control module 460 may perform connection of an external electronic device, indicated by the at least one object. A display control module 460 may transmit a control signal for connection of an external electronic device, indicated by the at least one object.

In various embodiments, a display control module 460 may receive information on a distance or a direction of each of a plurality of external electronic devices 210 with reference to an access point 202. An electronic device 101 may identify, through a device determination module 440, at least one external electronic device located in an area corresponding to a direction which a first point of the electronic device 101 faces. Based on the information, a display control module 460 may acquire information on a location relation of a plurality of external electronic devices 210 changed with reference to at least one external electronic device located in an area corresponding to a direction which a first point of an electronic device 101 faces.

For example, based on received distance or direction information, a display control module 460 may acquire information on arrangement of an external electronic device rotated with reference to at least one external electronic device located in an area corresponding to a direction which a first point of an electronic device 101 faces. A display control module 460 may display, on a screen, objects indicating a plurality of external electronic devices 210 received from a device determination module 440.

In various embodiments, a display control module 460 may receive, from a device determination module 440, a signal that there is an external electronic device to be additionally displayed among devices which are not currently connected to an electronic device 101. An electronic device 101 may transmit, based on the received signal, a signal for requesting, in the form of a snapshot, information on an external electronic device to be additionally displayed on a server 108. The snapshot may include information on an external electronic device having a record connected to an electronic device 101 or a registered record. A display control module 460 may receive information on a snapshot including an external electronic device to be additionally displayed from a server 108. Based on received information on a snapshot, a display control module 460 may additionally display, on a screen, an object indicating an external electronic device to be displayed.

Figure 5:
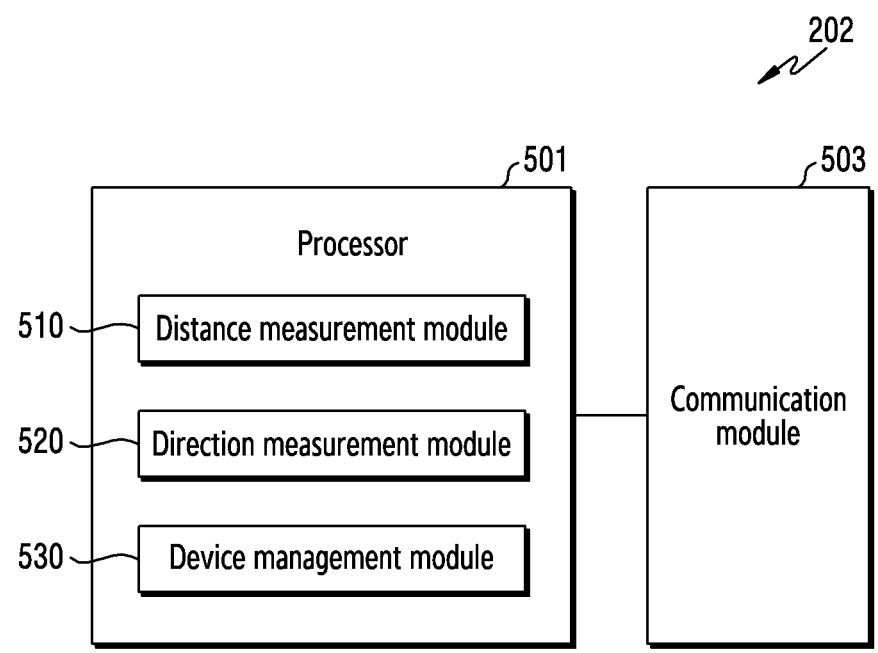
FIG. 5 illustrates an example of functional composition of an access point, according to various embodiments.

FIG. 5 illustrates an example of functional composition of an access point 202, according to various embodiments. At least a part of the functional composition illustrated in FIG. 5 may correspond to an electronic device 102 illustrated in FIG. 1.

Referring to FIG. 5, an access point 202 may include a smartphone or a wearable device worn on at least a part of a user's body. However, an access point 202 is not limited thereto.

In various embodiments, an access point 202 may include a processor 501 (for example: a processor 120 of FIG. 1) and a communication module 503 (for example: a communication module 190 of FIG. 1), and the processor 501 and the communication module 503 may be operatively connected. A processor 501 may include a distance measurement module 510, a direction measurement module 520, and a device management module 530.

A distance measurement module 510 may acquire information on a distance between an access point 202 and each of a plurality of external electronic devices 210. For example, a distance measurement module 510 may receive a plurality of signals for measuring a distance between an access point 202 and a first external electronic device 211 from the first external electronic device 211 through a communication module 503. A distance measurement module 510 may calculate a time difference between the plurality of received signals. At least based on information on the calculated time difference, a distance measurement module 510 may acquire information on a distance between an access point 202 and a first external electronic device 211. For example, a distance measurement module 510 may use a fine timing measurement (FTM) scheme. An FTM scheme will be described later in FIG. 8.

A direction measurement module 520 may measure a direction of each of a plurality of external electronic devices with reference to an access point 202. A direction measurement module 520 may measure directions of a plurality of external electronic devices 210 with reference to an access point 202. In various embodiments, a direction measurement module 520 may correspond to a signal feature extraction module 420 of an electronic device 101 of FIG. 4.

A communication module 503 may transmit or receive a signal related to control of a plurality of external electronic devices 210. A communication module 503 may include a plurality of antennas. In various embodiments, a communication module 503 may be connected to a plurality of antennas to measure directions of a plurality of external electronic devices 210. A communication module 503 may receive each of signals received through a plurality of antennas. A communication module 503 may transmit received signals to a distance measurement module 510 or a direction measurement module 520.

In various embodiments, although not illustrated in FIG. 5, an access point 202 may include a plurality of microphones. An access point 202 may use a plurality of microphones to measure a direction of an electronic device 101 and directions of a plurality of external electronic devices 210 from the access point 202. For example, in case that an electronic device 101 receives a voice input from a user related to an electronic device 101, a communication module 503 of an access point 202 may receive the voice input through a plurality of microphones. An access point 202 may acquire information on a location of an electronic device 101 through the voice input.

A device management module 530 may manage a list of a plurality of external electronic devices 210 and an electronic device 101 connected to an access point 202. A device management module 530 may transmit control signals to an electronic device 101 and a plurality of external electronic devices 210. A device management module 530 may periodically acquire information on each of location relations between an electronic device 101, a plurality of external electronic devices 210, and an access point 202. A device management module 530 may periodically upload the acquired information on a location relation to a server 108. Even in case that there is no request from an electronic device 101, a device management module 530 may periodically upload, to a server 108, information on each of location relations between an electronic device 101, a plurality of external electronic devices 210, and an access point 202. However, a device management module 530 is not limited thereto.

A device management module 530 may receive information on a snapshot indicating information on a connection and location relation of a plurality of external electronic devices 210 from a server 108. A device management module 530 may transmit the received information on a snapshot to an electronic device 101. A device management module 530 may receive a control signal from an electronic device 101 and a plurality of external electronic devices 210. A device management module 530 may transmit a received control signal to an electronic device 101 and a plurality of external electronic devices 210. A device management module 530 may update and manage version information on a plurality of external electronic devices that are currently registered. A device management module 530 may update and manage information on the rights of an electronic device 101 and an access point 202. A device management module 530 may serve as a central manager for an electronic device 101 and a plurality of external electronic devices 210.

Figure 6:
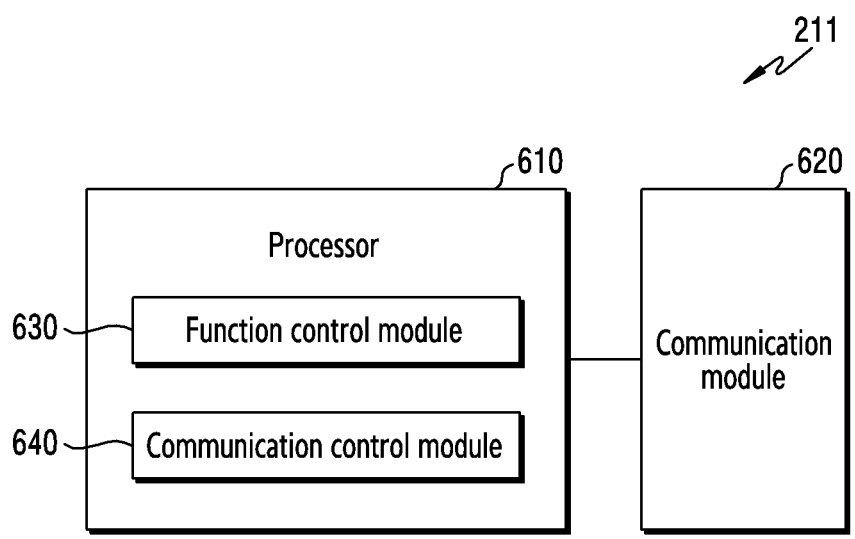
FIG. 6 illustrates an example of functional composition of a first external electronic device, according to various embodiments.

FIG. 6 illustrates an example of functional composition of a first external electronic device (211), according to various embodiments. At least a part of the functional composition illustrated in FIG. 6 may be included in a first external electronic device 211 illustrated in FIG. 2. A first external electronic device 211 may be one among a plurality of external electronic devices 210.

Referring to FIG. 6, a first external electronic device 211 may include a processor 610 (for example: a processor 120) and a communication module 620 (for example: a communication module 190), and the processor 610 and the communication module 620 may be operatively connected. A processor 610 may include a function control module 630 and a communication control module 640.

In various embodiments, a communication module 620 may transmit or receive a wireless (radio frequency, RF) signal required to perform a function of a first external electronic device 211. A communication module 620 may be functionally (operably) coupled to one or a plurality of antennas. A communication module 620 may transmit or receive a discovery signal. The discovery signal is a broadcast signal transmitted to notify the existence of a first external electronic device 211, and may be transmitted or broadcast externally through a communication module 620. The discovery signal is a signal indicating the existence of another device (for example: an electronic device 101 or an access point 202), and may be received to a first external electronic device 211 through a communication module 620.

A communication module 620 may identify an electronic device 101, an access point 202, or at least another external electronic device through the discovery signal.

A communication module 620 may transmit a packet and a control signal for distance measurement or direction measurement. In various embodiments, the packet and the control signal may be transmitted simultaneously or may be transmitted independently. In addition, a communication module 620 may also receive a packet and a control signal for distance measurement or direction measurement. In various embodiments, the packet and the control signal may be received simultaneously or may be received independently.

In various embodiments, even in case that a processor 610 of a first external electronic device 211 is in a deactivated state, a communication module 620 may operate independently. For example, even in case that at least partial elements of a first external electronic device 211 (for example: a processor 610) do not acquire power or are in an inactive (for example: sleep) state, a communication module 620 may operate.

A communication control module 640 may process various control signals. A communication control module 640 may process a signal related to information exchange with another external electronic device. In addition, a communication control module 640 may process a discovery signal received through a communication module 620.

In various embodiments, a communication control module 640 may process, based on a signal received from a communication module 620, information on distance and direction measurement. In case that a fine timing measurement (FTM) request signal is received, a communication control module 640 may transmit an acknowledgment signal (ACK signal) through a communication module 620. A communication control module 640 may transmit, to an electronic device 101 or an access point 202, information on a difference between a timing at which an FTM request signal is received and a timing at which an acknowledgment signal is transmitted.

In various embodiments, in case that a signal related to direction measurement is received from an access point 202, a communication control module 640 may periodically transmit a discovery signal including own identification information thereof.

In various embodiments, a function control module 630 may receive control signals for various driving modes from a communication control module 640. Based on the control signals for various driving modes, a function control module 630 may change a driving mode of a first external electronic device 211 to another driving mode.

In various embodiments, in case that a communication control module 640 receives a control signal for an image output, a communication control module 640 may transmit the signal to a function control module 630 to perform the image output.

In various embodiments, in case that a control signal related to a file reception request is received, a function control module 630 may be connected in a communication band suitable for file reception. For example, in case of receiving a control signal for a request for file reception via Bluetooth from an electronic device 101, a function control module may establish connection to an electronic device 101 via a frequency band (for example: 2.40 Ghz to 2.48 Ghz) corresponding to a communication band for Bluetooth communication. A function control module 630 may transmit, to communication control module 640, a command related to switching for communication in the suitable communication band. A function control module 630 may receive a file through the connection. A function control module 630 may store a received file.

Figure 7:
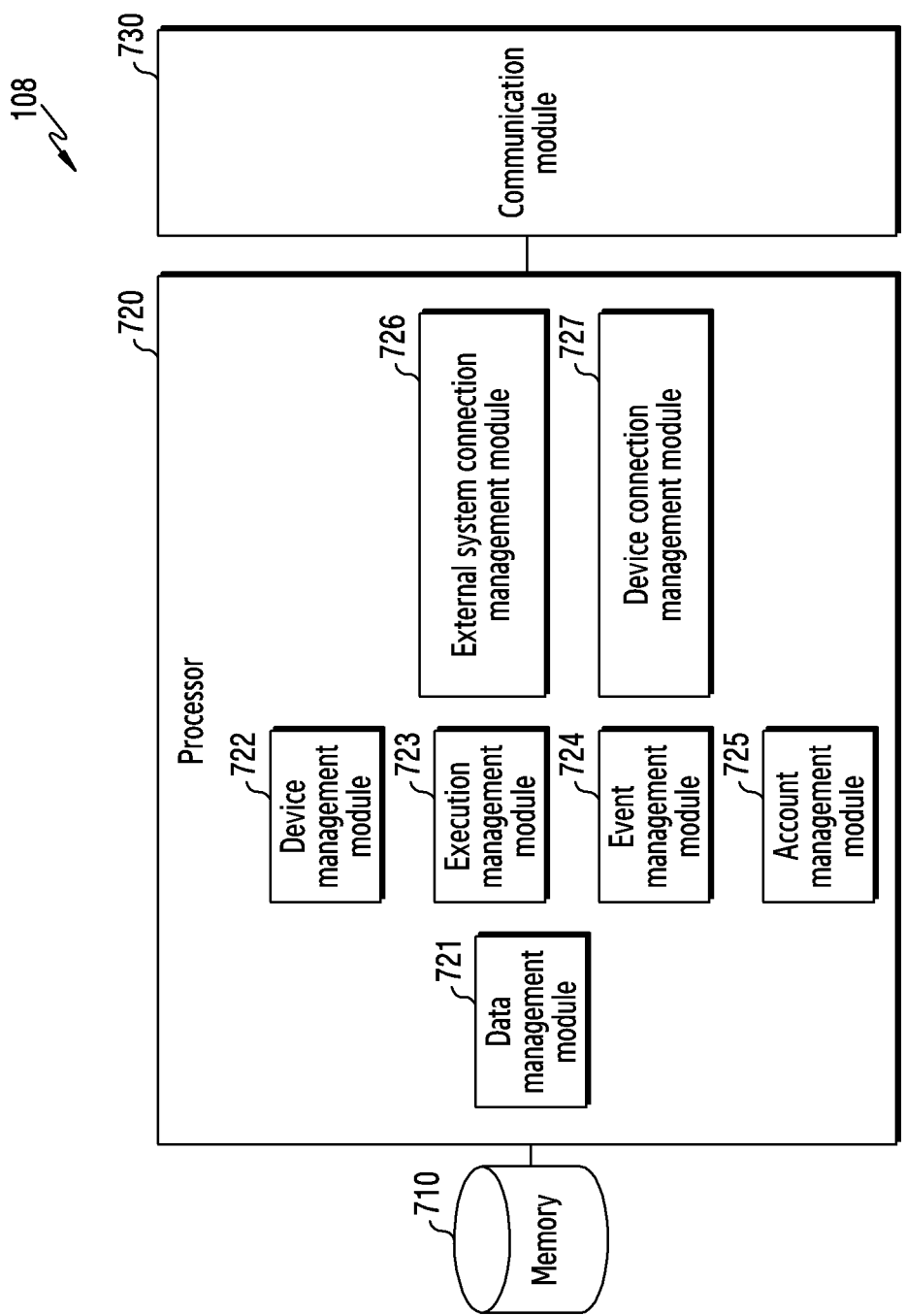
FIG. 7 illustrates an example of functional composition of a server, according to various embodiments.

FIG. 7 illustrates an example of functional composition of a server (108), according to various embodiments.

At least a part of the functional composition illustrated in FIG. 7 may be included in a server 108 illustrated in FIG. 1.

Referring to FIG. 7, a server 108 may include a memory 710, a processor 720, and a communication module 730, and the memory 710, the processor 720, and the communication module 730 may be operatively connected. A processor 720 may include a data management module 721, an external system connection management module 726, a device connection management module 727, a device management module 722, an execution management module 723, an event management module 724, or an account management module 725.

A server 108 may receive signals for a plurality of external electronic devices 210 from an electronic device 101. A server 108 may transmit the received signal to a plurality of external electronic devices 210. At least based on an account registered in an electronic device 101 or an account registered in each of a plurality of external electronic devices 210, a server 108 may manage a right to control a plurality of electronic devices.

For example, in case that a control command of an external electronic device is received from an electronic device 101, a server 108 may confirm, based on account information of the electronic device 101, whether or not the electronic device 101 has a right to control an external electronic device. For example, in case that it is confirmed that there is the right, a server 108 may transmit a control signal to an external electronic device. For another example, in case that it is confirmed that there is not the right, a server 108 may not transmit a control signal to an external electronic device. A server 108 may transmit, to an electronic device 101, a signal that there is not a right to control an external electronic device.

In various embodiments, a server 108 may confirm a state of an electronic device 101, an access point 202, or a plurality of external electronic devices 210 and may control an operation. A server 108 according to various embodiments may confirm information on a state (a status) or a function (capability) of at least one electronic device among an electronic device 101, an access point 202 or a plurality of external electronic devices 210. Based on the information on a state (a status) or a function (capability), a server 108 may control at least one among an electronic device 101, an access point 202, or a plurality of external electronic devices 210.

A memory 710 may store information on an electronic device connectable to a server 108, a set of instructions for controlling an electronic device, or account information for connection to a server 108. The information on an electronic device may include at least one among device ID data such as a device identification (ID), a manufacturer, a serial number, and a media access control (MAC) address, device function (capability) data, device state (status) data, device command (instruction) data, or device event data.

In various embodiments, a memory 710 may store a snapshot indicating information on a recent connection and location relation of a plurality of external electronic devices 210. In case that a request signal related to a location relation of a plurality of external electronic devices 210 is received from an access point 202, a server 108 may transmit information on a snapshot stored in a memory 710. Based on received snapshot information, an electronic device 101 may display a plurality of objects indicating a plurality of external electronic devices 210 on a screen. An electronic device 101 may reduce power consumption of an electronic device 101 and an access point 202 by using a received snapshot.

In various embodiments, a server 108 may divide external electronic devices into a fixed device placed in a fixed location and a variable device having high location variability through comparison of snapshots stored in a memory 710. An electronic device 101 may transmit a request signal for location information of a plurality of external electronic devices. In case of receiving a request signal related to location information from an electronic device 101, a server 108 may transmit, to the electronic device 101, information on a fixed device and a variable device together with information on a snapshot. An electronic device 101 may receive information on a fixed device and a variable device together with information on a snapshot. Based on information on a snapshot and information on a fixed device, an electronic device 101 may acquire information on a location of the fixed device. An electronic device 101 may transmit, to an access point 202, a signal for requesting information on a location of a variable device. An electronic device 101 may receive, from an access point 202, information on a location of a variable device. An electronic device 101 may reduce power consumption of an electronic device 101 by using information on a location of a fixed device.

In various embodiments, a memory 710 may store a set of instructions for controlling at least one device connected to a server 108. The set of instructions may be configured based on at least one among an arbitrary user command and an internal/external event. The arbitrary user command may include a voice command received from an electronic device 101. The set of instructions may include at least one among event information, condition information, and instruction information. For example, a memory 710 may store instructions such as "when CO gas is detected, ring an emergency bell", "when the front door is open at 5 p.m., play music and turn on the light in the living room", and "turn on the TV, adjust the channel of the IPTV to No. 13, and change the living room light to yellow".

In case of "when CO gas is detected, ring an emergency bell", "when CO gas is detected" may be an event, and "ring an emergency bell" may be an instruction. In case that CO gas is detected, an electronic device 101 may transmit information on CO gas detection to a server 108. Based on information on CO gas detection, a server 108 may transmit, to an electronic device 101, a control signal for performing a command. Based on a control signal for performing a command, an electronic device 101 may transmit, to an emergency bell, a control signal for ringing the emergency bell.

In case of "when the front door is open at 5 p.m., play music and turn on the light in the living room", "5 p.m." may be a condition, "when the front door is open" may be an event, "play music" may be a first command, and "turn on the light in the living room" may be a second command. In case that a current time corresponds to 5 p.m. and a front door is open, an electronic device 101 may transmit, to a server 108, information that a current time corresponds to 5 p.m. and a front door has been opened. Based on information that a current time corresponds to 5 p.m. and a front door has been opened, a server 108 may transmit a control signal for performing a command to an electronic device 101. Based on a control signal for performing a command, an electronic device 101 may transmit a control signal for playing music to a speaker and transmit a control signal for turning on a light in a living room to the light included in the living room.

In case of "turn on the TV, adjust the channel of the IPTV to No. 13, and change the living room light to yellow", "turn on the TV" may be a first command, "adjust the channel of the IPTV to No. 13" may be a second command, and "change the living room light to yellow" may be a third command. An electronic device 101 may transmit information on a first command, a second command, and a third command to a server 108. Based on information on a first command, a second command, and a third command, a server 108 may transmit a control signal for performing a command to an electronic device 101. Based on a control signal for performing a command, an electronic device 101 may transmit a control signal for turning on a TV, a control signal for adjusting a channel of a TV to No. 13, and a control signal for changing a color of a light included in a living room to yellow.

A communication module 730 may serve as an interface for data communication with a server 108 and an electronic device 101, an access point 202, or external electronic devices 210. In various embodiments, a communication module 730 may support various forms of network interfaces. In addition, a communication module 730 may support various forms of communication protocols.

A data management module 721 may manage data which is stored in or may be stored in a memory 710. A data management module 721 may produce, collect, store, modify, analyze, query, or delete various pieces of data in line with a memory 710. A data management module 721 may produce a new set of instructions through analysis of data stored in a memory 710.

An external system connection management module 726 may manage a communication channel with another server. An external system connection management module 726 may control an operation for data exchange through a communication channel. For example, an external system connection management module 726 may perform device control and information provision for another server. In addition, an external system connection management module 726 may respond to a request for device control and information provision from another server.

In various embodiments, a server 108 may provide, in line with a plurality of external electronic devices 210, various Internet services including weather, news, or video streaming through an external system connection management module 726. In case that information is received from a service providing server (for example: a weather providing server) and the information matches a condition (for example: below a certain temperature) having been previously registered by a user, an external system connection management module 726 may transmit a device control command signal (for example: start of a humidifier operation) to an execution management module 723.

A device connection management module 727 may manage an electronic device (for example: an electronic device 101, an access point 202, or a plurality of external electronic devices 210) connected to a server 108. A device connection management module 727 may manage a communication channel connected to a server 108. A device connection management module 727 may control data transmission or reception through a communication channel.

A device management module 722 may perform, on (an) electronic device(s) (for example: an electronic device 101, an access point 202, or external electronic devices 210) which is/are registered or may be registered in a server 108, at least one among registration (register), deregistration (unregister), state query (status query), activation, or deactivation.

An execution management module 723 may transmit, to an electronic device 101, an execution instruction for an electronic device 101 confirmed through a memory 710.

An event management module 724 may confirm an event that has externally occurred. An event management module 724 may confirm a set of instructions corresponding to the event that has externally occurred. In order to confirm the set of instructions, an event management module 724 may perform, through a data management module 721, query on a set of instructions stored in a memory 710. According to another embodiment, an event management module 724 may detect an event for a state change of an electronic device 101 and may change, through a data management module 721, state information of an electronic device 101, stored in a memory 710.

An account management module 725 may control, based on account information stored in a memory 710, an electronic device 101 such that the electronic device 101 accesses a server 108. An account management module 725 may control access to an electronic device 101 registered in a server 108. For example, an account management module 725 may control the right of inquiry or modification for an entire server 108. An account management module 725 may control the right of inquiry or modification for at least one among a plurality of external electronic devices 210.

A system 200 according to various embodiments includes an electronic device 101, an access point 202, and a server 108, but in terms of the composition of a system 200, an access point 202 or a server 108 is may also operate as a partial element in an electronic device 101. For example, an operations for voice command recognition may be processed inside an electronic device 101 without a server 108. In addition, an operation of a server 108 for controlling a plurality of external electronic devices 210 may be processed inside an electronic device 101. At this time, an electronic device 101 may also control a plurality of external electronic devices 210 in a peer to peer (P2P) form using a local network. According to an embodiment, in an environment where an access point 202 is absent, an electronic device 101 may autonomously perform a part or all of the roles of an access point 202.

Figure 8:
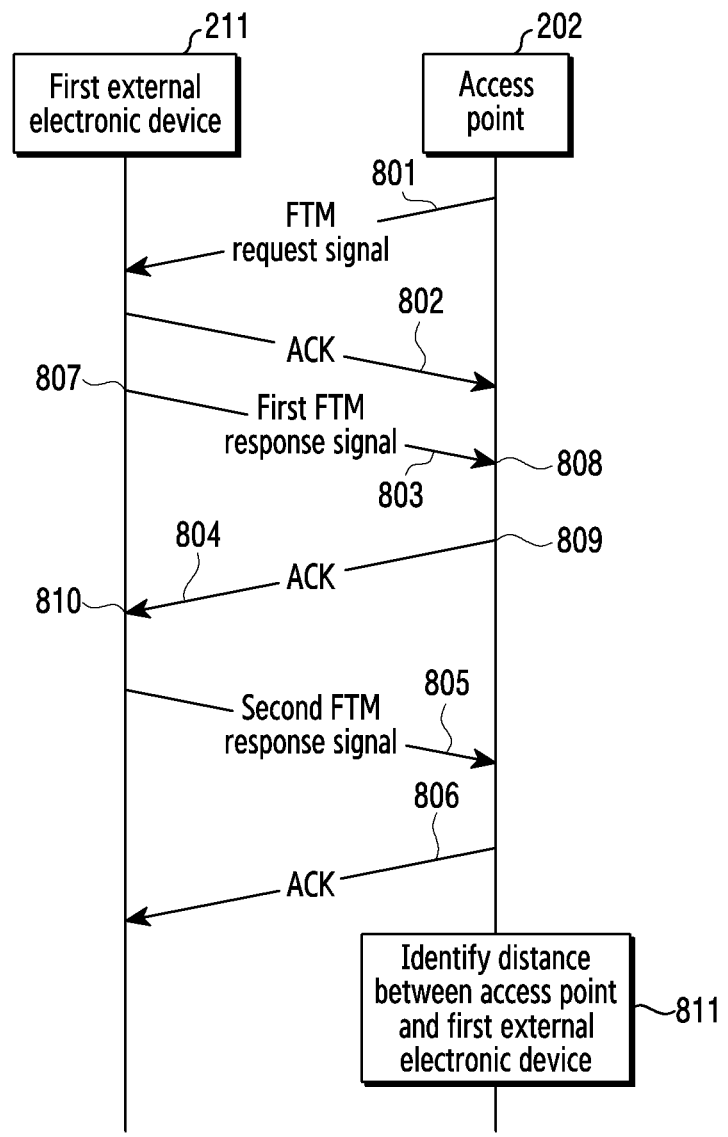
FIG. 8 illustrates an example of a signal flow for calculating a distance between an access point and a first external electronic device, according to various embodiments.

FIG. 8 illustrates an example of a signal flow for calculating a distance between an access point 202 and a first external electronic device 211, according to various embodiments. FIG. 8 specifically illustrates a method for calculating a distance $d_0$ between an electronic device 101 and a first external electronic device 211 according to fine timing measurement (FTM). A first external electronic device 211 may be one among a plurality of external electronic devices 110.

Referring to FIG. 8, in operation 801, an access point 202 (for example: a processor 501 of an access point 202) may transmit an FTM request signal to a first external electronic device 211. A first external electronic device 211 may receive an FTM request signal from an access point 202.

In operation 802, a first external electronic device 211 may transmit, to an access point 202, an acknowledgment signal (an ACK signal) for an FTM request signal. An access point 202 may receive, from a first external electronic device 211, an acknowledgment signal for an FTM request signal.

In operation 803, a first external electronic device 211 may transmit, based on an FTM request signal, a first FTM response signal to an access point 202. A first external electronic device 211 may transmit a first FTM response signal at a first timing $t_1$ 807. An access point 202 may receive a first FTM response signal from a first external electronic device 211. An access point 202 may receive a first FTM response signal at a second timing $t_2$ 808. An access point 202 may track a reception time of a first FTM response signal. An access point 202 may receive a first FTM response signal at a second timing $t_2$ 808.

In operation 804, an access point 202 may transmit, to a first external electronic device 211, an acknowledgment signal (an ACK signal) for a first FTM response signal. An access point 202 may transmit an acknowledgment signal (an ACK signal) for a first FTM response signal at a third timing $t_3$ 809. A first external electronic device 211 may receive an acknowledgment signal for a first FTM response signal from an access point 202. A first external electronic device 211 may receive an acknowledgment signal for a first FTM response signal at a fourth timing $t_4$ 810.

In operation 805, a first external electronic device 211 may transmit, based on an acknowledgment signal for a first FTM response signal, a second FTM response signal to an access point 202. A second FTM response signal may include information on a first timing $t_1$ 807 and a fourth timing $t_4$ 810. An access point 202 may receive a second FTM response signal from a first external electronic device 211.

In operation 806, an access point 202 may transmit, to a first external electronic device 211, an acknowledgment signal for a second FTM response signal. A first external electronic device 211 may receive, from an access point 202, an acknowledgment signal for a second FTM response signal.

In operation 811, based on the first timing $t_1$ 807, the second timing $t_2$ 808, the third timing $t_3$ 809, and the fourth timing $t_4$ 810, an access point 202 may identify a distance $d_0$ between an access point 202 and a first external electronic device 211.

An access point 202 (or a distance measurement module 510) may produce a distance $d_0$ between an access point 202 and a first external electronic device 211, which is composed as shown in equation 1 below by multiplying a speed c of a signal by a time consumed to transmit the signal. For example, an access point 202 may acquire information on a distance between the access point 202 and a first external electronic device 211 by using equation 1 below.

$$d_n = c \times \frac{((t_4 - t_1) - (t_3 - t_2))}{2} \quad \text{[Equation 1]}$$

In equation 1, $d_0$ may denote a distance between an access point 202 and a first external electronic device 211, c may denote a speed of a signal, $t_1$ may denote a first timing 807, $t_2$ may denote a second timing 808, $t_3$ may denote a third timing 809, and $t_4$ may denote a fourth timing 810.

An electronic device (for example: an electronic device 101) according to various embodiments as described above may include: at least one wireless communication circuit (for example: a wireless communication module 192 or a communication module 190); a touch screen display (for example: a display device 160); a processor (for example: a processor 120) operatively connected to the at least one wireless communication circuit and the touch screen display; and a memory (for example: a memory 130) operatively connected to the processor, wherein the memory stores instructions that, when executed, cause the processor to: receive first information on a first external electronic device (for example: a first external electronic device 211 or a second external electronic device 212) and a second external electronic device (for example: a first external electronic device 211 or a second external electronic device 212) through the at least one wireless communication circuit; determine, at least partly based on a signal acquired through the at least one wireless communication circuit and/or second information received through the at least one wireless communication circuit, a location and/or a direction of the first external electronic device and a location and/or a direction of the second external electronic device; provide, at least partly based on the determined location and/or the determined direction, the touch screen display with a graphical user interface (GUI) indicating the first external electronic device and the second external electronic device; receive, through the touch screen display, a gesture input for selection of the first external electronic device and the second external electronic device; and transmit, through the wireless communication circuit, third information related to an operation of using the first external electronic device and the second external electronic device.

In various embodiments, the instructions may cause the processor (for example: the processor 120) to receive the first information from at least one among the first external electronic device (for example: the first external electronic device 211 or the second external electronic device 212), the second external electronic device (for example: the first external electronic device 211 or the second external electronic device 212), an external server (for example a server 108), or an access point (for example: an access point 202) which wirelessly communicates with the electronic device (for example: the electronic device 101).

In various embodiments, the instructions may cause the processor (for example: the processor 120) to receive the second information from the access point (for example: the access point 202).

In various embodiments, the third information may include an ID of the first external electronic device (for example: the first external electronic device 211 or the second external electronic device 212), an ID of the second external electronic device (for example: the first external electronic device 211 or the second external electronic device 212), and information on the operation.

In various embodiments, the third information may include an IP address.

In various embodiments, the operation may include at least one among mirroring, streaming, or sharing.

In various embodiments, the first information may include functions (capabilities) of the first external electronic device (for example: the first external electronic device 211 or the second external electronic device 212) and the second external electronic device (for example: the first external electronic device 211 or the second external electronic device 212).

In various embodiments, the instructions may cause the processor (for example: the processor 120) to store the first information in a profile form.

An electronic device (for example: an electronic device 101) according to various embodiments as described above may include: a display (for example: a display device 160); a communication module (for example: a communication module 190); and a processor (for example: a processor 120) functionally connected to the display and the communication module, wherein the processor is configured to: receive, from an access point (for example: an access point 202), first data for indicating a location relation between each of a plurality of external electronic devices (for example: a plurality of external electronic devices 210) related to the access point and the access point; acquire, at least based on the first data, second data for indicating a location relation of the electronic device and each of the plurality of external electronic devices; display, within a user interface of an application for connecting at least one external electronic device (for example: a first external electronic device 211 or a second external electronic device 212) among the plurality of external electronic devices and the electronic device, a plurality of objects indicating the plurality of external electronic devices and arranged based on the second data; detect an input for at least one object among the plurality of objects; and transmit, to at least one external electronic device indicated by the at least one object among the plurality of external electronic devices, a signal for connection.

In various embodiments, the first data may include data about distances between the access point (for example: the access point 202) and each of the plurality of external electronic devices (for example: a plurality of external electronic devices 210), and the processor (for example: the processor 120) may be configured to: identify, based on a signal received from each of the plurality of external electronic devices, third data about distances between each of the plurality of external electronic devices and the electronic device (for example: the electronic device 101); and acquire, at least based on the first data and the third data, the second data.

Figure 9A:
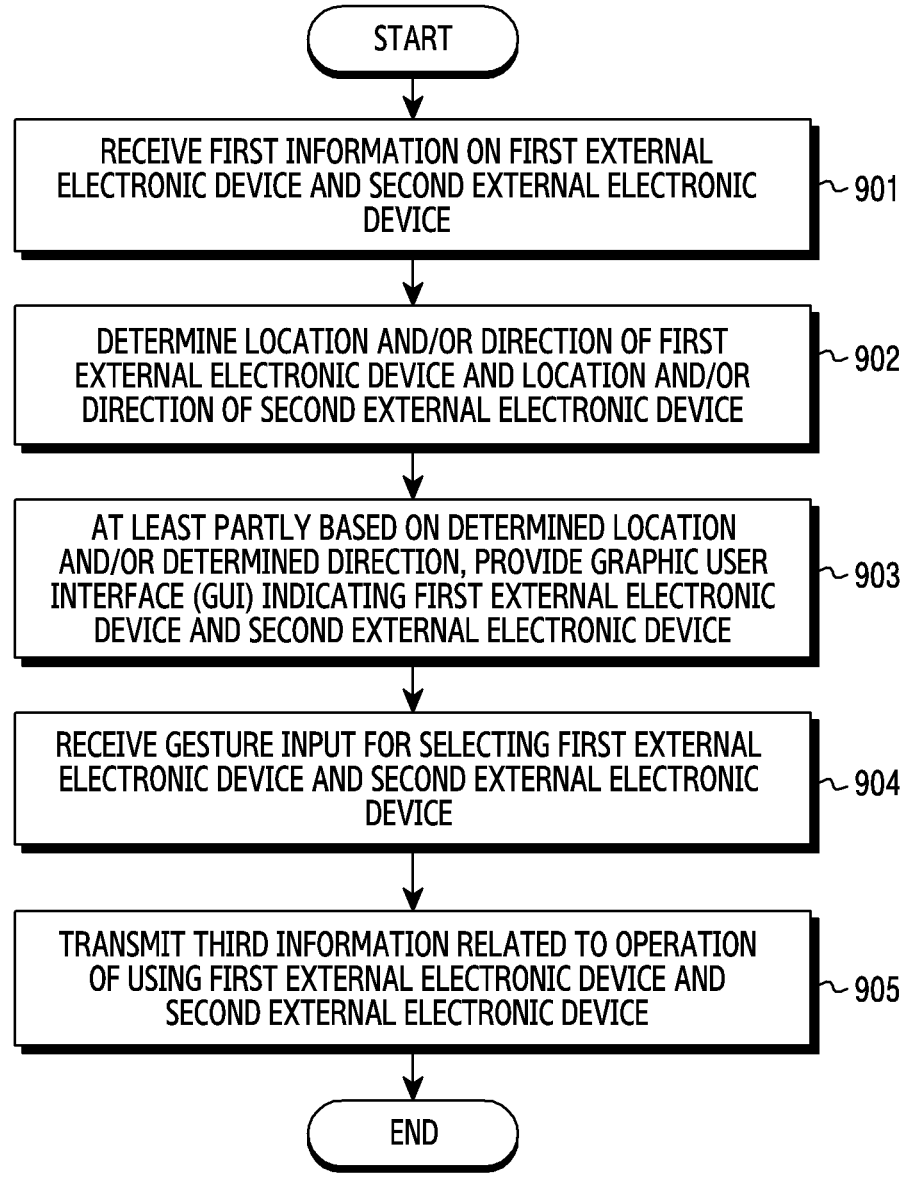
FIG. 9A illustrates an example of an operation of an electronic device, according to various embodiments.

FIG. 9A illustrates an example of an operation of an electronic device 101, according to various embodiments.

Such an operation may be performed by an electronic device 101 illustrated in FIG. 1, or an electronic device 101 or a processor 120 included in the electronic device 101, illustrated in FIG. 3.

Referring to FIG. 9A, in operation 901, a processor 120 may receive first information on a first external electronic device 211 and a second external electronic device 212. The first information may include information on a function of a first external electronic device 211 and information on a function of a second external electronic device 212. Information on a function may include information on whether or not a device is an input device, whether or not a screen output function is performed, or whether or not a sound output function is performed, or information on a connection protocol.

In operation 902, a processor 120 may determine a location and/or a direction of a first external electronic device 211 and a location and/or a direction of a second external electronic device 212. At least partly based on second information and/or a signal acquired through a wireless communication circuit 192, a processor 120 may determine a location and/or a direction of a first external electronic device 211 and a location and/or a direction of a second external electronic device 212. Based on a signal acquired through a wireless communication circuit 192, a processor 120 may identify at least one external electronic device located in an area corresponding to a direction which a first point of an electronic device 101 faces. A processor 120 may receive second information on a location relation of a plurality of external electronic devices 210 from an access point 202. Based on second information, a processor 120 may determine a location and/or a direction of a first external electronic device 211 and/or a location and/or a direction of a second external electronic device 212 with reference to at least one external electronic device located in an area corresponding to a direction which a first point of an electronic device 101 faces.

In operation 903, at least partly based on a determined location and/or a determined direction of a first external electronic device 211 and a second external electronic device 212, a processor 120 may provide a graphical user interface indicating the first external electronic device 211 and the second external electronic device 212. For example, based on a determined location and/or a determined direction of a first external electronic device 211 and a second external electronic device 212, a processor 120 may display, as plane views on a display device 160, an object indicating a first external electronic device 211 and an object indicating a second external electronic device 212.

In operation 904, a processor 120 may receive a gesture input for selecting a first external electronic device 211 and a second external electronic device 212. The gesture input may include a gesture input for connecting a first external electronic device 211 and a second external electronic device 212. For example, a processor 120 may receive an input for connecting a first external electronic device 211 and a second external device 212 through a drag input, a tap input, or a voice command input.

In operation 905, a processor 120 may transmit third information related to an operation using a first external electronic device 211 and a second external electronic device 212. For example, the third information may include signals for changing driving modes of a first external electronic device 211 and a second external electronic device 212. A processor 120 may identify, based on first information, a driving mode of a first external electronic device 211 and a driving mode of a second external electronic device 212, respectively. Based on an identified driving mode of a first external electronic device 211, a processor 120 may transmit, to the first external electronic device 211, a signal for changing a driving mode of the first external electronic device 211. Based on a driving mode of a second external electronic device 212, a processor 120 may transmit, to the second external electronic device 212, a signal for changing a driving mode of the second external electronic device 212.

Figure 9B:
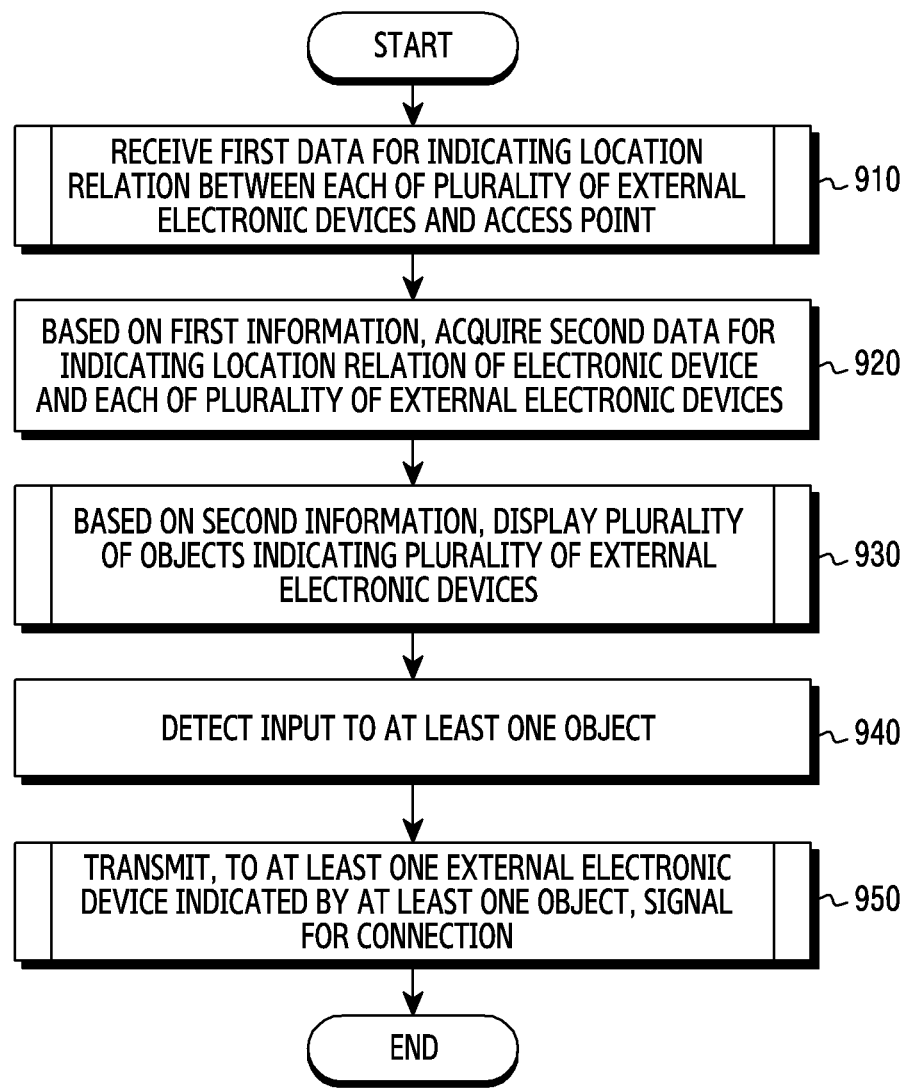
FIG. 9B illustrates another example of an operation of an electronic device, according to various embodiments.

FIG. 9B illustrates another example of an operation of an electronic device 101, according to various embodiments. Such an operation may be performed by an electronic device 101 or a processor 120 included in the electronic device 101, illustrated in FIG. 3.

Referring to FIG. 9B, in operation 910, a processor 120 may receive first data for indicating a location relation between each of a plurality of external electronic devices 210 and an access point 202 from the access point 202 through a communication module 190. The first data may include at least one among information on a distance or a direction between each of a plurality of external electronic devices 210 and an access point 202.

Although not illustrated in FIG. 3, a processor 120 may receive an input related to a connection mode from a user. A connection mode may include an operation (for example: file sharing or an image output (mirroring, streaming, or sharing)) to be performed through connection of a plurality of external electronic devices 210. A processor 120 may store an input related to the connection mode in a memory 130. A processor 120 may update an input related to the connection mode to context information. For example, a processor 120 may receive an input related to file sharing of external electronic devices. A processor 120 may store an input for file sharing in a memory 130. A processor 120 may update an input for file sharing to context information. Based on the context information, a processor 120 may confirm a plurality of external electronic devices 210 to be displayed. In various embodiments, an operation of receiving an input related to a connection mode may be omitted, and may be performed after a plurality of external electronic devices 210 are displayed on an electronic device 101.

In operation 920, a processor 120 may acquire, based on first data, second data for indicating a location relation of an electronic device 101 and each of a plurality of external electronic devices 210. The second data may include information indicating a location relation of a plurality of external electronic devices 210, changed based on the first data with reference to at least one external electronic device located in an area corresponding to a direction which a first point of an electronic device 101 faces.

In operation 930, a processor 120 may display, based on second data, a plurality of objects indicating a plurality of external electronic devices 210 on a display device 160. The plurality of objects may be indicated by names of a plurality of external electronic devices 210, respectively, or may be indicated by shapes corresponding to the plurality of external electronic devices 210, respectively.

In operation 940, a processor 120 may detect an input to at least one among a plurality of objects through an input device 150. The input may include an input for connecting a plurality of external electronic devices 210. The input may include a drag input or a tap input.

In operation 950, a processor 120 may transmit, to at least one external electronic device indicated by at least one object, a signal for connection through a communication module 160. The signal for connection may be transmitted to each external electronic device. For example, in case of receiving an input to objects indicating a monitor and a computer, a processor 120 may transmit, to the computer, a signal for configuring the computer as an input device (for example: a source). In addition, a processor 120 may transmit, to a monitor, a signal for configuring the monitor as an output device (for example: a display).

Figure 10:
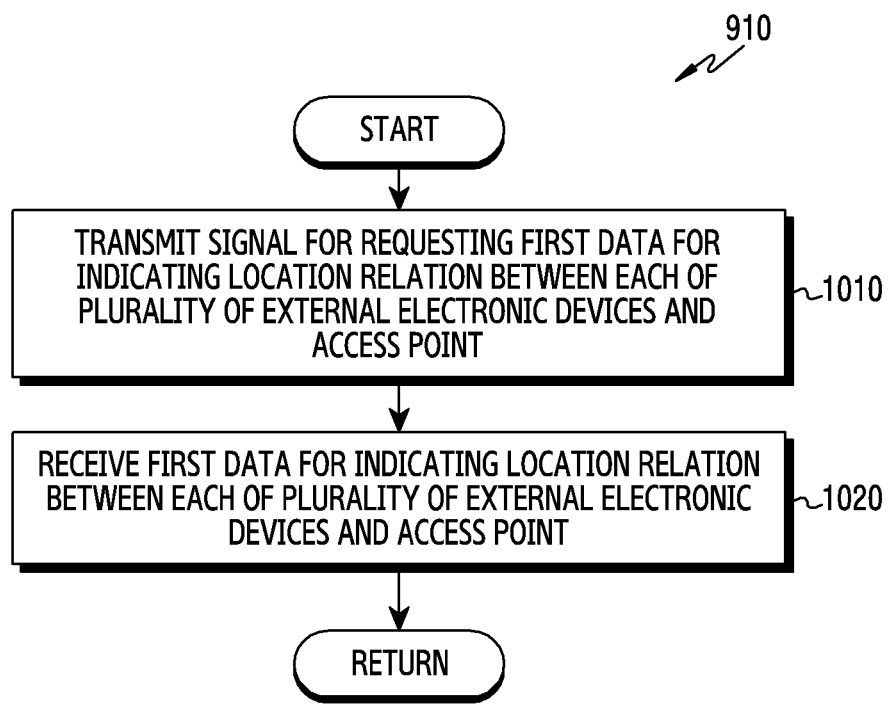
FIG. 10 illustrates an example of an operation of, in an electronic device, receiving data for indicating location relation between a plurality of external electronic devices, according to various embodiments.

FIG. 10 illustrates an example of an operation of, in an electronic device 101, receiving data for indicating location relation between a plurality of external electronic devices 210, according to various embodiments. Operation 1010 to operation 1020 of FIG. 10 may be related to operation 910 of FIG. 9.

Referring to FIG. 10, in operation 1010, a processor 120 may transmit, to an access point 202 through a communication module 190, a signal for requesting first data for indicating a location relation between each of a plurality of external electronic devices 210 and the access point 202. For example, the first data may include at least one among information on a distance or a direction between an access point 202 and a plurality of external electronic devices 210. A method by which an access point 202 acquires first data will be described later with reference to FIG. 11.

In operation 1020, a processor 120 may receive, through a communication module 190, first data for indicating a location relation between each of a plurality of external electronic devices 210 and an access point 202. In various embodiments, a processor 120 may receive data for indicating a location relation of a plurality of external electronic devices 210 directly from the plurality of external electronic devices 210.

Figure 11:
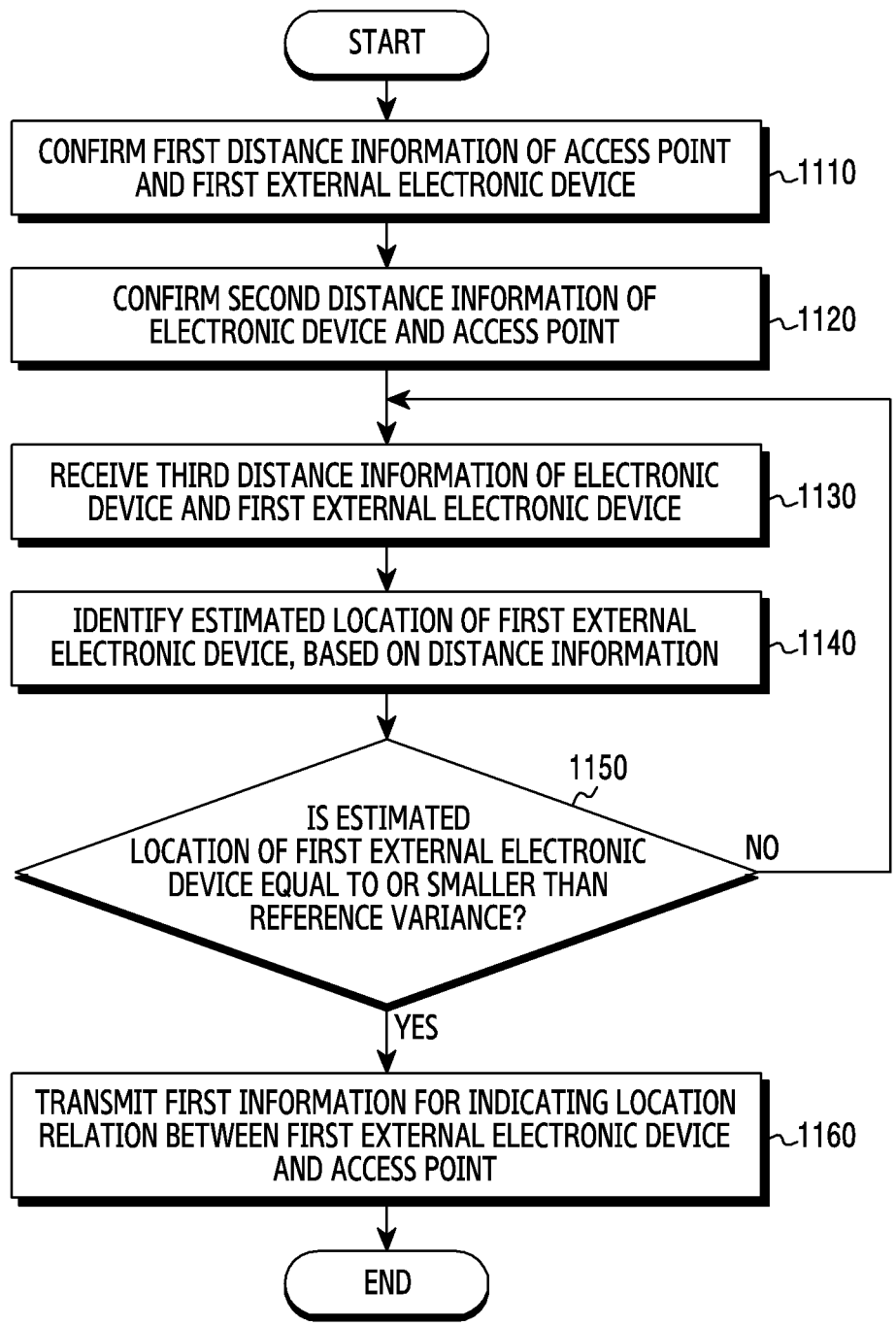
FIG. 11 illustrates an example of an operation of, in an access point, identifying a distance and a direction between the access point and a first external electronic device through an FTM scheme, according to various embodiments.

FIG. 11 illustrates an example of an operation of, in an access point 202, identifying a distance and a direction between the access point 202 and a first external electronic device 211 through an FTM scheme, according to various embodiments.

Figure 12:
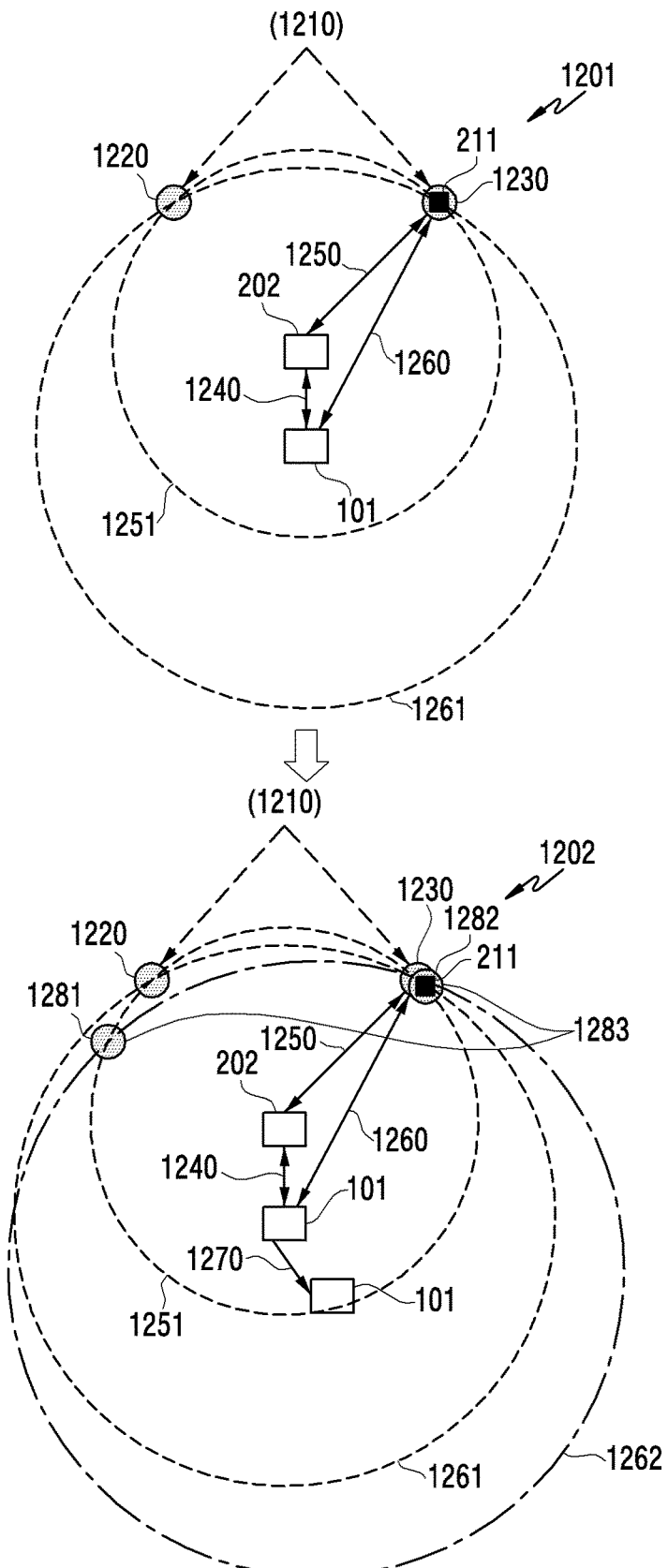
FIG. 12 explains an example of a method for identifying a distance and a direction between a first external electronic device and an access point, according to various embodiments.

FIG. 12 explains an example of a method for identifying a distance and a direction between a first external electronic device 211 and an access point 202, according to various embodiments.

Referring to FIG. 11, a first external electronic device 211 may be one among a plurality of external electronic devices 110. In operation 1110, a processor 501 of an access point 202 may confirm information on a first distance between the access point 202 and a first external electronic device 211. For example, referring to FIG. 12, a processor 501 may confirm information on a first distance 1250 between an access point 202 and a first external electronic device 211. A processor 501 may confirm that a first external electronic device 211 may exist on a line forming a virtual circle 1251 that has an access point 202 as the center thereof and a first distance 1250 as the radius thereof.

In operation 1120, a processor 501 may confirm information on a second distance between an electronic device 101 and an access point 202. A processor 501 may confirm information on a direction and a distance of an electronic device 101 with reference to an access point 202. Based on information on a direction and a distance of an electronic device 101 with reference to an access point 202, a processor 501 may confirm information on a second distance. For example, referring to FIG. 12, a processor 501 may confirm a second distance 1240. A processor 501 may identify a location of an electronic device 101 as being spaced apart as much as a second distance 1240 of FIG. 12. In various embodiments, a processor 501 may estimate a location of an electronic device 101 through a plurality of antennas included in an access point 202. For example, a processor 501 may receive a signal from an electronic device 101 through a plurality of antennas. A processor 501 may estimate a location of an electronic device 101 through a phase difference of a received signal or a gain pattern of an array antenna. In various embodiments, a processor 501 may estimate a location of an electronic device 101 through a plurality of microphones included in an access point 202. For example, a processor 501 may also receive a user's voice input related to an electronic device 101 from an access point 202. A processor 501 may also estimate, based on the voice input, a location of an electronic device 101. In various embodiments, when an electronic device 101 moves, a processor 501 may acquire information on a moving direction and distance of an electronic device 101.

In operation 1130, a processor 501 may confirm information on a third distance between an electronic device 101 and a first external electronic device 211. For example, referring to FIG. 12, a processor 501 may confirm a third distance 1260. A processor 501 may receive information on a third distance from an electronic device 101. Accordingly, a processor 501 may confirm that a first external electronic device 211 may exist on a line forming a virtual circle 1261 that has an electronic device 101 as the center thereof and a third distance 1260 as the radius thereof.

In operation 1140, based on information of a first distance 1250, a second distance 1240, and a third distance 1260, a processor 501 may identify a location where a first external electronic device 211 may exist. Specifically, a processor 501 may identify that a first external electronic device 211 may exist at an intersection point 1210 of a circle estimated through operation 1110 (for example: a virtual circle 1251) and a circle estimated through operation 1130 (for example: a virtual circle 1261). The two circles may have two intersection points. Accordingly, a first external electronic device 211 may exist in a location corresponding to a first intersection point 1220 or may exist in a location corresponding to a second intersection point 1230. A processor 501 may store information on a candidate point (for example: a first intersection point 1220 and a second intersection point 1230) at which a first external electronic device 211 may be located.

In operation 1150, a processor 501 may identify whether or not data for an estimated location of a first external electronic device 211 corresponds to a value equal to or smaller than a designated variance. In case that data for an estimated location of a first external electronic device 211 corresponds to a value larger than a designated variance, a processor 501 may re-perform operation 1130. According to an embodiment, even in case that the size of variance data for a primarily estimated location of a first external electronic device 211 is smaller than a predesignated variance data size, a processor 501 may re-perform operation 1130 to enhance accuracy.

As illustrated in a conceptual diagram 1202 of FIG. 12, in case that an electronic device 101 moves in a direction 1270 displayed in the conceptual diagram 1202, a processor 501 may identify that a first external electronic device 211 exists at an intersection point 1283 of a virtual circle (for example: a virtual circle 1251) drawn through operation 1110 and a circle 1251 (for example: a virtual circle 1262) newly re-estimated through operation 1130. By comparing a variance of a pre-estimated intersection point 1220 and an intersection point 1281 and a variance of a pre-estimated intersection point 1230 and an intersection point 1282, a processor 501 may estimate, as a location of a first external electronic device 211, an intersection point having a smaller variance, from among the intersection point 1281 and the intersection point 1282. A processor 501 may estimate that, from among the two intersection points, a first external electronic device 211 may exist around an identified intersection point 1282 and an intersection point 1230 pre-identified in operation 1130.

In operation 1150, a processor 501 may re-identify whether or not a variance of data for an estimated location of a first external electronic device 211 is equal to or smaller than a designed variance. In case that a variance of data for a re-estimated location of a first external electronic device 211 is equal to or smaller than a designated variance, a processor 501 may confirm that a location of the first external electronic device 211 corresponds to an intersection point 1230. In other words, in case that a variance of data for an estimated location of a first external electronic device 211 is equal to or smaller than a designated variance, a processor

501 may confirm that the estimated location corresponds to a location of the first external electronic device 211.

In operation 1160, a processor 501 may transmit first data related to a location of a first external electronic device 211 to an electronic device 101.

An operation in which a processor 501 confirms information on a distance and information on a direction of a first external electronic device 211 is not limited to the sequence in FIG. 11 and may be changed. For example, in case that an electronic device 101 and an access point 201 move together, a processor 501 may confirm a moving distance and direction of an electronic device 101 and an access point 201 from a reference location. Based on a location of a first external electronic device 211, estimated in a changed location, and a location of the first external electronic device 211, estimated in a reference location, a processor 501 may estimate a location of the first external electronic device 211.

Figure 13:
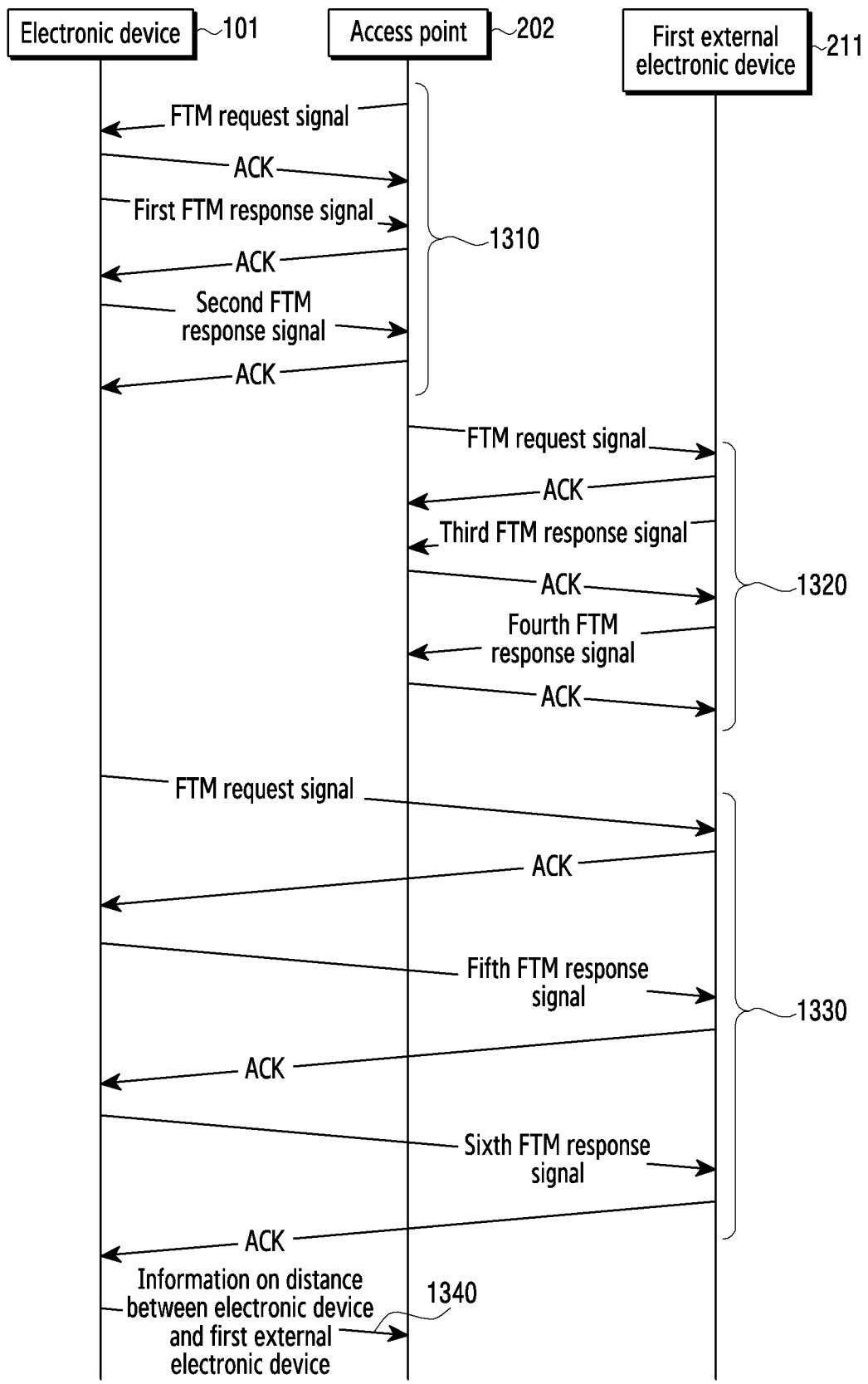
FIG. 13 illustrates an example of a signal flow for, in an access point, identifying distances between an electronic device, the access point, and a first external electronic device, according to various embodiments.

FIG. 13 illustrates an example of a signal flow for, in an access point 202, identifying distances between an electronic device 101, the access point 202, and a first external electronic device 211, according to various embodiments.

Referring to FIG. 13, in case of confirming a distance between an electronic device 101 and an access point 202, a distance between the access point 202 and a first external electronic device 211, and a distance between the electronic device 101 and the first external electronic device 211, the electronic device 101 and the access point 202 may use a fine timing measurement (FTM) scheme illustrated in FIG. 8. A first external electronic device 211 may be one among a plurality of external electronic devices 110.

In operation 1310, an access point 202 (for example: a processor 501 of an access point 202) may acquire information on a distance between the access point 202 and an electronic device 101. Operation 1310 may be performed similarly to a method illustrated in FIG. 8.

In operation 1320, an access point 202 may acquire information on a distance between the access point 202 and a first external electronic device 211. Operation 1320 may be performed similarly to a method illustrated in FIG. 8.

In operation 1330, an electronic device 101 (for example: a processor 120 of an electronic device 101) may acquire information on a distance between the electronic device 101 and a first external electronic device 211. Operation 1330 may be performed similarly to a method illustrated in FIG. 8.

In operation 1340, an electronic device 101 may transmit information on a distance between the electronic device 101 and a first external electronic device 211 to an access point 202. Based on a distance between an electronic device 101 and an access point 202, a distance between the access point 202 and a first external electronic device 211, and a distance between the electronic device 101 and the first external electronic device 211, the access point 202 may acquire information on a location of the first external electronic device 211.

In various embodiments, an electronic device 101 may serve as an access point 202. An access point 202 may serve as an electronic device 101.

Figure 14:
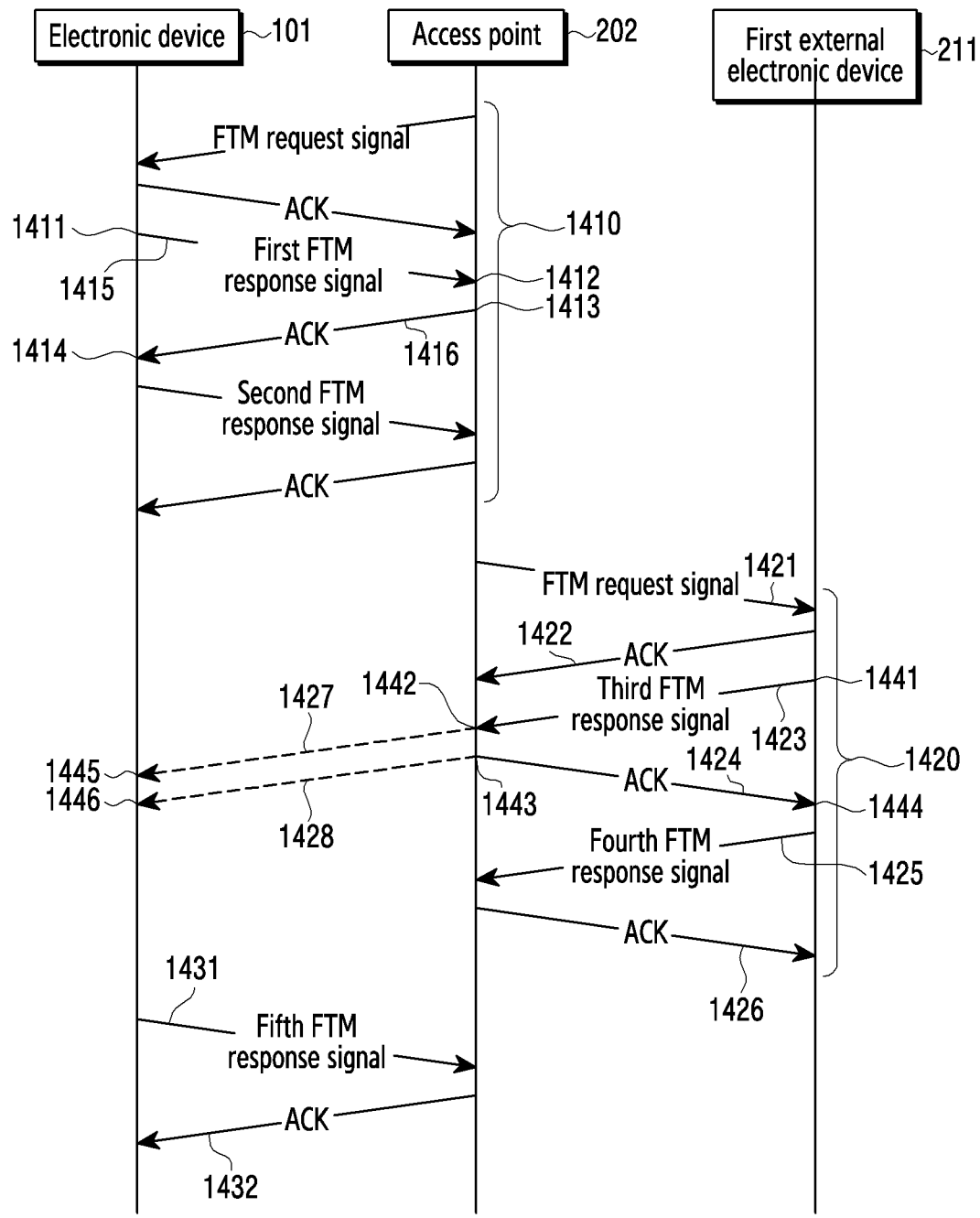
FIG. 14 illustrates another example of a signal flow for, in an access point, identifying distances between an electronic device, the access point, and a first external electronic device, according to various embodiments.

FIG. 14 illustrates another example of a signal flow for, in an access point 202, identifying distances between an electronic device 101, the access point 202, and a first external electronic device 211, according to various embodiments.

Referring to FIG. 14, an electronic device 101 (for example: a processor 120 of an electronic device 101) may sniff a signal between an access point 202 and a first external electronic device 211. An electronic device 101 may transmit information on the sniffed signal to an access point 202. An access point 202 (for example: a processor 501 of an access point 202) may acquire a distance between an electronic device 101 and a first external electronic device 211 via information on the sniffed signal. In case that a plurality of first external electronic devices 211 are used, an electronic device 101 may partially omit signal transmission and reception of the electronic device 101 by using a sniffing scheme. A first external electronic device 211 may be one among a plurality of external electronic devices 110.

In operation 1410, an access point 202 may acquire information on a distance $d_0$ between the access point 202 and an electronic device 101. Operation 1410 may be performed similarly to a method illustrated in FIG. 8.

In operation 1415, an electronic device 101 may transmit a first FTM response signal to an access point 202. An electronic device 101 may transmit a first FTM response signal at a first timing $t_{11}$ 1411. An access point 202 may receive a first FTM response signal. An access point 202 may receive a first FTM response signal at a second timing $t_{12}$ 1412.

In operation 1416, an access point 202 may transmit an acknowledgment signal for a first FTM response signal to a first external electronic device 211. An access point 202 may transmit an acknowledgment signal for a first FTM response signal at a third timing $t_{13}$ 1413. An access point 202 may receive an acknowledgment signal for a first FTM response signal. An access point 202 may receive an acknowledgment signal for a first FTM response signal at a fourth timing $t_{14}$ 1414.

In operation 1420, an access point 202 may acquire information on a distance $d_1$ between an access point 202 and a first external electronic device 211. Operation 1420 may be performed similarly to a method illustrated in FIG. 8.

In operation 1421, an access point 202 may transmit an FTM request signal to a first external electronic device 211. A first external electronic device 211 may receive an FTM request signal.

In operation 1422, based on an FTM request signal, a first external electronic device 211 may transmit an acknowledgment signal (for example: an ACK signal) to an access point 202. An access point 202 may receive an acknowledgment signal.

In operation 1423, after transmitting the acknowledgment signal, a first external electronic device 211 may transmit a third FTM response signal to an access point 202. A first external electronic device 211 may transmit a third FTM response signal at a fifth timing $t_{21}$ 1441. An access point 202 may receive the third FTM response signal. An access point 202 may receive the third FTM response signal at a sixth timing $t_{22}$ 1442.

In operation 1427, an electronic device 101 may sniff the third FTM response signal at a first sniffing timing $t_{25}$ 1445.

In operation 1424, based on a third FTM response signal, an access point 202 may transmit an acknowledgment signal (for example: an ACK signal) to a first external electronic device 211. An access point 202 may transmit the acknowledgment signal at a seventh timing $t_{23}$ 1443. A first external electronic device 211 may receive the acknowledgment signal. A first external electronic device 211 may receive the acknowledgment signal at an eighth timing $t_{24}$ 1444.

In operation 1428, an electronic device 101 may sniff, at a second sniffing timing $t_{26}$ 1446, the acknowledgment signal transmitted from an access point 202.

In operation 1425, a first external electronic device 211 may transmit a fourth FTM response signal to an access point 202. A fourth FTM response signal may be a signal including information on a fifth timing $t_{21}$ 1441 and an eighth timing $t_{24}$ 1444. An access point 202 may receive a fourth FTM response signal from a first external electronic device 211.

In operation 1426, based on a fourth FTM response signal, an access point 202 may transmit an acknowledgment signal (for example: an ACK signal) to a first external electronic device 211. A first external electronic device 211 may receive the acknowledgment signal.

In operation 1431, an electronic device 101 may transmit a fifth FTM response signal to an access point 202. A fifth FTM response signal may include information on a first sniffing timing $t_{25}$ 1445 and a second sniffing timing $t_{26}$ 1446. An access point 202 may receive a fifth FTM response signal from an electronic device 101.

In operation 1432, based on the fifth FTM response signal, an access point 202 may transmit an acknowledgment signal (for example: an ACK signal) to an electronic device 101. Based on the fifth FTM response signal, an electronic device 101 may receive an acknowledgment signal.

Based on a first timing 1411 to an eighth timing 1444, a first sniffing timing 1445, a second sniffing timing 1446, and a speed c of a signal, and a distance $d_0$ between an electronic device 101 and an access point 202, the access point 202 may identify a distance $d_2$ between the electronic device 101 and a first external electronic device 211. An access point 202 may produce information on a distance $d_2$ between an electronic device 101 and a first external electronic device 211, which is composed as shown in equation 2 below. For example, an access point 202 may acquire information on a distance between the access point 202 and a first external electronic device 211 by using equation 2 below.

$$d_2 = c \times \left\{ (t_{25} - t_{26}) - (t_{21} - t_{24}) - \frac{((t_{14} - t_{11}) - (t_{13} - t_{12}))}{2} \right\} + d_0 \quad \text{[Equation 2]}$$

In equation 2, $d_2$ may denote a distance between an access point 202 and a first external electronic device 211, $d_0$ may denote a distance between the access point 202 and an electronic device 101, c may denote a speed, $t_{11}$ may denote a first timing 1411, $t_{12}$ may denote a second timing 1412, $t_{13}$ may denote a third timing 1413, $t_{14}$ may denote a fourth timing 1414, $t_{21}$ may denote a fifth timing 1441, $t_{22}$ may denote a sixth timing 1442, $t_{23}$ may denote a seventh timing 1443, $t_{24}$ may denote an eighth timing 1444, $t_{25}$ may denote a first snipping timing 1445, and $t_{26}$ may denote a second snipping timing 1446.

In various embodiments, in case that an electronic device 101 sniffs an FTM-related signal, the electronic device 101 may acquire phase information of a device (for example: a first external electronic device 211) which has transmitted a snipped FTM-related signal from a packet included in a sniffed FTM-related signal. Based on phase information of a device which has transmitted an FTM-related signal, an electronic device 101 may determine whether or not a device which has transmitted a snipped FTM-related signal is an electronic device located an area corresponding to a direction which the first point of the electronic device 101 faces.

In various embodiments, an electronic device 101 may serve as an access point 202. An access point 202 may serve as an electronic device 101.

Figure 15A:
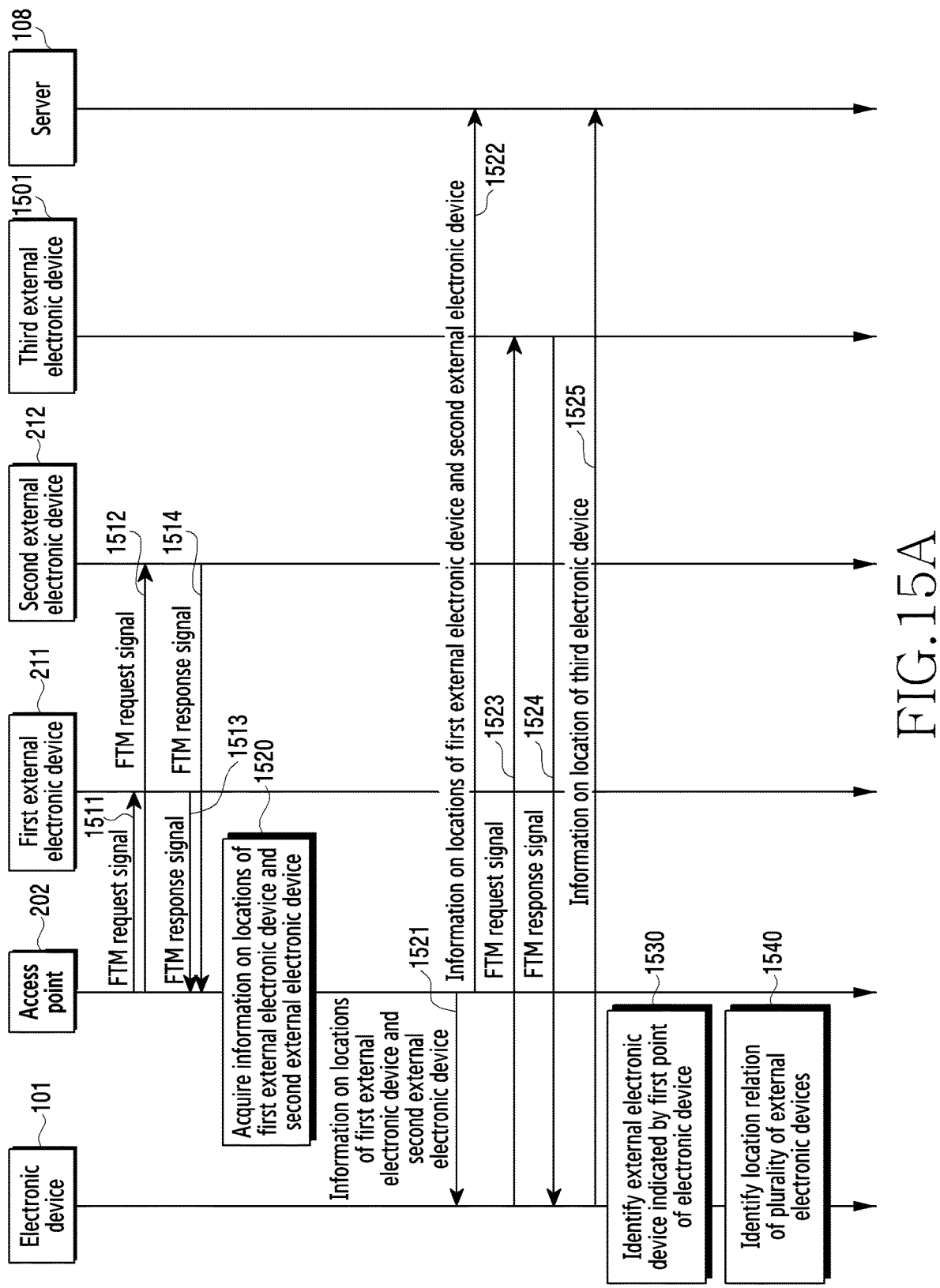
FIG. 15A illustrates another example of a signal flow for, in an electronic device, identifying a location relation of a plurality of external electronic devices, according to various embodiments.

FIG. 15A illustrates another example of a signal flow for, in an electronic device 101, identifying a location relation of a plurality of external electronic devices 210, according to various embodiments Referring to FIG. 15A, an electronic device 101 may be connected to an access point 202. A first external electronic device 211, a second external electronic device 212, an access point 202, and an electronic device 101 may compose a local network. A third external electronic device 1501 may not compose a local network. A local network may not correspond to a network connected in a high frequency band. In case that connection is not in an ultrahigh frequency band (for example: 2.4 Ghz communication or 5 Ghz communication), information on a location of an external electronic device may be acquired through an FTM scheme.

In operation 1511, an access point 202 (for example: a processor 501 of an access point 202) may transmit an FTM request signal to a first external electronic device 211. A first external electronic device 211 may receive an FTM request signal from an access point 202.

In operation 1512, an access point 202 may transmit an FTM request signal to a second external electronic device 212. A second external electronic device 212 may receive an FTM request signal from an access point 202.

In operation 1513, a first external electronic device 211 may transmit an FTM response signal to an access point 202. An access point 202 may receive an FTM response signal from a first external electronic device 211.

In operation 1514, a second external electronic device 212 may transmit an FTM response signal to an access point 202. An access point 202 may receive an FTM response signal from a second external electronic device 212. Operation 1511, operation 1512, operation 1513, and operation 1514 may be performed similarly to a method illustrated in FIG. 8.

In operation 1520, an access point 202 may acquire, via signal transmission, information on locations of a first external electronic device 211 and a second external electronic device 212. For example, based on information on at least one among a distance or a direction of a first external electronic device 211 from an access point 202 and information on at least one among a distance or a direction of a second external electronic device 212 from the access point 202, the access point 202 may acquire information on a location relation of the first external electronic device 211 and the second external electronic device 212. According to an embodiment, an access point 202 may identify, based on a device identification (ID) included in a received signal, that the received signal is a signal transmitted from a first external electronic device 211, and may acquire information on a direction between the first external electronic device 211 and the access point 202 via an angle of arrival (AOA) of the received signal. According to an embodiment, an access point 202 may identify, based on a device identification (ID) included in a received signal, that the received signal is a signal transmitted from a second external electronic device 212, and may acquire information on a direction between the second external electronic device 212 and the access point 202 via an angle of arrival (AOA) of the received signal.

In operation 1521, an access point 202 may transmit information on a location relation of a first external electronic device 211 and a second external electronic device 212 to an electronic device 101. An electronic device 101 (for example: a processor 120 of an electronic device 101) may receive information on a location relation of a first external electronic device 211 and a second external electronic device 212 from an access point 202.

In operation 1522, an access point 202 may transmit information on a location relation of a first external electronic device 211 and a second external electronic device 212 to a server 108. A server 108 may receive information on a location relation of a first external electronic device 211 and a second external electronic device 212 from an access point 202.

In operation 1523, an electronic device 101 may transmit an FTM request signal to a third external electronic device 1501 to acquire information on a location of a third external electronic device 1501. A third external electronic device 1501 may receive an FTM request signal from an electronic device 101.

In operation 1524, a third external electronic device 1501 may transmit an FTM response signal to an electronic device 101. An electronic device 101 may receive an FTM response signal from a third external electronic device 1501. An electronic device 101 may receive information on a location of a third external electronic device 1501 through via reception of an FTM response signal. The information on the location of the third external electronic device 1501 may include information on a distance and a direction of the third external electronic device 1501. In addition, an electronic device 101 may acquire information on a device ID included in an FTM signal of a third external electronic device 1501 and direction information via an angle of arrival (AOA) of the corresponding signal.

In operation 1525, an electronic device 101 may transmit information on a location of a third external electronic device 1501 to a server 108. A server 108 may receive information on a location of a third external electronic device 1501 from an electronic device 101.

Operation 1523, operation 1524, or operation 1525 is illustrated as being performed by an electronic device 101, but may also be performed by an access point 202.

In operation 1530, an electronic device 101 may confirm at least one external electronic device located in an area corresponding to a direction which a first point of the electronic device 101 faces. At least one external electronic device located in an area corresponding to a direction which a first point of an electronic device 101 faces will be described later in FIG. 19.

In operation 1540, an electronic device 101 may identify a location relation of a first external electronic device 211, a second external electronic device 212, and a third external electronic device 1501 with reference to at least one external electronic device located in an area corresponding to a direction which a first point of the electronic device 101 faces. Based on the identified location relation, an electronic device 101 may display, on a screen (for example: a display device 160), each of objects indicating a first external electronic device 211, a second external electronic device 212, and a third external electronic device 1501.

Figure 15B:
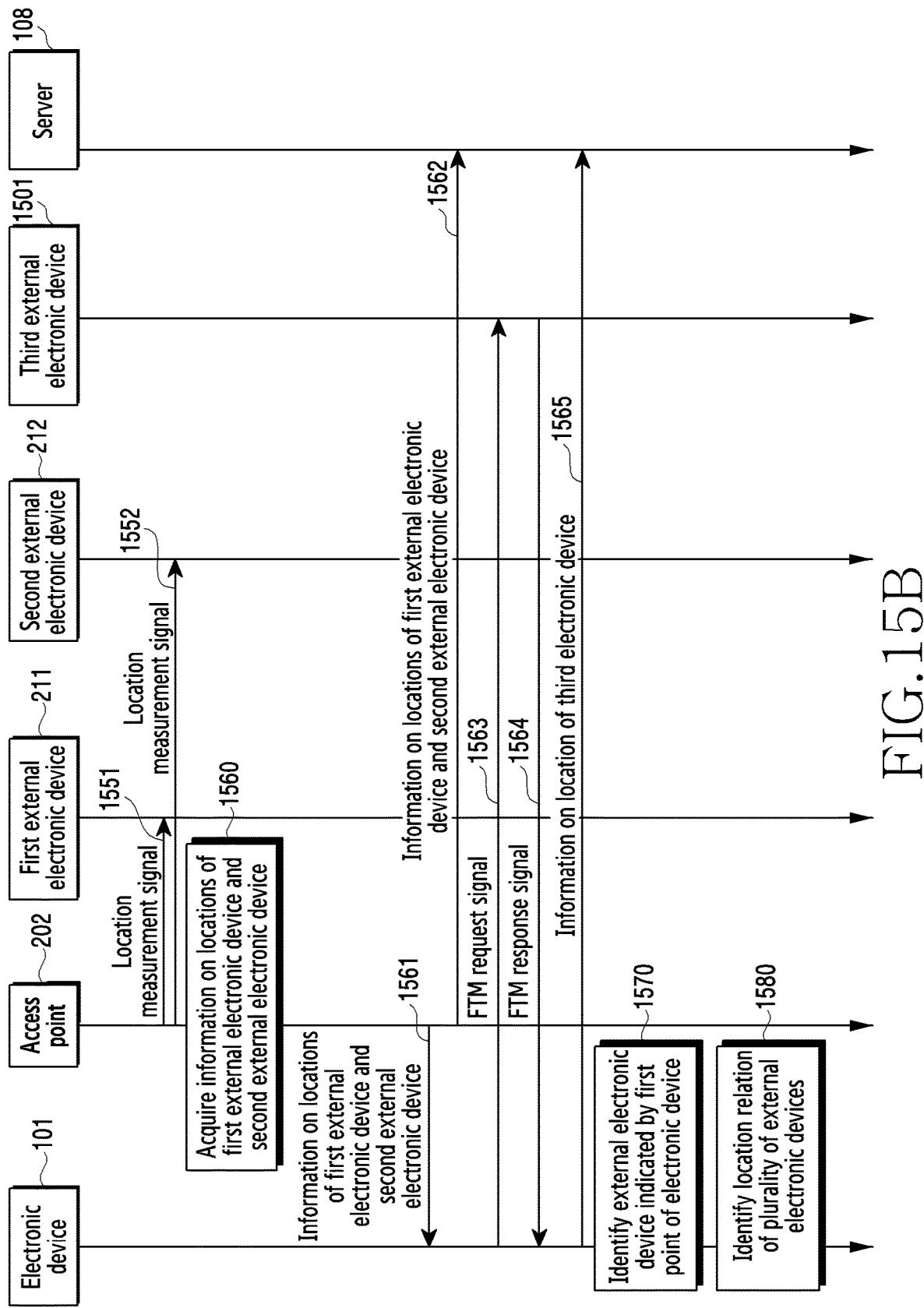
FIG. 15B illustrates another example of a signal flow for, in an electronic device, identifying a location relation of a plurality of external electronic devices, according to various embodiments.

FIG. 15B illustrates another example of a signal flow for, in an electronic device 101, identifying a location relation of a plurality of external electronic devices 210, according to various embodiments.

Referring to FIG. 15B, an electronic device 101 may be connected to an access point 202. A first external electronic device 211, a second external electronic device 212, an access point 202, and an electronic device 101 may compose a local network. A third external electronic device 1501 may not compose a local network. A local network may correspond to a network connected in an ultrahigh frequency band. In case of ultrahigh band communication (for example: millimeter wave (mmWave) communication or wireless gigabit alliance (WiGig)), an electronic device 101 may perform a beam sweeping process on designated sectors (for example: sixteen) and determine a sector having the best communication performance (for example: a best sector) via the beam sweeping process to determine a direction of a beam to be transmitted to an external electronic device (for example: a first external electronic device 211 and a second external electronic device 212). For example, a beam sweeping process may include an operation in which an electronic device 101 transmits a beam to each sector designated for an external electronic device, an operation in which an external electronic device determines, based on a communication state of a received beam for each sector, a beam of a sector having the best performance and transmits the beam to an electronic device 101, and an operation in which an electronic device 101 estimates, based on a determined sector, a direction between an external electronic device and the electronic device 101.

In operation 1551, an access point 202 (for example: a processor 501 of an access point 202) may transmit a location measurement signal through a beam to a first external electronic device 211 in ultrahigh frequency band communication. A first external electronic device 211 may receive a location measurement signal through a beam.

In operation 1552, an access point 202 may transmit a location measurement signal through a beam to a second external electronic device 212 in ultrahigh frequency band communication. A second external electronic device 212 may receive a location measurement signal through a beam from an access point 202.

An access point 202 may acquire, through a beam, information on at least one among a distance or a direction of a first external electronic device 211, information on at least one among a distance or a direction of a second external electronic device 212, or information on a device ID.

In operation 1560, an access point 202 may acquire information on locations of a first external electronic device 211 and a second external electronic device 212. Operation 1560 may be implemented identically or similarly to operation 1520 of FIG. 15A.

In operation 1561, an access point 202 may transmit information on a location relation of a first external electronic device 211 and a second external electronic device 212 to an electronic device 101. An electronic device 101 may receive information on a location relation of a first external electronic device 211 and a second external electronic device 212 from an access point 202. Operation 1561 may be implemented identically or similarly to operation 1521 of FIG. 15A.

In operation 1562, an access point 202 may transmit information on a location relation of a first external electronic device 211 and a second external electronic device 212 to a server 108. A server 108 may receive information on a location relation of a first external electronic device 211 and a second external electronic device 212 from an access point 202. Operation 1562 may be implemented identically or similarly to operation 1522 of FIG. 15A.

In operation 1563, an electronic device 101 (for example: a processor 120 of an electronic device 101) may transmit, to a third external electronic device 1501, an FTM request signal to acquire information on a location of the third external electronic device 1501. A third external electronic device 1501 may receive an FTM request signal from an electronic device 101. Operation 1563 may be implemented identically or similarly to operation 1523 of FIG. 15A.

In operation 1564, a third external electronic device 1501 may transmit an FTM response signal to an electronic device 101. An electronic device 101 may receive an FTM response signal from a third external electronic device 1501. Operation 1564 may be implemented identically or similarly to operation 1524 of FIG. 15A.

In operation 1565, an electronic device 101 may transmit information on a location of a third external electronic device 1501 to a server 108. A server 108 may receive information on a location of a third external electronic device 1501 from an electronic device 101. Operation 1565 may be implemented identically or similarly to operation 1525 of FIG. 15A.

In operation 1570, an electronic device 101 may confirm at least one external electronic device located in an area corresponding to a direction which a first point of the electronic device 101 faces. An example of a method for identifying at least one external electronic device located in an area corresponding to a direction which a first point of an electronic device 101 faces will be described later in FIG. 19. According to an embodiment, a method for identifying at least one external electronic device located in an area corresponding to a direction which a first point of an electronic device 101 faces may be implemented via various methods in addition to a method illustrated in FIG. 19. Operation 1570 may be implemented identically or similarly to operation 1530 of FIG. 15A.

In operation 1580, an electronic device 101 may identify a location relation of a first external electronic device 211, a second external electronic device 212, and a third external electronic device 1501 with reference to at least one external electronic device located in an area corresponding to a direction which a first point of the electronic device 101 faces. Operation 1580 may be implemented identically or similarly to operation 1540 of FIG. 15A.

Figure 16:
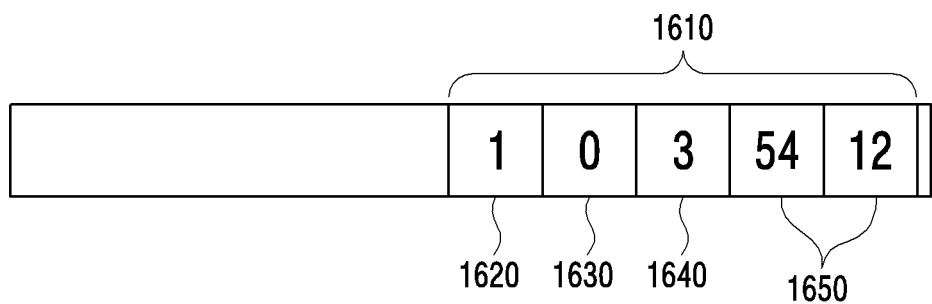
FIG. 16 illustrates an example of a packet transmitted from an external electronic device which is not registered, according to various embodiments.

FIG. 16 illustrates an example of a packet transmitted from an external electronic device which is not registered, according to various embodiments.

Referring to FIG. 16, a packet illustrated in FIG. 16 may include a reserved field 1610. A reserved field 1610 may include information 1620 on a manufacturer name, information 1630 on a device type, information 1640 on a model name, and information 1650 on a function.

In various embodiments, an access point 202 (for example: a processor 501 of an access point 202) may receive a signal related to an external electronic device which is not registered. Even in case that an external electronic device (for example: a first external electronic device 211) uses a manufacturer-specific (vendor-specific) protocol, an access point 202 may acquire information on the external electronic device. For example, identification information of an external electronic device may be displayed by arbitrarily designating a value in a reserved field of a packet of a well-known band such as Bluetooth or Wi-Fi. An external electronic device may transmit the packet together when a discovery signal is transmitted. Accordingly, an external electronic device may transmit information on the type, the name, or the function of an external electronic device together to an access point 202.

In various embodiments, an external electronic device (for example: a first external electronic device 211) may not support transmission of a packet illustrated in FIG. 16. Even in case that an external electronic device may not transmit a packet indicating identification information of the external electronic device, the external electronic device may compose a reserved field including identification information of the external electronic device via software update. For example, in case that an external electronic device does not have a hardware requirement for distance and direction measurement, the external electronic device may define, in a software manner, requirements such as an FTM protocol for distance and direction measurement and a rule set for discovery signal transmission. An external electronic device may operate in relation to distance or direction measurement, via update of software of the external electronic device. For another example, an external electronic device designed not to be able to acquire information on a distance and a direction may operate in relation to distance or direction measurement, via software update or firmware update for distance or direction measurement. For another example, an external electronic device which does not broadcast a signal may transmit a discovery signal when a specific signal is received via firmware update including a user-defined protocol designed to be able to transmit location information. Via the firmware update, an external electronic device may transmit an FTM response signal in response to an FTM request signal.

Figure 17:
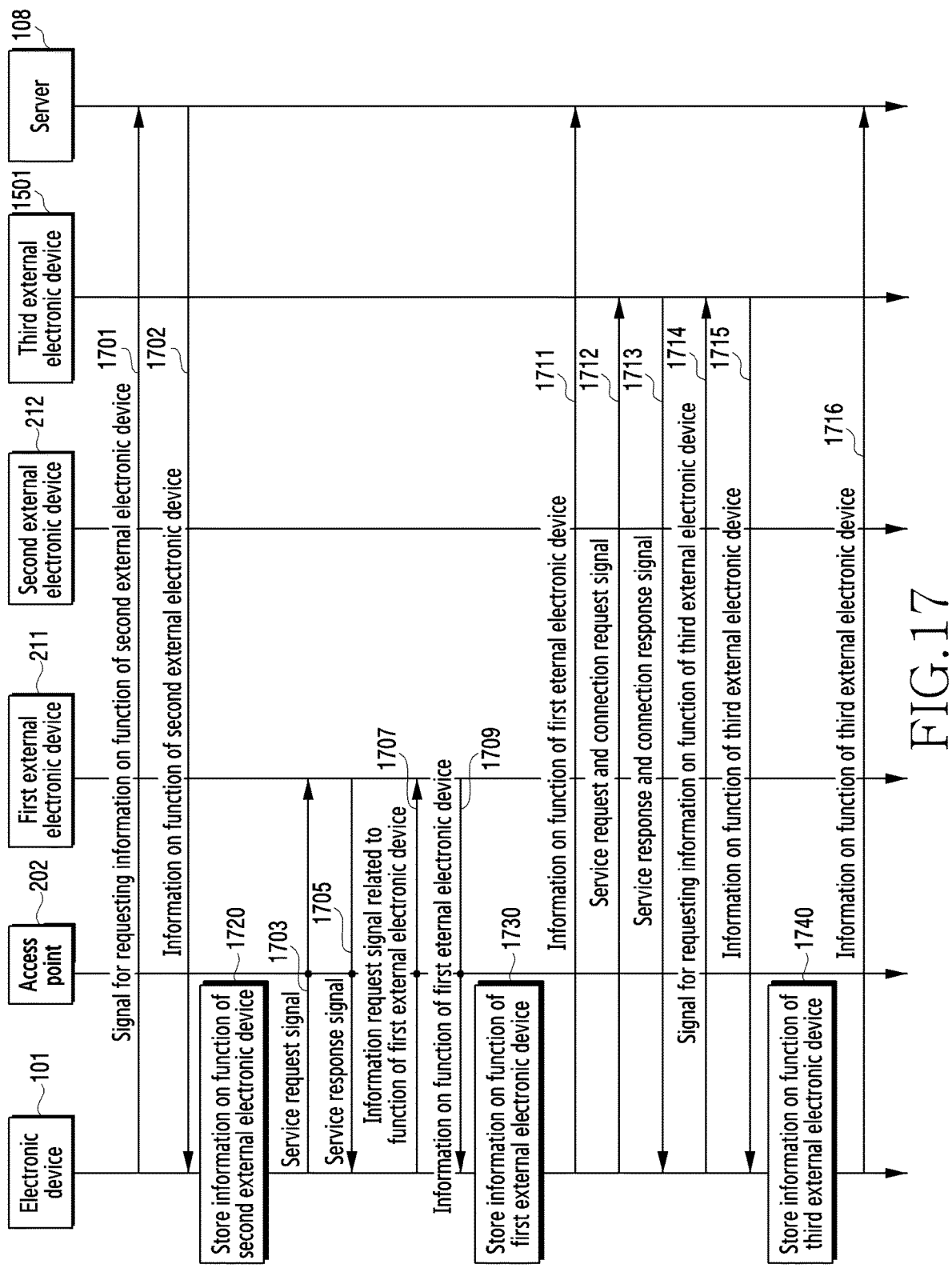
FIG. 17 illustrates an example of a signal flow for, in an electronic device, identifying functions of a plurality of external electronic devices, according to various embodiments.

FIG. 17 illustrates an example of a signal flow for, in an electronic device 101, identifying functions of a plurality of external electronic devices 210, according to various embodiments.

Referring to FIG. 17, an electronic device 101 may be connected to an access point 202. A first external electronic device 211, a second external electronic device 212, an access point 202, and an electronic device 101 may compose a local network. A third external electronic device 1501 may not compose a local network. A second external electronic device 212 may be an electronic device registered in an account of an electronic device 101. A first external electronic device 211 may be an electronic device which is not registered in an account of an electronic device 101.

In operation 1701, an electronic device 101 (for example: a processor 120 of an electronic device 101) may transmit an information request signal related to a function of a second external electronic device 212 registered in an account to a server 108. Information on a function may include at least a part of information on whether or not a device is an input device, whether or not a screen output function is performed, or whether or not a sound output function is performed, or information on a connection protocol. Based on a predesignated protocol, an electronic device 101 may transmit an information request signal related to the function. For example, a designated protocol may be a separate protocol designated by a manufacturer or a protocol based on an open connectivity foundation (OCF). A server 108 (for example: a processor 720 of a server 108) may receive an information request signal related to a function of a second external electronic device 212.

In operation 1702, a server 108 may transmit information on a function of a second external electronic device 212 to an electronic device 101. An electronic device 101 may receive information on a function of a second external electronic device 212 registered in an account from a server 108.

In operation 1720, an electronic device 101 may store received information on a function of a second external electronic device 212 in a memory 130 of the electronic device 101. An electronic device 101 may store received information on a function of a second external electronic device 212 in a profile form.

In operation 1703, an electronic device 101 may transmit a service request signal to a first external electronic device 211 through an access point 202. A first external electronic device 211 may receive a service request signal from an electronic device 101. According to an embodiment, a first electronic device 211 may transmit the service request signal via a broadcasting scheme. The service request signal may be transmitted directly to a first external electronic device 211 without passing through an access point 202.

In various embodiments, an access point 202 (for example: a processor 501 of an access point 202) may process a signal received from an electronic device 101 or a first external electronic device 211 and transmit the processed signal to the electronic device 101 or the first external electronic device 211.

In operation 1705, a first external electronic device 211 may transmit a service response signal to an electronic device 101 through an access point 202. An access point 202 may receive a service response signal received from a first external electronic device 211. In various embodiments, a first external electronic device 211 may directly transmit a service response signal to an electronic device 101 without passing through an access point 202. In various embodiments, an access point 202 may process a service response signal received from a first external electronic device 211 and transmit the processed signal to an electronic device 101. An electronic device 101 may confirm that a first external electronic device 211 may be interlocked with an electronic device 101, based on reception of the service response signal.

In operation 1707, an electronic device 101 may transmit an information request signal related to a function of a first external electronic device 211 to a first external electronic device 211 through an access point 202. A first external electronic device 211 may receive an information request signal related to a function of a first external electronic device 211 from an electronic device 101. In various embodiments, an electronic device 101 may directly transmit an information request signal related to a function of a first external electronic device 211 to a first external electronic device 211 without passing through an access point 202.

In operation 1709, a first external electronic device 211 may transmit information on a function of a first external electronic device 211 to an electronic device 101 through an access point 202. An electronic device 101 may receive information on a function of a first external electronic device 211 from an access point 202. In various embodiments, a first external electronic device 211 may directly transmit information on a function of a first external electronic device 211 to an electronic device 101 without passing through an access point 202.

In operation 1730, an electronic device 101 may store received information on a function of a first external electronic device 211 in a memory 130 of the electronic device 101. An electronic device 101 may store received information on a function of a first external electronic device 211 in a profile form.

In operation 1711, an electronic device 101 may transmit received information on a function of a first external electronic device 211 to a server 108. A server 108 may receive information on a function of a first external electronic device 211. An electronic device 101 may upload or synchronize information on a function of a first external electronic device 211 to or with a server 108.

In operation 1712, an electronic device 101 may transmit a service request signal and a connection request signal to a third external electronic device 1501. A third external electronic device 1501 may receive a service request signal and a connection request signal from an electronic device 101. In various embodiments, a third external electronic device 1501 may use a manufacturer-specific (vendor-specific) protocol. The connection request signal may include a packet for establishing connection. The packet may correspond to a packet according to FIG. 16.

In operation 1713, a third external electronic device 1501 may transmit a service response signal and a connection response signal to an electronic device 101. An electronic device 101 may receive a service response signal and a connection response signal. An electronic device 101 may establish connection to a third external electronic device 1501 through a transmitted connection response signal. Based on connection, an electronic device 101 and a third external electronic device 1501 may exchange data.

In operation 1714, an electronic device 101 may transmit an information request signal related to a function of a third external electronic device 1501 to the third external electronic device 1501. A third external electronic device 1501 may receive an information request signal related to a function of a third external electronic device 1501 from an electronic device 101.

In operation 1715, a third external electronic device 1501 may transmit information on a function of a third external electronic device 1501 to an electronic device 101. An electronic device 101 may receive information on a function of a third external electronic device 1501 from the third external electronic device 1501.

In operation 1740, an electronic device 101 may store information on a function of a third external electronic device 1501 in a memory 130 of the electronic device 101. An electronic device 101 may store received information on a function of a third electronic device in a profile form.

In operation 1716, an electronic device 101 may transmit received information on a function of a third external electronic device 1501 to a server 108. A server 108 may receive information on a function of a third external electronic device 1501. An electronic device 101 may upload or synchronize information on a function of a third external electronic device 1501 to or with a server 108.

Figure 18:
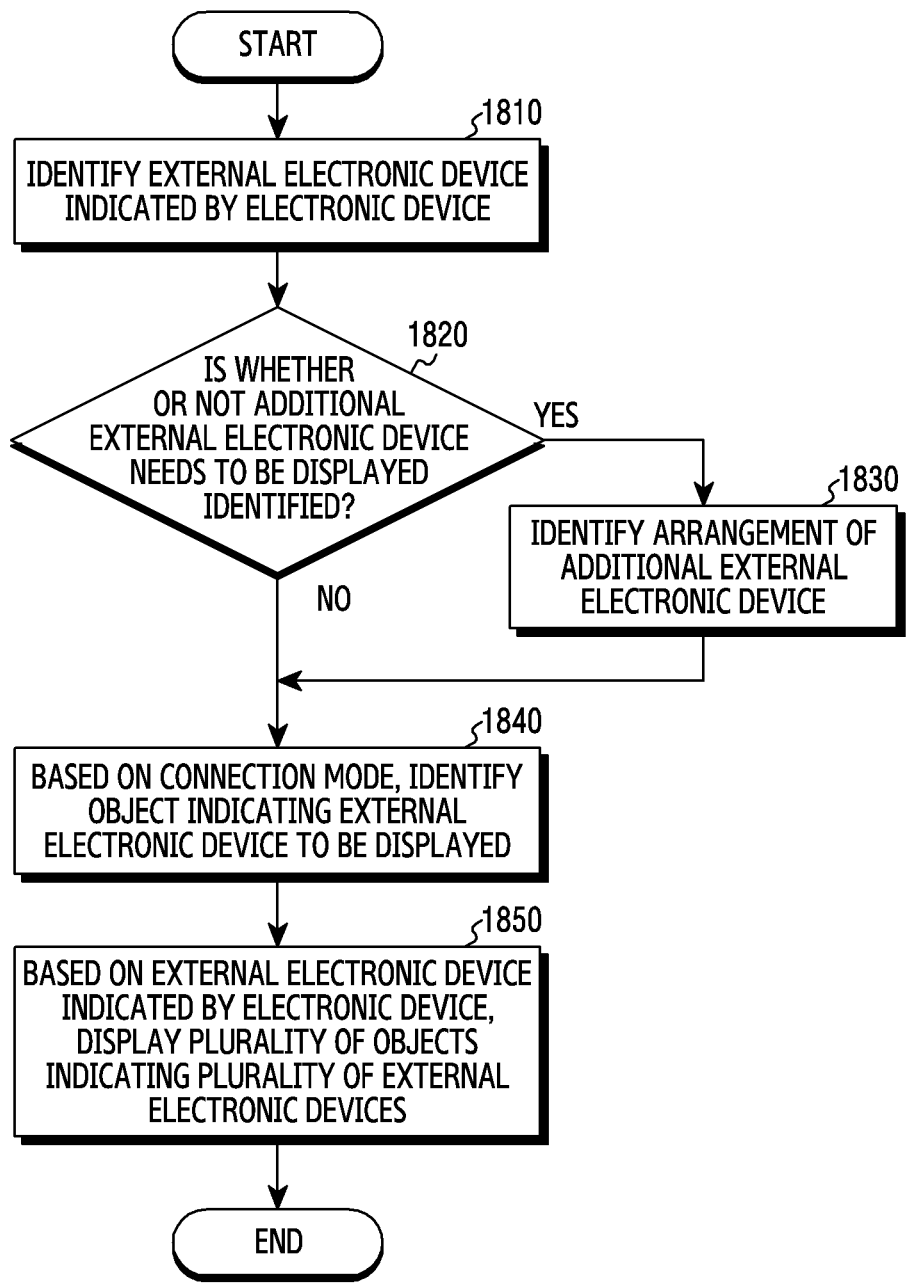
FIG. 18 illustrates an example of an operation for, in an electronic device, displaying a plurality of objects indicating a plurality of external electronic devices, according to various embodiments.

FIG. 18 illustrates an example of an operation for, in an electronic device 101, displaying a plurality of objects indicating a plurality of external electronic devices 210, according to various embodiments.

Referring to FIG. 18, in operation 1810, a processor 120 of an electronic device 101 may identify at least one external electronic device located in an area corresponding to a direction which a first point of the electronic device 101 faces. At least one external electronic device located in an area corresponding to a direction which a first point of an electronic device 101 faces will be described later in FIG. 19.

In operation 1820, a processor 120 may determine whether or not it is necessary to additionally display an external electronic device, based on an input mode received from a user. For example, in case that it is necessary to additionally display an external electronic device, a processor 120 may perform operation 1830. For another example, in case that it is not necessary to additionally display an external electronic device, a processor 120 may perform operation 1850.

In operation 1830, a processor 120 may identify arrangement of an additional external electronic device which is not connected to an electronic device 101 or an access point 202. A processor 120 may identify arrangement of an external electronic device which is not connected to an electronic device 101 or an access point 202 but which may perform an operation related to a connection mode, based on a connection mode. A processor 120 may identify arrangement of an external electronic device which is a device connected to an electronic device 101 or an access point 202 in advance but which may perform an operation related to a connection mode in which a current signal is not received. For example, in case that a connection mode is a file sharing operation, a processor 120 may identify that a notebook computer which may perform a file sharing operation corresponds to an additional external electronic device although the notebook computer is not currently connected to an electronic device 101. A processor 120 may identify arrangement of a notebook computer via a server 108 or an access point 202. A processor 120 may additionally display an object indicating a notebook on an electronic device 101.

In operation 1840, a processor 120 may identify an object indicating an external electronic device to be displayed on an electronic device 101, based on a connection mode. For example, in case that a connection mode corresponds to file sharing, a processor 120 may exclude an object indicating an external electronic device (for example: an IoT bulb or an oven) which may not perform a file sharing operation, not to display the object. For another example, a processor 120 may display an object indicating an external electronic device which may not perform an operation related to file sharing.

In operation 1850, a processor 120 may display a plurality of objects indicating a plurality of external electronic devices 210, based on at least one external electronic device located in an area corresponding to a direction which a first point of an electronic device 101 faces. For example, based on information on a location relation of a plurality of external electronic devices 210, a processor 120 may acquire second data related to a location relation of the plurality of external electronic devices with reference to at least one external electronic device located in an area corresponding to a direction which a first point of an electronic device 101 faces. A processor 120 may display a plurality of objects indicating an external electronic device, the objects being arranged based on the second data.

Figure 19:
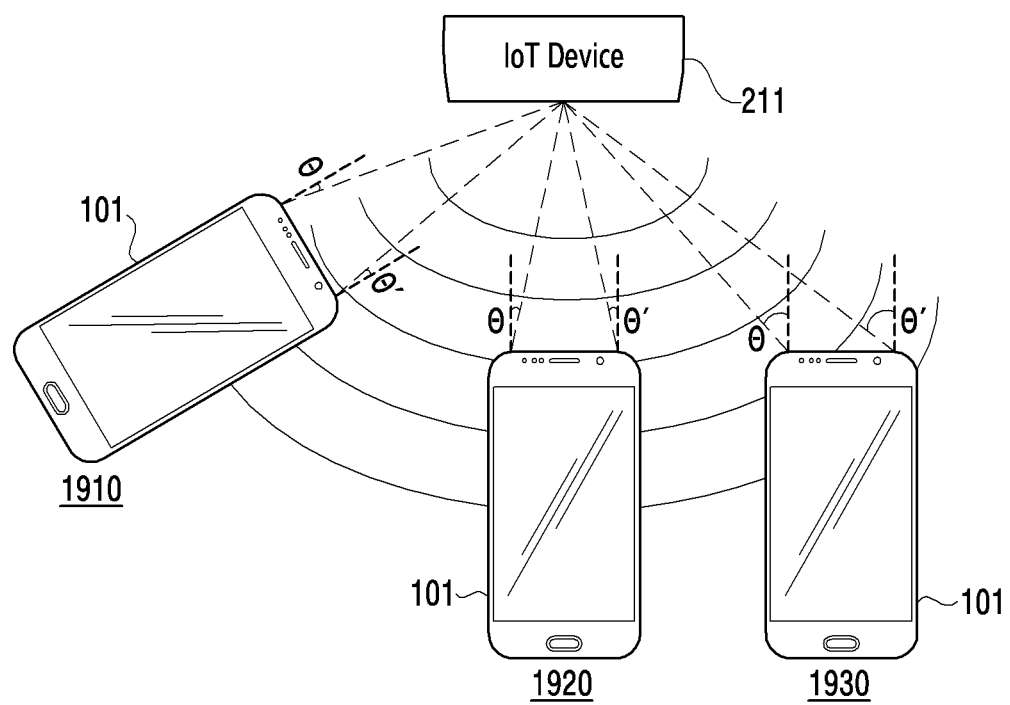
FIG. 19 explains an example of a method for identifying at least one external electronic device located in an area corresponding to a direction which a first point of an electronic device faces, according to various embodiments.

FIG. 19 explains an example of a method for identifying at least one external electronic device located in an area corresponding to a direction which a first point of an electronic device 101 faces, according to various embodiments;

Referring to FIG. 19, an electronic device 101 may include a plurality of antennas. A signal feature extraction module 420 may compare phase values of signals received through a plurality of antennas. A signal feature extraction module 420 may transmit the compared phase values to a device determination module 440. A device determination module 440 may determine a location of an external electronic device, based on the compared phase values. In addition, an electronic device 101 may process signals for a plurality of external electronic devices 210 through a plurality of antennas. Accordingly, an electronic device 101 may determine a location relation of a plurality of external electronic devices 210. For example, an electronic device 101 (for example: a processor 120 of an electronic device 101) may receive information on a distance and a direction of a plurality of external electronic devices 210 from an access point 202. An electronic device 101 may identify at least one external electronic device located in an area corresponding to a direction which a first point of an electronic device 101 faces. An electronic device 101 may determine a location of a plurality of external electronic devices 210 with reference to at least one external electronic device located in an area corresponding to a direction which a first point of an electronic device 101 faces.

In various embodiments, an electronic device 101 may identify at least one external electronic device located in an area corresponding to a direction which a first point of an electronic device 101 faces, based on a phase difference and signal strength of RF signals received using a plurality of antennas. An electronic device 101 may receive RF signals broadcasted by a first external electronic device 211 by using a first antenna and a second antenna, respectively. In case that a phase difference of a first RF signal received through a first antenna and a second RF signal received through a second antenna is 0, the first external electronic device 211 may be identified as at least one external electronic device located in an area corresponding to a direction which a first point of an electronic device 101 faces. Otherwise, in case that a phase difference between the first RF signal and the second RF signal is equal to or smaller than a preconfigured value, an electronic device 101 may identify the first external electronic device 211 as at least one external electronic device located in an area corresponding to a direction which a first point of an electronic device 101 faces. For example, in case that a phase difference is within 0.05 radian, an electronic device 101 may identify the first external electronic device 211 as at least one external electronic device located in an area corresponding to a direction which a first point of an electronic device 101 faces.

In various embodiments, an electronic device 101 may include two antennas on both opposite sides of an electronic device 101. A first external electronic device 211 may broadcast a signal. In case of an electronic device 101 in a first state 1910, a phase difference of a first signal received through a first antenna at a left side of the electronic device 101 and a second signal received through a second antenna at a right side of the electronic device 101 may be 0 or may be equal to or smaller than a preconfigured value. Accordingly, an electronic device 101 in a first state 1910 may identify that at least one external electronic device located in an area corresponding to a direction which a first point of the electronic device 101 faces is the first external electronic device 211. According to another embodiment, an electronic device 101 in a second state 1920 may identify that at least one external electronic device located in an area corresponding to a direction which a first point of an electronic device 101 faces is the first external electronic device 211.

In various embodiments, in case of an electronic device 101 in a third state 1930, a first signal received through a first antenna at a left side of an electronic device 101 and a second signal received through a second antenna at a right side of the electronic device 101 may be larger than a preconfigured value. Accordingly, an electronic device 101 in a third state 1930 may identify that at least one external electronic device located in an area corresponding to a direction which a first point of an electronic device 101 faces is not the first external electronic device 211.

In various embodiments, before an electronic device 101 transmits a signal requesting for first data indicating a location relation of a plurality of external electronic devices 210 to an access point 202, at least one external electronic device located in an area corresponding to a direction which a first point of the electronic device 101 faces may be designated as an access point 202. In case of receiving first data related to a location relation of a plurality of external electronic devices 210 through the designated access point 202, an electronic device 101 may reduce a time required to acquire second data. Accordingly, an electronic device 101 may reduce a time required for screen display and perform a rapid response.

In various embodiments, identification of at least one external electronic device located in an area corresponding to a direction which a first point of an electronic device 101 faces may be performed through a device determination module 440 inside a processor 120. A device determination module 440 may identify at least one external electronic located in an area corresponding to a direction which a first point of an electronic device 101 faces by using information other than phase difference information input from a signal feature extraction module 420. For example, via antenna location information stored in an electronic device 101 and various pieces of sensor information received from a sensor information input module 450, the electronic device 101 may identify at least one external electronic device located in an area corresponding to a direction which a first point of the electronic device 101 faces. A device determination module 440 may combine information other than phase difference information with phase difference information received from a phase difference calculation module and finally acquire weighted value phase difference information. In various embodiments, a device determination module 440 may identify at least one external electronic device located in an area corresponding to a direction which a first point of an electronic device 101 faces, based on weighted value phase difference information.

In various embodiments, a device determination module 440 may acquire weighted value phase difference information, based on the characteristic of an RF signal received from a signal feature extraction module 420. A device determination module 440 may use the weighted value phase difference information to identify at least one external electronic device located in an area corresponding to a direction which a first point of an electronic device 101 faces.

In various embodiments, each of a plurality of external electronic devices 210 may identify whether or not an electronic device 101 is located in an area corresponding to a direction which a first point of each of the plurality of external electronic devices 210 faces. For example, a first external electronic device 211 may identify whether or not an electronic device 101 is located in an area corresponding to a direction which a first point of the first external electronic device 211 faces. A first external electronic device 211 may transmit, to an electronic device 101, information that the electronic device 101 is located in an area corresponding to a direction which a first point of the first external electronic device 211 faces. Based on the information, an electronic device 101 may identify that at least one external electronic device located in an area corresponding to a direction which a first point of an electronic device 101 faces is a first external electronic device 211. An operation in which each of a plurality of external electronic devices 210 identifies whether or not an electronic device 101 is located in an area corresponding to a direction which a first point of each of the plurality of external electronic devices 210 faces and an operation in which an electronic device 101 identifies at least one external electronic device located in an area corresponding to a direction which a first point of the electronic device 101 faces may be performed simultaneously or may be performed independently.

Figure 20:
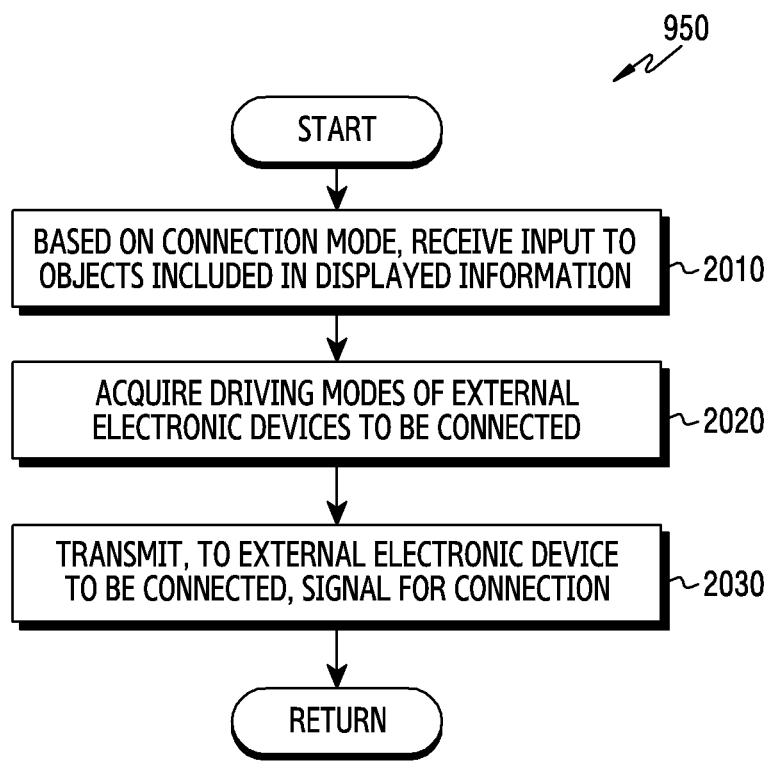
FIG. 20 illustrates an example of an operation for, in an electronic device, transmitting, to at least one external electronic device, a signal for connection, according to various embodiments.

FIG. 20 illustrates an example of an operation for, in an electronic device 101, transmitting, to at least one external electronic device, a signal for connection, according to various embodiments. Operation 2010 to operation 2030 of FIG. 20 may be related to operation 950 of FIG. 9.

Referring to FIG. 20, in operation 2010, a processor 120 of an electronic device 101 may receive an input for objects included in displayed information, based on a connection mode. For example, an electronic device 101 may receive an input (for example: a touch input or a voice input) from a user through an input device 150. In various embodiments, a processor 120 may receive an input for objects indicating a plurality of external electronic devices 210 to be connected.

In operation 2020, a processor 120 may acquire driving modes of external electronic devices to be connected. In various embodiments, a processor 120 may acquire driving modes of external electronic devices to be connected, based on a connection mode. A processor 120 may determine a connection method of external electronic devices to be connected. A processor 120 may identify necessary or unnecessary connection according to driving modes of external electronic devices to be connected. Based on the identification, a processor 120 may determine a connection method of external electronic devices to be connected, excluding unnecessary connection. For example, an external electronic device to be connected may be a notebook computer, a monitor, or a speaker. A connection mode of an electronic device 101 may be image playback. Accordingly, a processor 120 may determine a connection method of a laptop, monitor, and speaker for image playback. For example, a processor 120 may determine connection of a notebook computer and a monitor to provide information on an image from the notebook computer to the monitor. For another example, a processor 120 may determine connection of a notebook computer and a monitor to provide information on sound from the notebook computer to a speaker. A processor 120 may not perform connection of a monitor and a speaker, which is connection unnecessary for image playback in a connection mode.

In operation 2030, a processor 120 may transmit, to at least one external electronic device to be connected, a signal for connection. The signal may be transmitted directly to at least one external electronic device to be connected. The signal may also be transmitted through an access point 202 to which an external electronic device to be connected is connected.

Figure 21:
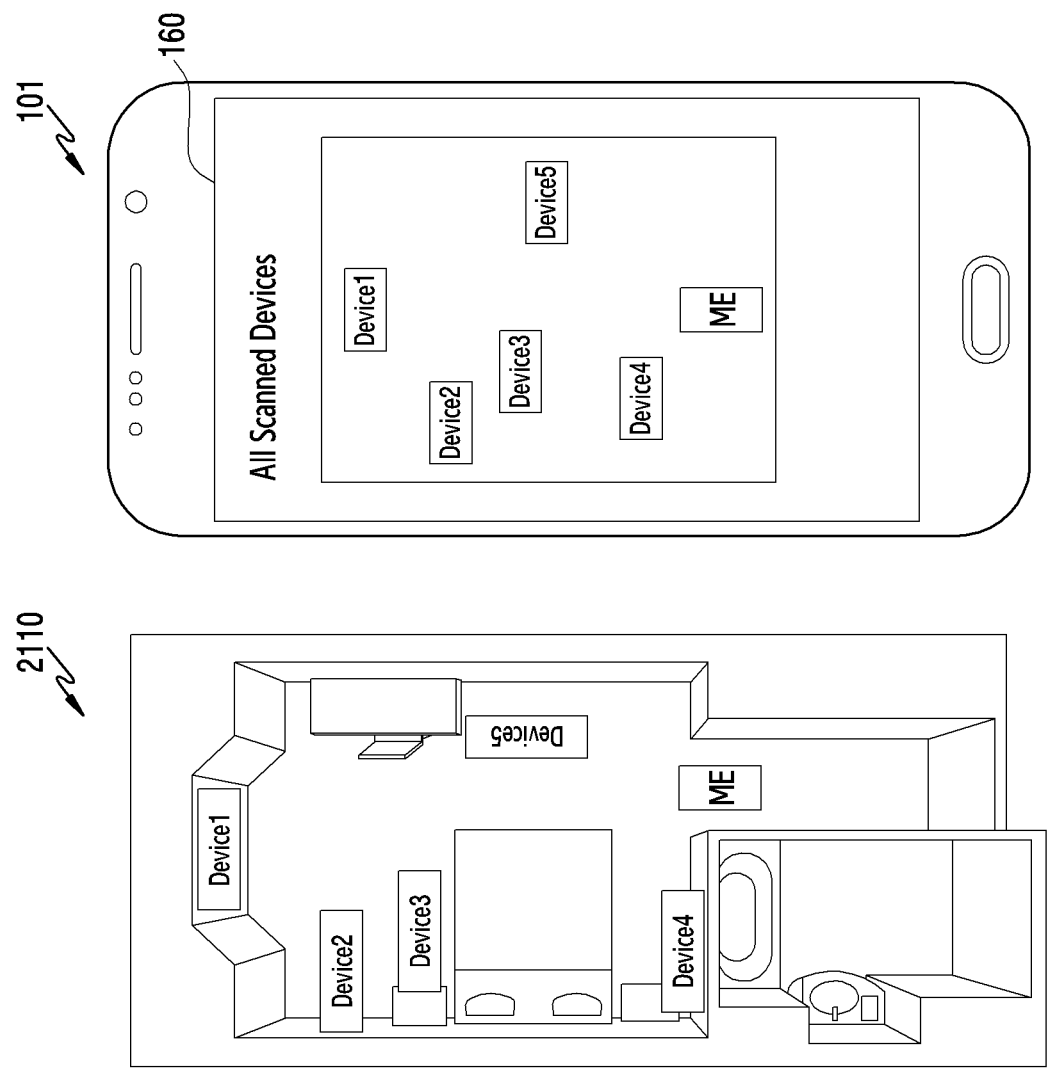
FIG. 21 explains an example of a method for, in an electronic device, displaying an object indicating an external electronic device, according to various embodiments.

FIG. 21 explains an example of a method for, in an electronic device 101, displaying an object indicating an external electronic device, according to various embodiments Referring to FIG. 21, based on first data related to a location relation of at least one external electronic device received from an access point 202, a processor 120 of an electronic device 101 may acquire second data related to a location relation of at least one external electronic device located in an area corresponding to a direction which a first point of the electronic device faces. A processor 120 may arrange an object indicating at least one external electronic device located in an area corresponding to a direction which a first point of an electronic device 101 faces such that the object is located at the center of the upper end of a screen.

In various embodiments, an electronic device 101 or a server 108 may store information on an environment 2110 including an electronic device 101, an access point 202, or a plurality of external electronic devices 210 in a memory (for example: a memory 130 or a memory 710). An electronic device 101 may request the information on the environment 2110 from a server 108. An electronic device 101 may receive the information on the environment 2110 from a server 108. The information on the environment 2110 may include information on a plane view 2120 indicating a physical environment of a width or a breadth. Objects indicating an electronic device 101, an access point 202, and a plurality of external electronic devices 210 may be arranged based on location information on the plane view 2120 indicating an environment. According to an embodiment, the objects may be arranged to be proportional to an actual distance, based on the size of a display area of an electronic device 101 in a plane view 2120. In various embodiments, for a tap or drag input, an electronic device 101 may display a plane view 2120 on a display device 160, based on the size of a display area of an electronic device 101. In various embodiments, an electronic device 101 may change the size of a plane view. On a display device 160, an electronic device 101 may display, as a plane view 2120 including the objects in the electronic device 101, a structure of an environment estimated based on a location of a plurality of external electronic devices 210.

Figure 22A:
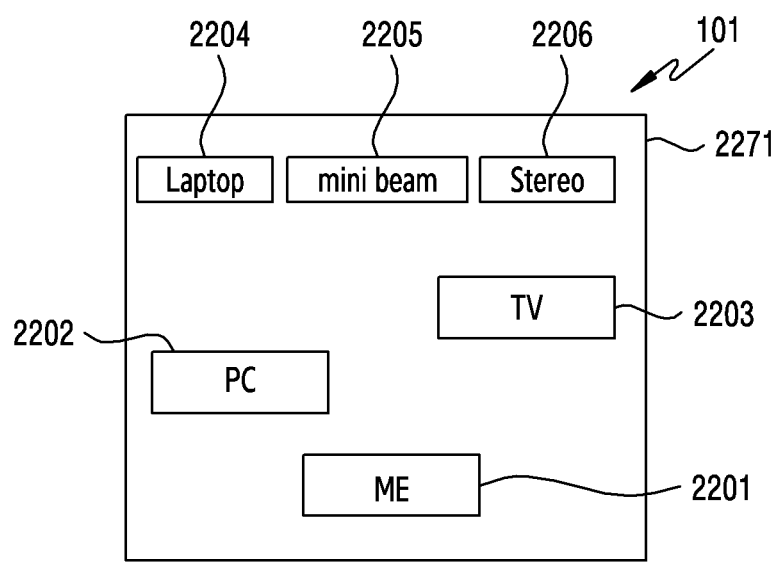
FIG. 22A explains another example of a method for, in an electronic device, displaying an object indicating an external electronic device, according to various embodiments.

FIG. 22A explains another example of a method for, in an electronic device 101, displaying an object indicating an external electronic device, according to various embodiments.

Referring to FIG. 22A, an electronic device 101 (for example: a processor 120 of an electronic device 101) may perform control to display, on a display device 160 of the electronic device 101, a screen 2271 including objects (for example: an object 2202, an object 2203, an object 2204, an object 2205, and an object 2206) indicating a plurality of external electronic devices 210, based on a location relation of a plurality of external electronic devices 210.

For example, an object 2201 indicating an electronic device 101 is arranged at the lower end of a screen 2271 or at the center of the screen 2271, and based thereon, the electronic device 101 may arrange a plurality of objects (for example: an object 2202, an object 2203 an object 2204, an object 2205, and an object 2206) indicating a plurality of external electronic devices 210. Based on information on a location relation of an electronic device 101 and a plurality of electronic devices 110 and information on an environment (for example: an environment 2110) in which corresponding electronic devices are arranged, an electronic device may display a plurality of objects on a screen 2271 to be proportional to a space and a distance. An electronic device 101 may differently configure and display the sizes and colors of a plurality of objects indicating a plurality of external electronic devices 210. For another example, an electronic device 101 may display a plurality of objects indicating a plurality of external electronic devices 210 as objects indicating the shapes of the plurality of external electronic devices 210, respectively.

Figure 22B:
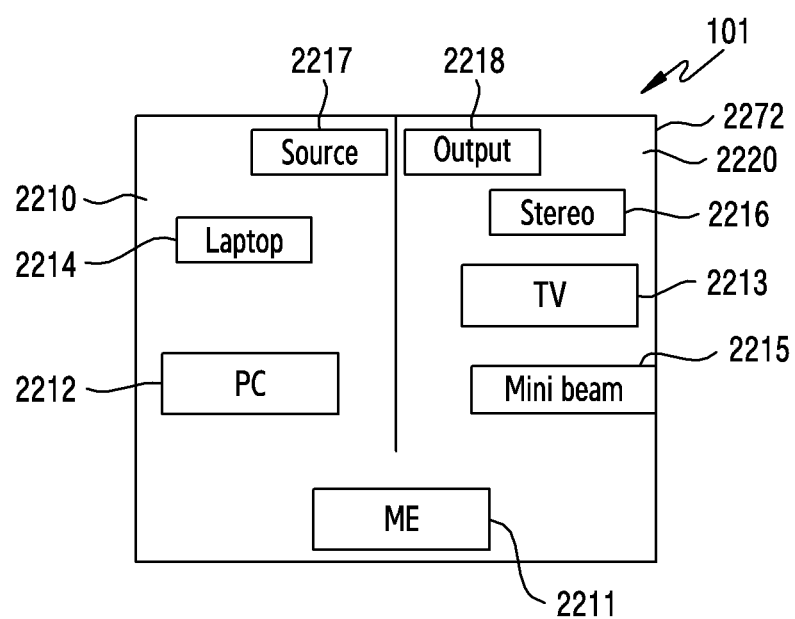
FIG. 22B explains still another example of a method for, in an electronic device, displaying an object indicating an external electronic device, according to various embodiments.

FIG. 22B explains still another example of a method for, in an electronic device 101, displaying an object indicating an external electronic device, according to various embodiments.

Referring to FIG. 22B, an electronic device 101 (for example: a processor 120 of an electronic device 101) may control objects indicating a plurality of external electronic devices 210 such that the objects are divided into a source device and an output device and that a screen 2272 is displayed on a display device 160. An electronic device 101 may identify whether or not a plurality of external electronic devices 210 are source devices or output devices, based on information on the attributes of the plurality of external electronic devices. Based on the identification, an electronic device 101 may display, dividedly as a source device and an output device, objects (for example: an object 2212, an object 2213, an object 2214, an object 2215, and an object 2216) indicating a plurality of external electronic devices 210.

For example, an electronic device 101 may display an object 2211 indicating the electronic device 101 on the lower end of a screen 2272 or on the center of the screen 2272. A first area 2210 may be an area in which an object indicating a source device is displayed. A second area 2220 may be an area in which an object indicating an output device is displayed. An object 2217 indicating a source device may be displayed at the upper end of a first area 2210. An object 2218 indicating an output device may be displayed at the upper end of a second area 2220. An object 2217 indicating a source device or an object 2218 indicating an output device does not always have to be displayed at the upper end of an area. According to various embodiments, an electronic device 101 may arrange a plurality of objects indicating a plurality of electronic devices 110 in various locations and may not display the objects.

Figure 22C:
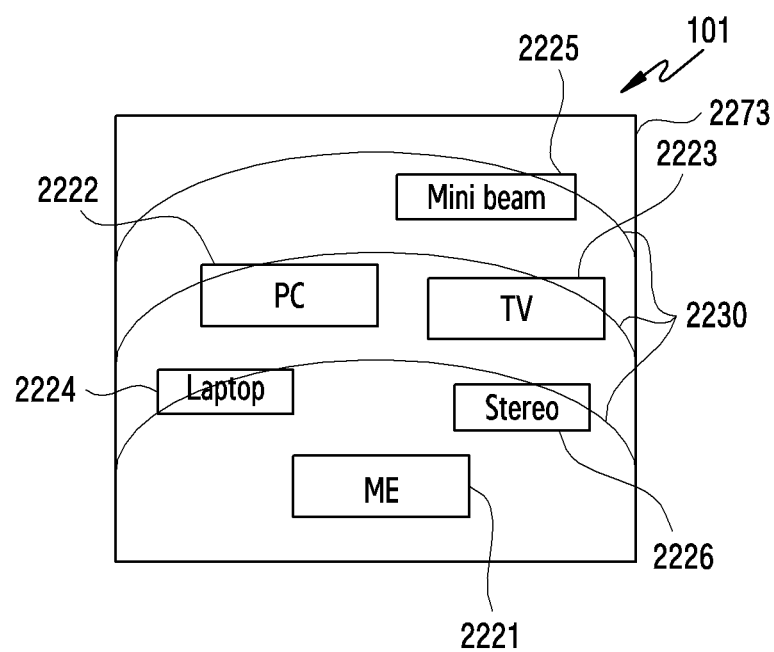
FIG. 22C explains still another example of a method for, in an electronic device, displaying an object indicating an external electronic device, according to various embodiments.

FIG. 22C explains still another example of a method for, in an electronic device 101, displaying an object indicating an external electronic device, according to various embodiments.

Referring to FIG. 22C, an electronic device 101 (for example: a processor 120 of an electronic device 101) may perform control to display, on a display device 160, a screen 2273 in which objects (for example: an object 2222, an object 2223, an object 2224, an object 2225, and an object 2226) indicating a plurality of external electronic devices 210 are arranged according to signal strength received from the plurality of external electronic devices 210. An electronic device 101 may display an object 2221 indicating an electronic device 101 on the lower end of a screen 2273 or on the center of the screen 2273. An electronic device 101 may detect strength of a signal received from a plurality of external electronic devices 210 through a communication module 190. An electronic device 110 may display objects (for example: an object 2222, an object 2223, an object 2224, an object 2225, and an object 2226) indicating a plurality of external electronic devices 210, based on detected strength of a signal. For example, an electronic device 101 may acquire information on a virtual location relation of a plurality of external electronic devices 210, based on detected strength of a signal. An electronic device 101 may display an object 2230 indicating strength of a signal and objects indicating a plurality of external electronic devices 210, based on information on a virtual location relation. An electronic device 101 may display objects indicating a plurality of external electronic devices 210, based on a relative location relation between a plurality of external electronic devices 210 and an electronic device 101 and strength of a signal.

Figure 22D:
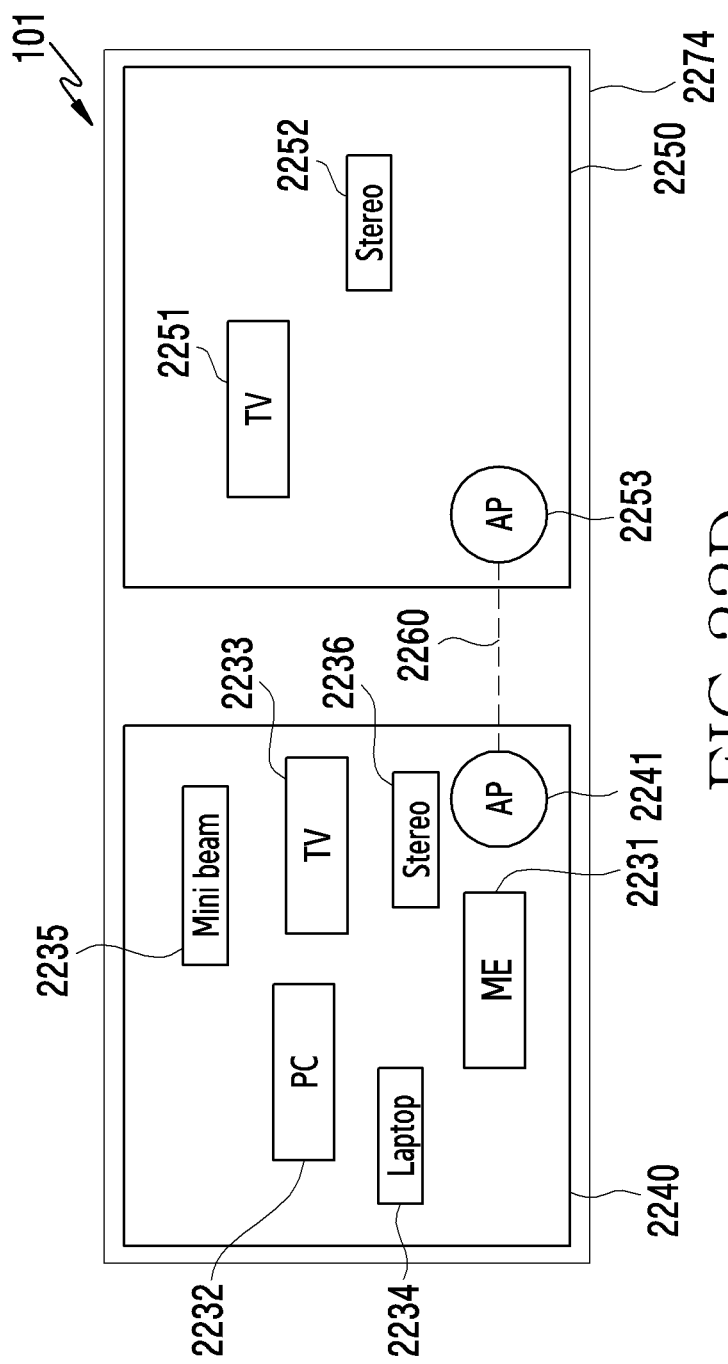
FIG. 22D explains still another example of a method for, in an electronic device, displaying an object indicating an external electronic device, according to various embodiments.

FIG. 22D explains still another example of a method for, in an electronic device, displaying an object indicating an external electronic device, according to various embodiments.

Referring to FIG. 22D, an electronic device 101 (for example: a processor 120 of an electronic device 101) may display, on a display device 160 of the electronic device 101, a screen 2274 including an external electronic device from which a signal does not reach the electronic device 101. According to an embodiment, a screen 2274 of an electronic device 101 may include a first area 2240 including an external electronic device which a signal of the electronic device 101 reaches, and a second area 2250 including an external signal which a signal of the electronic device 101 does not reach. For example, an external electronic device which a signal does not reach may be at least one external electronic device (for example: a first external electronic device 211 or a second external electronic device 212) in a different space from the space of an electronic device 101. According to an embodiment, a first wireless communication device in a space where there is an electronic device 101 may be connected to a second wireless communication device in a space where there is not the electronic device 101. The first external electronic device 211 and the second external electronic device 212 may be connected to an electronic device 101 through wireless communication devices (for example: APs). Through a first wireless communication device and a second wireless communication device, an electronic device 101 may acquire information on a location relation of a second external electronic device 212 and a first external electronic device 211 from which a signal does not reach an electronic device 101. Based on the information on a location relation, an electronic device 101 may display, on a second area 2250 which is not a first area 2240 where an object 2231 indicating an electronic device 101 is displayed, an object indicating an external electronic device which a signal does not reach. Accordingly, an electronic device 101 may display a first object 2251 indicating a first external electronic device 211 and a second object 2252 indicating a second external electronic device 212 on a second area 2250 which is not a first area 2240 where an object 2231 indicating an electronic device 101 is displayed. An electronic device 101 may display an object 2231 indicating an electronic device 101 on the lower end of a first area 2240 or on the center of the first area 2240. An electronic device 101 may display, on a first area 2240, an object (for example: an object 2232, an object 2233, an object 2234, an object 2235, or an object 2236) indicating a device in the same space as the space of an electronic device 101. An electronic device 101 may display an object 2241 indicating a first wireless communication device on a first area 2240 where an object indicating an electronic device 101 is displayed. An electronic device 101 may display an object 2253 indicating a second wireless communication device on a second area 2250. An object 2241 indicating a first wireless communication device and an object 2253 indicating a second wireless communication device may be displayed by being connected by a dotted line 2260 indicating that two devices are connected.

Figure 23A:
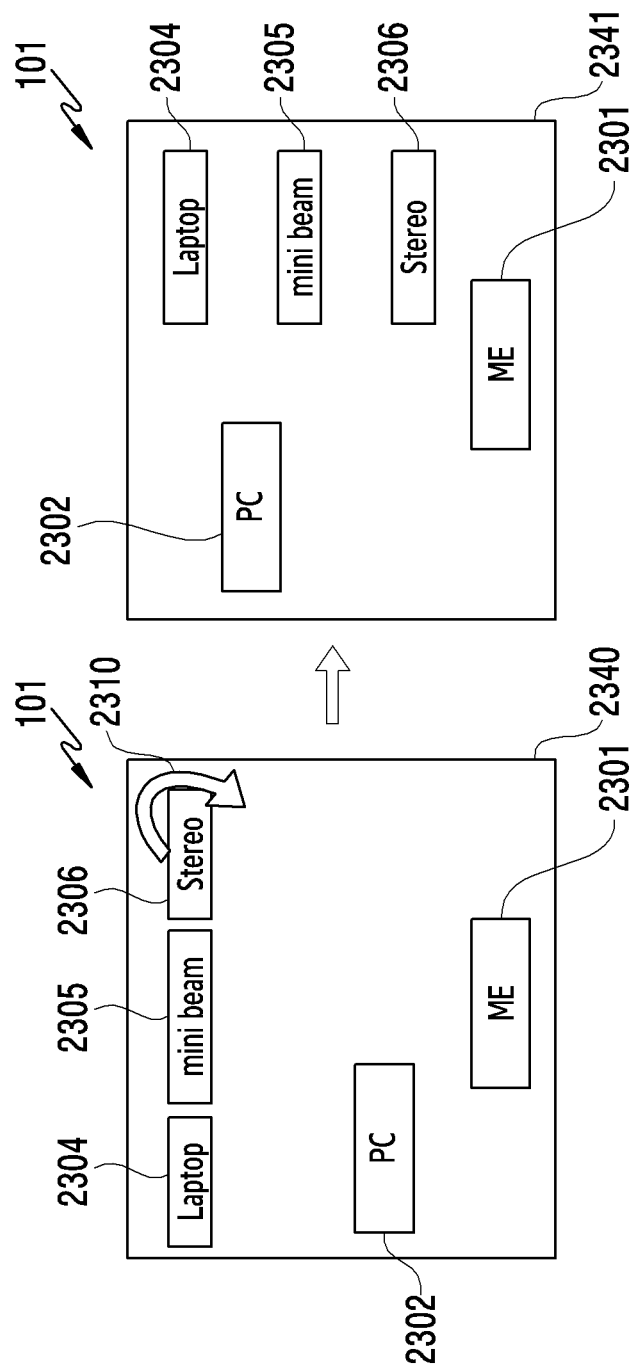
FIG. 23A explains an example of a method for, in an electronic device, changing display of an object indicating an external electronic device, according to various embodiments.

FIG. 23A explains an example of a method for, in an electronic device 101, changing display of an object indicating an external electronic device, according to various embodiments.

Referring to FIG. 23A, an electronic device 101 (for example: a processor 120 of an electronic device 101) may display, on a display device 160, a screen 2340 including objects (for example: an object 2302, an object 2304, an object 2305, and an object 2306) indicating a plurality of external electronic devices 210 and an object 2301 indicating the electronic device 101. An electronic device 101 may additionally display, on a screen 2340, an indicator 2310 which may rotate objects (for example: an object 2302, an object 2304, an object 2305, and an object 2306) indicating a plurality of external electronic devices 210. An electronic device 101 may receive an input (for example: a drag or a tap) for selecting the indicator 2310. Based on a selective input, an electronic device 101 may rotate objects (for example: an object 2302, an object 2304, an object 2305, and an object 2306) indicating a plurality of external electronic devices 210 about an object 2301 indicating an electronic device 101. Based on a selective input of an indicator 2310, an electronic device 101 may display a screen 2341 in which objects (for example: an object 2302, an object 2304, an object 2305, and an object 2306) indicating a plurality of external electronic devices 210 is rotated 90 degrees about an object indicating the electronic device 101. A case of 90-degree rotation has been explained above, but according to various embodiments of the disclosure, objects (for example: an object 2302, an object 2304, an object 2305, and an object 2306) indicating a plurality of external electronic devices 210 may be displayed after being rotated at various angles (for example: 30 degrees, 180 degrees, and 270 degrees) according to a selective input of an indicator 2310.

Figure 23B:
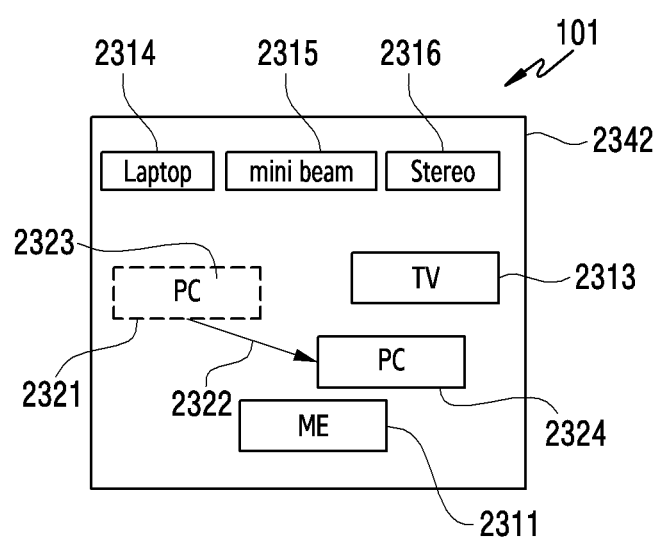
FIG. 23B explains another example of a method for, in an electronic device, changing display of an object indicating an external electronic device, according to various embodiments.

FIG. 23B explains another example of a method for, in an electronic device 101, changing display of an object indicating an external electronic device, according to various embodiments.

Referring to FIG. 23B, an electronic device 101 (for example: a processor 120 of an electronic device 101) may display, on a display device 160 of the electronic device 101, a screen 2342 including objects (for example: an object 2321, an object 2313, an object 2314, an object 2315, and an object 2316) indicating a plurality of external electronic devices 210 and an object 2311 indicating an electronic device 101. An electronic device 101 may receive an input for changing arrangement of a plurality of objects (for example: an object 2321, an object 2313, an object 2314, an object 2315, and an object 2316) indicating a plurality of external electronic devices 210, respectively. The input may include a drag input. The input may correspond to a drag input in a direction 2322. An electronic device 101 may change an object 2321 from a first location 2323 to a second location 2324, based on a drag input of the direction 2322.

Figure 24A:
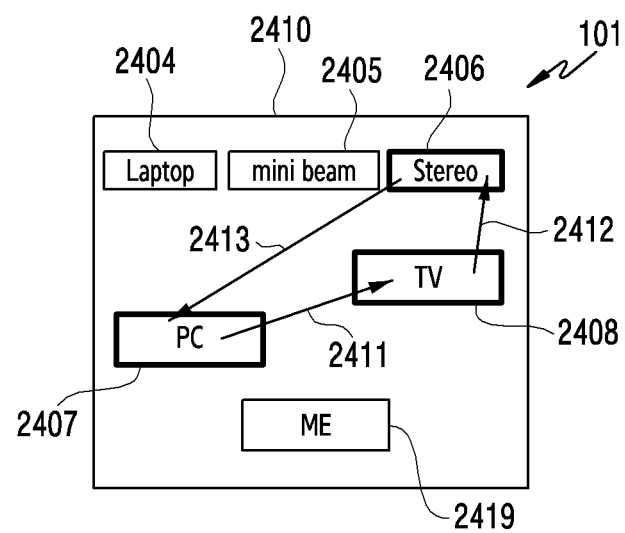
FIG. 24A explains an example of a method for, in an electronic device, selecting an object indicating an external electronic device, according to various embodiments.

FIG. 24A explains an example of a method for, in an electronic device 101, selecting an object indicating an external electronic device, according to various embodiments.

Referring to FIG. 24A, an electronic device 101 (for example: a processor 120 of an electronic device 101) may display, on a display device 160 of an electronic device 101, a screen 2410 including objects (for example: an object 2404, an object 2405, an object 2406, an object 2407, and an object 2408) indicating a plurality of external electronic devices 210 and an object 2419 indicating an electronic device 101. An electronic device 101 may receive an input for connecting a plurality of external electronic devices 210. The input may be an input for selecting objects (for example: an object 2404, an object 2405, an object 2406, an object 2407, and an object 2408) indicating a plurality of external electronic devices 210 included in a screen 2410 displayed on a display device 160 of an electronic device 101.

An electronic device 101 may receive, through a drag input, an input for connecting a plurality of external electronic devices 210. In various embodiments, an object 2407 may indicate a personal computer (PC). An object 2408 may indicate a television (TV). An object 2406 may indicate a stereo (an audio system). An electronic device 101 may receive a drag input connecting an object 2407 and an object 2408, the drag input being for connecting a PC and a TV. In response to the drag input, an electronic device 101 may display an indicator 2411 (for example: an arrow) indicating a drag direction between an object 2407 and an object 2408. An electronic device 101 may receive a drag input connecting an object 2408 and an object 2406, the drag input being for connecting a TV and a stereo. In response to the drag input, an electronic device 101 may display an indicator 2412 (for example: an arrow) indicating a drag direction between an object 2408 and an object 2406. An electronic device 101 may receive a drag input connecting an object 2406 and an object 2407, the drag input being for connecting a stereo and a PC. In response to the drag input, an electronic device 101 may display an indicator 2413 (for example: an arrow) indicating a drag direction between an object 2406 and an object 2407. An electronic device 101 may continuously receive various drag inputs. For example, in case that a drag input is received from an object 2407, an object 2408, and an object 2406 in this sequence, an electronic device 101 may identify an input for connecting all of a PC, a TV, and a stereo. An electronic device 101 may confirm that a start point of a drag is an object 2407. An electronic device 101 may determine, as a source device, a PC which is an external electronic device indicated by an object 2407 at a start point of a as a source device.

Figure 24B:
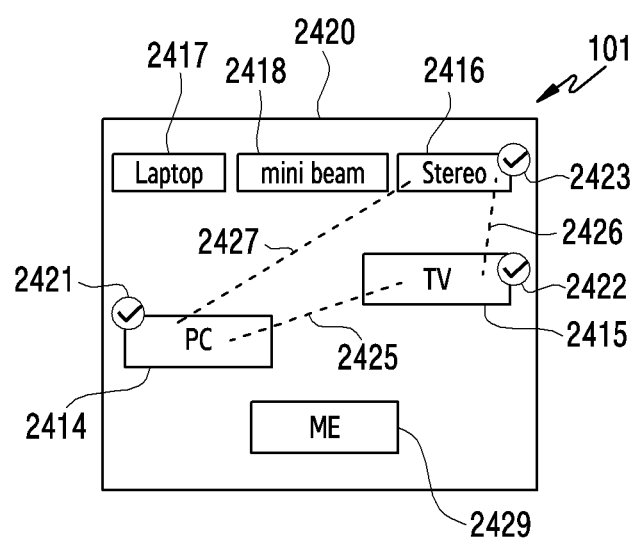
FIG. 24B explains another example of a method for, in an electronic device, selecting an object indicating an external electronic device, according to various embodiments.

FIG. 24B explains another example of a method for, in an electronic device 101, selecting an object indicating an external electronic device, according to various embodiments.

Referring to FIG. 24B, an electronic device 101 (for example: a processor 120 of an electronic device 101) may display, on a display device 160 of the electronic device 101, a screen 2420 including objects (for example: an object 2414, an object 2415, an object 2416, an object 2417, and an object 2418) indicating a plurality of external electronic devices 210 and an object 2429 indicating an electronic device 101. An electronic device 101 may receive, through a tap input, an input for connecting a plurality of external electronic devices 210. In various embodiments, an object 2414 may indicate a personal computer (PC). An object 2415 may indicate a television (TV). An object 2416 may indicate a stereo (an audio system). An electronic device 101 may receive a tap input for connecting a PC, a TV, and a stereo. In response to a tap input of an object 2414, an electronic device 101 may display an indicator 2421 indicating that the object 2414 has been selected. In response to a tap input of an object 2415, an electronic device 101 may display an indicator 2422 indicating that the object 2415 has been selected. In addition, a line 2425 connecting an object 2414 and an object 2415 may be displayed to indicate a connection relation. In response to a tap input of an object 2416, an electronic device 101 may display an indicator 2423 indicating that an object 2413 has been selected. In addition, a line 2426 connecting an object 2415 and an object 2416 may be displayed to indicate a connection relation. Moreover, a line 2427 connecting an object 2414 and an object 2416 may be displayed to indicate a connection relation. For example, in case that two objects are selected, an electronic device 101 may display a line connecting a two objects. For another example, in case that three objects are selected, an electronic device 101 may display a line indicating connection of the three objects. Lines indicating connection of three objects may be displayed to form a triangle. An indicator indicating that an object has been selected may be displayed via various methods. In addition, a line indicating a connection relation may be displayed via various methods such as a dotted line, a solid line, or a line including an arrow.

Figure 24C:
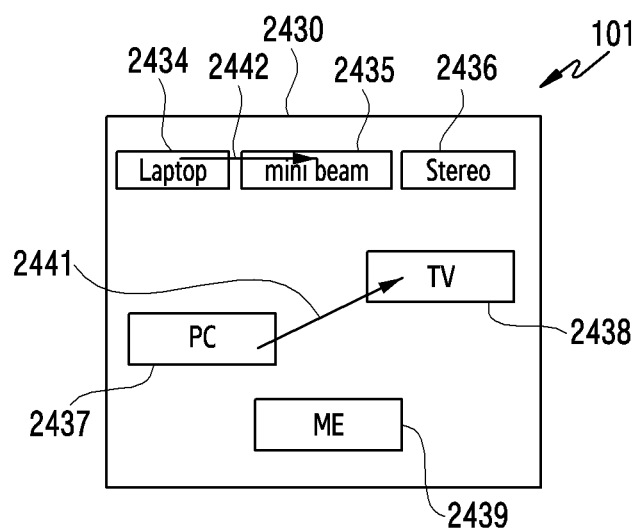
FIG. 24C explains another example of a method for, in an electronic device, selecting an object indicating an external electronic device, according to various embodiments.

FIG. 24C explains another example of a method for, in an electronic device 101, selecting an object indicating an external electronic device, according to various embodiments.

Referring to FIG. 24C, an electronic device 101 (for example: a processor 120 of an electronic device 101) may display, on a display device 160 of the electronic device 101, a screen 2430 including objects (for example: an object 2434, an object 2435, an object 2436, an object 2437, and an object 2438) indicating a plurality of external electronic devices 210 and an object 2439 indicating an electronic device 101. An electronic device 101 may receive an input for a plurality of connections between a plurality of external electronic devices 210. The input may be an input for selecting objects indicating a plurality of external electronic devices 210 displayed on a screen 2430 of an electronic device 101. For example, an electronic device 101 may receive, via a drag input, an input for a plurality of connections between a plurality of external electronic devices 210.

In various embodiments, an object 2434 may indicate a laptop. An object 2435 may indicate a mini beam. An object 2436 may indicate a stereo (an audio system). An object 2437 may indicate a personal computer (PC). An object 2438 may indicate a television (TV). An electronic device 101 may receive a drag input connecting an object 2437 and an object 2438, the drag input being for connecting a PC and a TV. In response to the drag input, an electronic device 101 may display an indicator 2441 (for example: an arrow) indicating a drag direction between an object 2437 and an object 2438. After an electronic device 101 receives a drag input connecting an object 2437 and an object 2438, the drag input being for connecting a PC and a TV, the electronic device 101 may receive a drag input connecting an object 2434 and an object 2435, the drag input being for connecting a laptop and a mini beam. In response to the drag input, an electronic device 101 may display an indicator 2442 (for example: an arrow) indicating a drag direction between an object 2434 and an object 2435. An electronic device 101 may respond to a drag input for connecting a PC and a TV and a drag input for connecting a laptop and a mini beam and sequentially or simultaneously perform connection of a PC and a TV and connection of a laptop and a mini beam.

Figure 25:
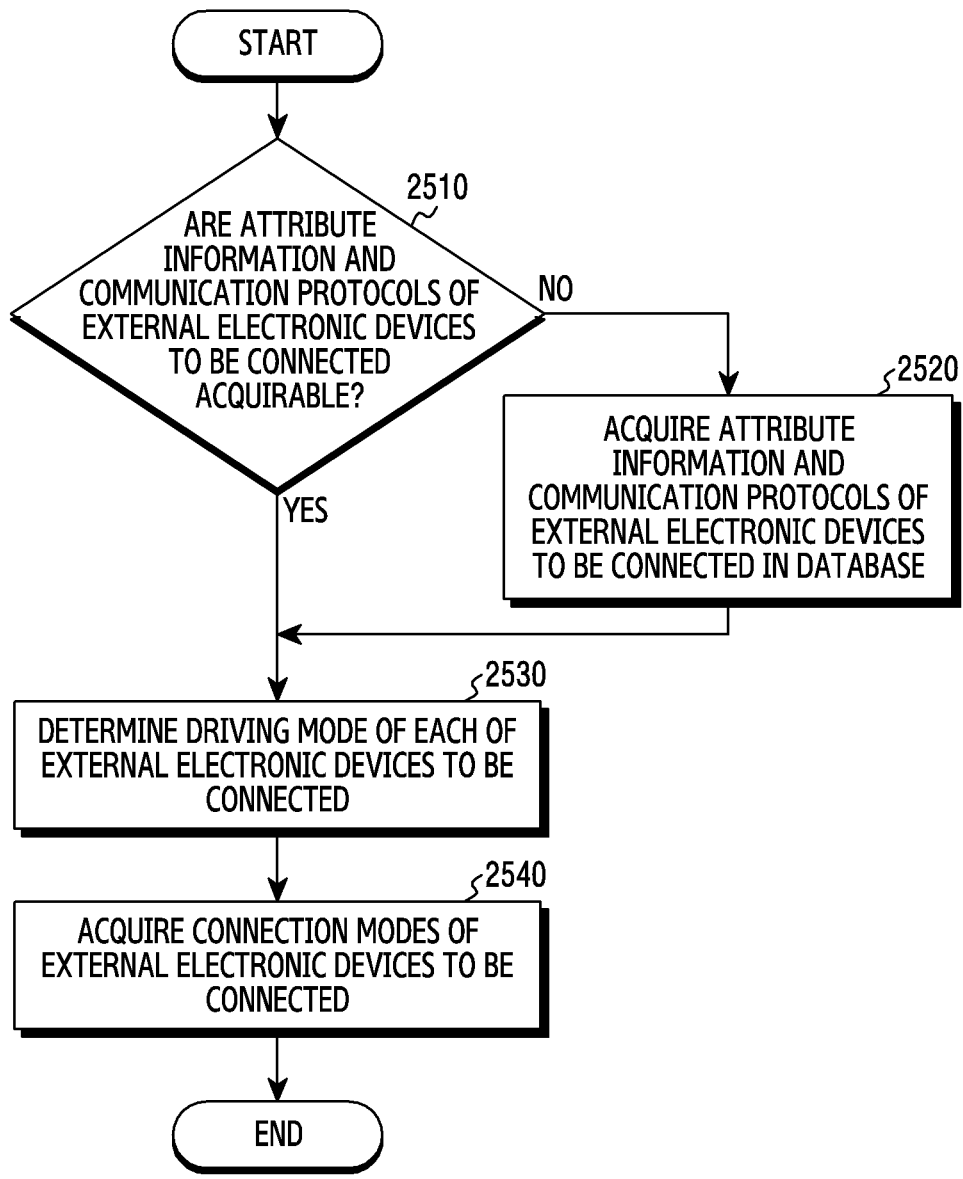
FIG. 25 illustrates an example of an operation for, in an electronic device, acquiring a connection mode of external electronic devices, according to various embodiments.

FIG. 25 illustrates an example of an operation for, in an electronic device 101, acquiring a connection mode of external electronic devices, according to various embodiments.

Referring to FIG. 25, in operation 2510, a processor 120 of an electronic device 101 may confirm attribute information of external electronic devices to be connected (for example: a first external electronic device 211 and a second external electronic device 212) and whether or not a communication protocol may be acquired. Attribute information of external electronic devices to be connected may include information on whether or not an external electronic device is an input device, a display device, a screen display device, a sound display device, or a data storage device. In order to establish connection to external electronic devices to be connected, a processor 120 may confirm a communication protocol of an external electronic device to be connected. For example, in case that attribute information and communication protocols of external electronic devices to be connected are acquirable, a processor 120 may perform operation 2520. For another example, in case that attribute information and communication protocols of external electronic devices to be connected are not acquirable, a processor 120 may perform operation 2520.

In operation 2520, a processor 120 may acquire attribute information and communication protocols of external electronic devices to be connected from a memory of a server 108. In various embodiments, a processor 120 may receive attribute information and communication protocols of external electronic devices to be connected from a server 108. A server 108 may store information on driving modes of a plurality of external electronic devices 210. A server 108 may acquire attribute information of external electronic devices to be connected, based on stored information on driving modes. According to various embodiments, a corresponding server 108 may include an artificial intelligence server, an IoT service providing server, and a device information-specialized database managed by an IoT device manufacturer.

In operation 2530, a processor 120 may determine driving modes of external electronic devices to be connected, based on attribute information of external electronic devices to be connected. For example, in order to connect a notebook computer, a monitor, and a speaker, a processor 120 may determine a driving mode of each of external electronic devices, based on attribute information of each of the external electronic devices. A notebook computer may have a data storage function, a screen display function, and a sound output function. A monitor may have a screen display function. A speaker may have a sound output function. A processor 120 may determine a notebook computer as a source device because an external electronic device operable as the source device is the notebook computer. From among a monitor and a speaker other than a notebook computer, a processor 120 may determine the monitor, which has a screen display function, as a screen display device. A processor 120 may determine a speaker, which has a sound output function, as a sound display device 160.

In operation 2540, a processor 120 may acquire connection modes of external electronic devices to be connected. A processor 120 may acquire efficient connection modes of external electronic devices. For example, in order to connect a notebook computer, a monitor, and a speaker, a processor 120 may acquire connection modes, based on determined driving modes of external electronic devices. A driving mode of a notebook computer may correspond to a source device. A driving mode of a monitor may correspond to a screen display. A driving mode of a speaker may correspond to sound output. A processor 120 may determine establishment of connection for transmitting image information from a notebook computer to a monitor. A processor 120 may determine establishment of connection for transmitting sound information from a notebook computer to a speaker. A processor 120 may determine non-establishment of connection of a monitor and a speaker.

Figure 26:
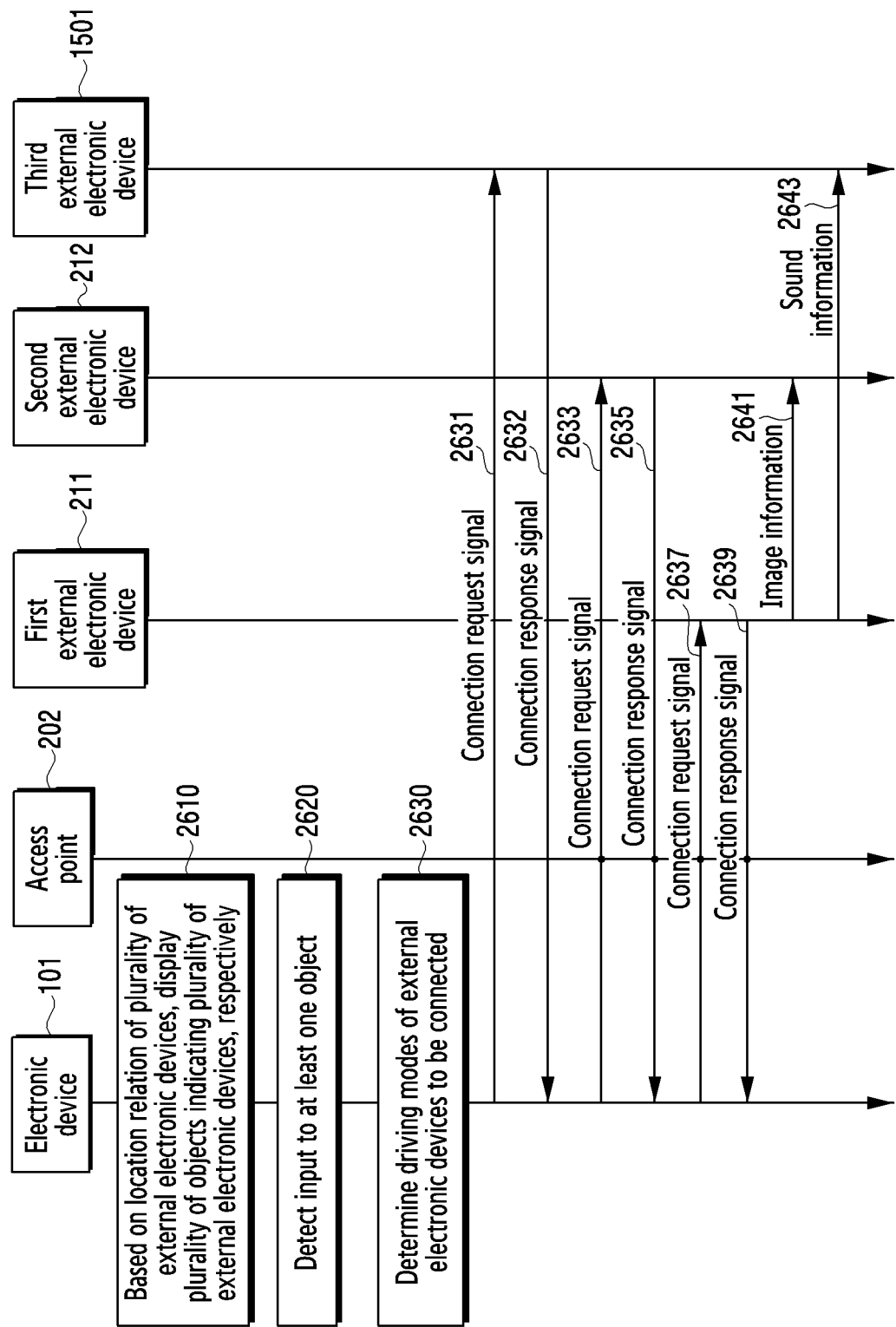
FIG. 26 illustrates an example of a signal flow for connecting a plurality of external electronic devices, according to various embodiments.

FIG. 26 illustrates an example of a signal flow for connecting a plurality of external electronic devices 210, according to various embodiments.

Referring to FIG. 26, an electronic device 101 may be connected to an access point 202. An external electronic device may include a first external electronic device 211, a second external electronic device 212, and a third external electronic device 1501. A first external electronic device 211, a second external electronic device 212, an access point 202, and an electronic device 101 may compose a local network. A third external electronic device 1501 may not compose a local network. For example, a first external electronic device 211 may be a notebook computer. A second external electronic device 212 may be a TV. A third external electronic device 1501 may be a Bluetooth speaker.

In operation 2610, an electronic device 101 (for example: a processor 120 of an electronic device 101) may display a plurality of objects indicating a plurality of external electronic devices 210, respectively, based on a location relation of the plurality of external electronic devices.

In operation 2620, an electronic device 101 may detect an input to at least one among a plurality of objects indicating external electronic devices. In various embodiments, an electronic device 101 may receive an input to at least one among objects indicating first external electronic devices 211, second external electronic devices 212, or third external electronic devices 1501.

In operation 2630, an electronic device 101 may determine a driving mode of external electronic devices to be connected. In various embodiments, an electronic device 101 may determine a first external electronic device 211 as a source device. An electronic device 101 may determine a second external electronic device 212 as an image display device. An electronic device 101 may determine a third external electronic device 1501 as a sound display device.

In operation 2631, an electronic device 101 may transmit, to a third external electronic device 1501, a request signal for connection to a first external electronic device 211. A third external electronic device 1501 may receive, from an electronic device 101, a request signal for connection to the first external electronic device 211. A connection request signal may include at least a part of information on a device identification (a device ID), a connection method, a password for connection, a service type, or a service query.

In operation 2632, a third external electronic device 1501 may transmit, to an electronic device 101, a response signal for connection to a first external electronic device. An electronic device 101 may receive, from a third external electronic device 1501, a response signal for connection to a first external electronic device 211. An electronic device 101 may control establishment of connection of a first external electronic device 211 and a third external electronic device 1501, based on a connection response signal.

In operation 2633, an electronic device 101 may transmit, to a second external electronic device 212 through an access point 202, a request signal for connection to a first external electronic device 211. A second external electronic device 212 may receive a signal for a request for connection to a first external electronic device 211. In various embodiments, an electronic device 101 may transmit a request signal for connection to a first external electronic device 211 directly to a second external electronic device 212 without passing through an access point 202.

In various embodiments, an access point 202 (for example: a processor 501 of an access point 202) may process a signal received from an electronic device 101 or an external electronic device (for example: a first external electronic device 211, a second external electronic device 212, or a third external electronic device 1501). An access point 202 may transmit a processed signal to an electronic device 101 or an external electronic device 211, 212 or 1501.

In operation 2635, a second external electronic device 212 may transmit, to an electronic device 101 through an access point 202, a response signal for connection to a first external electronic device 211. An electronic device 101 may receive a response signal for connection to a first external electronic device 211. In various embodiments, a second external electronic device 212 may transmit a response signal for connection to a first external electronic device 211 directly to an electronic device 101 without passing through an access point 202. An electronic device 101 may control establishment of connection of a first external electronic device 211 and a second external electronic device 212, based on a connection response signal.

In operation 2637, an electronic device 101 may transmit a connection request signal to a first external electronic device 211 through an access point 202. A first external electronic device 211 may receive a connection request signal. In various embodiments, an electronic device 101 may transmit a connection request signal directly to a first external electronic device 211 without passing through an access point 202.

In operation 2639, a first external electronic device 211 may transmit a connection response signal to an electronic device 101 through an access point 202. An electronic device 101 may receive a connection response signal. Via the connection response signal, an electronic device 101 may control establishment of connection between an electronic device 101 and a first external electronic device 211, connection between a first external electronic device 211 and a second external electronic device 212, and connection between a first external electronic device 211 and a third external electronic device 1501. In various embodiments, a first external electronic device 211 may transmit a connection response signal directly to an electronic device 101 without passing through an access point 202.

In operation 2641, a first external electronic device 211 may transmit a signal related to image information to a second external electronic device 212. A second external electronic device 212 may receive a signal related to an image from a first external electronic device 211. A second external electronic device 212 may display an image, based on received image information.

In operation 2643, a first external electronic device 211 may transmit a signal related to sound information to a third external electronic device 1501. A third external electronic device 1501 may receive a signal related to sound information from a first external electronic device 211. A third external electronic device 1501 may output sound, based on received sound information.

Figure 27:
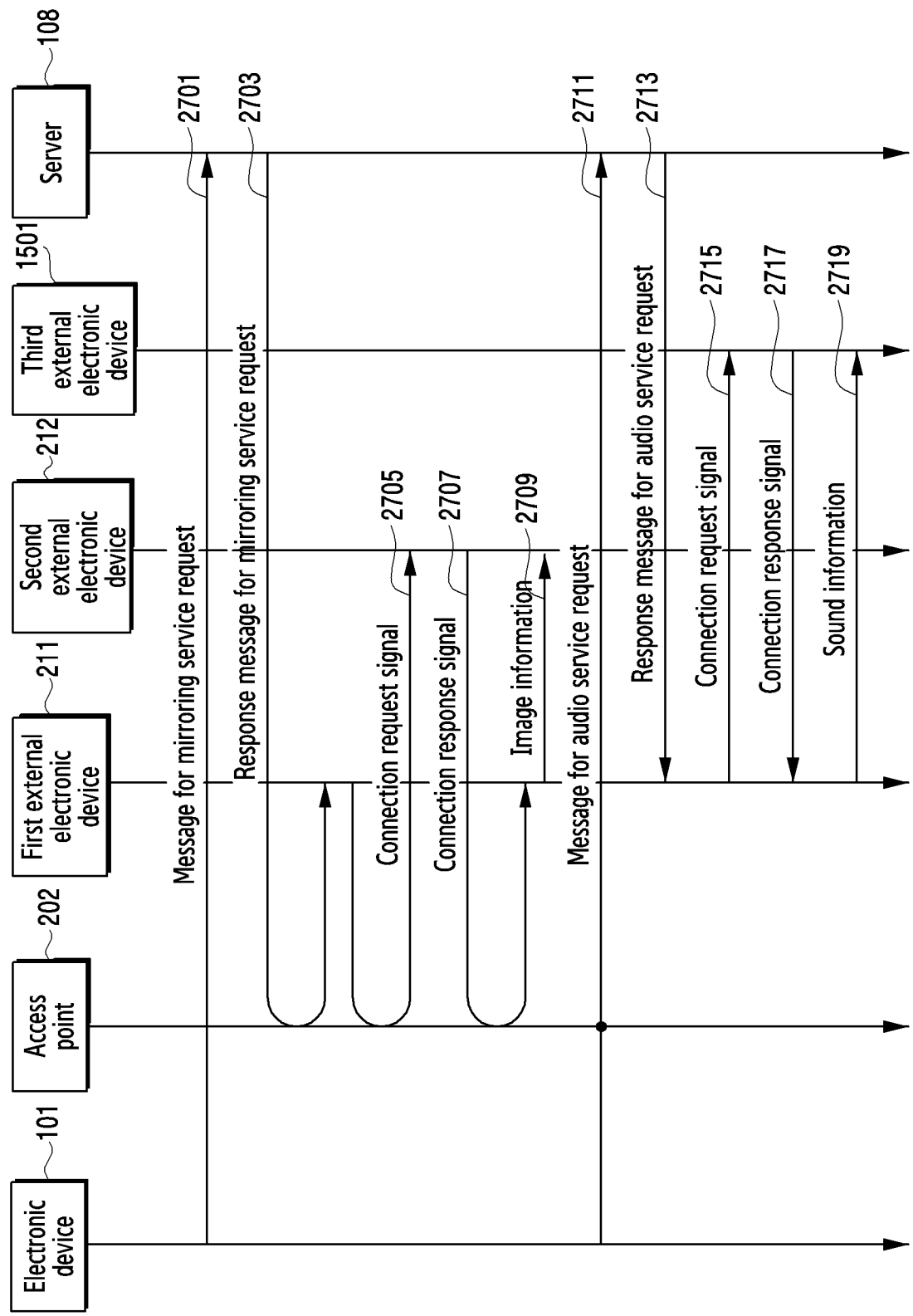
FIG. 27 illustrates another example of a signal flow for connecting a plurality of external electronic devices, according to various embodiments.

FIG. 27 illustrates another example of a signal flow for connecting a plurality of external electronic devices 210, according to various embodiments.

Referring to FIG. 27, an electronic device 101 may be connected to an access point 202. A first external electronic device 211, a second external electronic device 212, an access point 202, and an electronic device 101 may compose a local network. A third external electronic device 1501 may not compose a local network. For example, a first external electronic device 211 may be a notebook computer. A second external electronic device 212 may be a TV. A third external electronic device 1501 may be a Bluetooth speaker.

In operation 2701, an electronic device 101 (for example: a processor 120 of an electronic device 101) may transmit, to a server 108 through an access point 202, a message for requesting a mirroring service. In various embodiments, an access point 202 (for example: a processor 501 of an access point 202) may process and transmit a message received from an external device 101 or an external electronic device (for example: a first external electronic device 211, a second external 212, or a third external electronic device 1501). In various embodiments, an electronic device 101 may transmit a message for requesting a mirroring service directly to a server 108 without passing through an access point 202. The message for requesting a mirroring service may include information of a device identification (ID). A server 108 may sequentially or arbitrarily allocate a device ID of an external electronic device. A device ID may be allocated differently from a media access control (MAC) address, an Internet protocol (IP) address, or a universally unique identifier (UUID) of an actual device.

In operation 2703, a server 108 may transmit, to a first external electronic device 211 through an access point 202, a response message for requesting a mirroring service. A first external electronic device 211 may receive, from a server 108, a response message for requesting a mirroring service. In various embodiments, a server 108 may identify whether or not an electronic device 101 has a right to control a first external electronic device 211 and a right to control a second external electronic device 212, based on a message for a mirroring service request. In case that an electronic device 101 has a right to control a first external electronic device 211 and a right to control a second external electronic device 212, a server 108 may transmit, to an access point 202, a response message for a mirroring service request. In various embodiments, an access point 202 may process a response message received from a server 108 and transmit the processed message to a first external electronic device 211. In various embodiments, a server 108 may transmit a response message for performing a mirroring service directly to a first external electronic device 211 without passing through an access point 202.

In various embodiments, a response message for a mirroring service request may include a message in a java script object notation (json) form. For example, a response message for a mirroring service request may be a message in a json form, such as COAP POST, [Notebook ID] {"Service": "Mirroring", "Target": "TV ID"}. In various embodiments, the response message may further include information on an IP address of a TV.

In operation 2705, a first external electronic device 211 may transmit a connection request signal to a second external electronic device 212 through an access point 202. A second external electronic device 212 may receive a connection request signal. In various embodiments, an access point 202 may process a connection request signal received from a first external electronic device 211 and transmit the processed signal to a second external electronic device 212. In various embodiments, a first external electronic device 211 may transmit a connection request signal directly to a second external electronic device 212 without passing through an access point 202. A first external electronic device 211 may establish connection to a second external electronic device 212 in a peer to peer (P2P) scheme. The connection may include connection of Miracast, tunneled direct link setup (TDLS), or WiFi-Direct.

In operation 2707, a second external electronic device 212 may transmit a connection response signal to a first external electronic device 211 through an access point 202. A first external electronic device 211 may receive a connection response signal from a second external electronic device 212 through an access point 202. In various embodiments, an access point 202 may process a connection response signal received from a second external electronic device 212 and transmit the processed signal to a first external electronic device 211. In various embodiments, a second external electronic device 212 may transmit a connection request signal directly to a first external electronic device 211 without passing through an access point 202.

In operation 2709, a first external electronic device 211 may transmit a signal related to image information to a second external electronic device 212. A second external electronic device 212 may receive a signal related to image information from a first external electronic device 211. A second external electronic device 212 may display an image, based on the signal related to image information. According to an embodiment, a first external electronic device 211 and a second external electronic device 212 may directly transmit or receive a signal related to image information without passing through an access point 202.

In operation 2711, an electronic device 101 may transmit, to a server 108, a message for requesting an audio service. A server 108 may receive a message for an audio service request from an electronic device 101. In various embodiments, an access point 202 may process and transmit a message received from an electronic device 101 or an external electronic device (for example: a first external electronic device 211, a second external electronic device 212, or a third external electronic device 1501). In various embodiments, an electronic device 101 may transmit a message for requesting an audio service directly to a server 108 without passing through an access point 202.

In operation 2713, a server 108 may transmit, to a first external electronic device 211, a message for requesting an audio service. A first external electronic device 211 may receive a message for an audio service request. A server 108 may identify whether or not an electronic device 101 has a right to control a first external electronic device 211 and a right to control a third external electronic device 1501, based on a message for an audio service request. In case that an electronic device 101 has a right to control a first external electronic device 211 and a right to control a third external electronic device 1501, a server 108 may transmit, to a first external electronic device 211, a response message for an audio service request. In various embodiments, a server 108 may transmit, to a first external electronic device 211 through an access point 202, a response message for an audio service request.

In operation 2715, a first external electronic device 211 may transmit, to a third external electronic device 1501, a message indicating that a request signal for connection to the third external electronic device 1501 is to be transmitted. A third external electronic device 1501 may receive a request signal for connection from a first external electronic device 211. In various embodiments, a first external electronic device 211 may transmit a request signal for connection to a third external electronic device 1501, based on an advanced audio distribution profile (A2DP).

In operation 2717, a third external electronic device 1501 may transmit, to a first external electronic device 211, a response signal for connection to a third external electronic device 1501. A first external electronic device 211 may receive a response signal for connection to a third external electronic device 1501. An electronic device 101 may control establishment of connection of a first external electronic device 211 and a third external electronic device 1501, based on a response signal for connection to a third external electronic device 1501.

In operation 2719, a first external electronic device 211 may transmit a signal related to sound information to a third external electronic device 1501. A third external electronic device 1501 may receive a signal related to sound information. A third external electronic device 1501 may output sound, based on the signal related to sound information.

Figure 28:
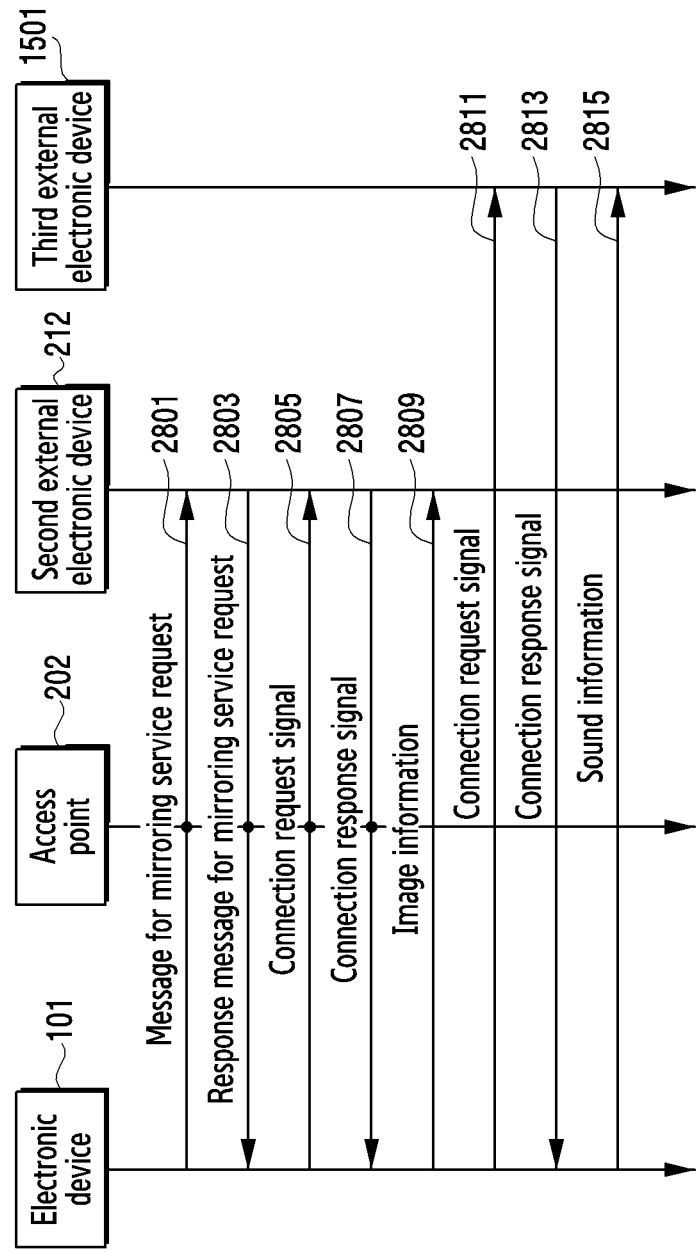
FIG. 28 illustrates an example of a signal flow for connecting an electronic device and a plurality of external electronic devices, according to various embodiments.

FIG. 28 illustrates an example of a signal flow for connecting an electronic device 101 and a plurality of external electronic devices 210, according to various embodiments.

Referring to FIG. 28, an electronic device 101 may be connected to an access point 202. A second external electronic device 212, an access point 202, and an electronic device 101 may compose a local network. A third external electronic device 1501 may not compose a local network. For example, a second external electronic device 212 may be a TV. A third external electronic device 1501 may be a Bluetooth speaker. An electronic device 101 may control a second external electronic device 212 and a third external electronic device 1501 without passing through a server 108.

In operation 2801, an electronic device 101 (for example: a processor 120 of an electronic device 101) may transmit, to a second external electronic device 212 through an access point 202, a message for a mirroring service request. A second external electronic device 212 may receive, from an electronic device 101 through an access point 202, a message for a mirroring service request.

In various embodiments, an access point 202 (for example: a processor 501 of an access point 202) may transmit a signal received from an electronic device 101 or an external electronic device (for example: a second external electronic device 212 or a third external device 1501).

In operation 2803, a second external electronic device 212 may transmit, to an electronic device 101 through an access point 202, a response message for a mirroring service request. An electronic device 101 may receive, from a second external electronic device 212 through an access point 202, a response message for a mirroring service request.

In operation 2805, an electronic device 101 may transmit a connection request signal to a second external electronic device 212 through an access point 202. A second external electronic device 212 may receive a connection request signal from an electronic device 101 through an access point 202. An electronic device 101 may establish connection to a second external electronic device 212 in a peer to peer (P2P) scheme. The connection may include connection of Miracast, tunneled direct link setup (TDLS), and WiFi-Direct.

In operation 2807, a second external electronic device 212 may transmit a connection response signal to an electronic device 101 through an access point 202. An electronic device 101 may receive a connection response signal from a second external electronic device 212 through an access point 202.

In operation 2809, an electronic device 101 may transmit a signal related to image information to a second external electronic device 212. A second external electronic device 212 may receive a signal related to image information from an electronic device 101. A second external electronic device 212 may display an image, based on a signal related to the image information.

In operation 2811, an electronic device 101 may transmit a connection request signal to a third external electronic device 1501. A third external electronic device 1501 may receive a connection request signal from an electronic device 101.

In operation 2813, a third external electronic device 1501 may transmit a connection response signal to an electronic device 101. An electronic device 101 may receive a connection response signal from a third external electronic device 1501.

In operation 2815, an electronic device 101 may transmit a signal related to sound information to a third external electronic device 1501. A third external electronic device 1501 may receive a signal related to sound information from an electronic device 101. A third external electronic device 1501 may output sound, based on a signal related to the sound information.

In various embodiments, from among operations for an electronic device 101 transmitting image information to a second external electronic device 212 and operations for the electronic device 101 transmitting sound information to a third external electronic device 1501, the electronic device 101 may first perform the operations for transmitting sound information. An electronic device 101 may simultaneously perform operations for transmitting image information and operations for transmitting sound information.

Figure 29:
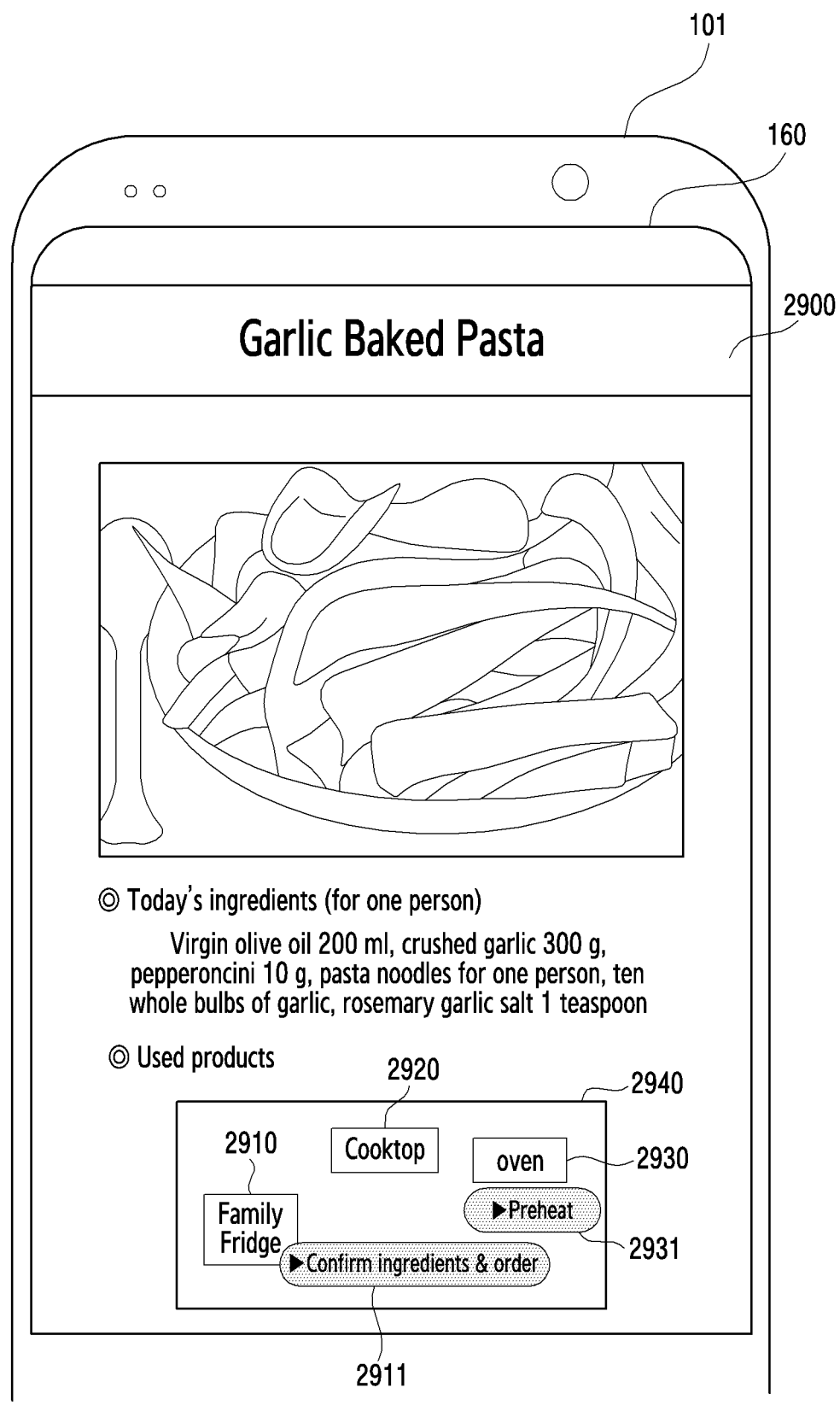
FIG. 29 illustrates an example of a user interface for, in an electronic device, displaying objects indicating a plurality of external electronic devices, according to various embodiments.

FIG. 29 illustrates an example of a user interface for, in an electronic device 101, displaying objects indicating a plurality of external electronic devices 210, according to various embodiments.

Referring to FIG. 29, based on execution of an application related to one or more external electronic devices (for example: a plurality of external electronic devices 210), an electronic device 101 (for example: a processor 120 of an electronic device 101) may display, on a display device 160, a user interface (for example: a user interface 2900) of the application. In a user interface (for example: a user interface 2900), an electronic device 101 may display a screen (for example: a screen 2940) for indicating one or more external electronic devices (for example: a first external electronic device 211, a second external electronic device 212, or a plurality of external electronic devices 210) related to the application.

For example, an electronic device 101 may display a user interface 2900 of an application related to cooking, based on execution of the application related to cooking. An electronic device 101 may display a screen 2940 for indicating a plurality of external electronic devices related to cooking (for example: a refrigerator, a cooktop, and an oven) in a user interface 2900. Based on a location relation of the plurality of external electronic devices related to cooking, a screen 2940 may display one or more objects (an object 2910, an object 2920, or an object 2930) indicating the plurality of external electronic devices related to cooking. The objects may be indicated by the names of external electronic devices, respectively, or the objects may be indicated by shapes corresponding to external electronic devices, respectively.

An electronic device 101 may display, in a screen 2940, an object indicating a driving mode corresponding to at least one among an object 2910, an object 2920, or an object 2930. For example, an electronic device 101 may display, around an object 2910 and in a screen 2940, an object 2911 corresponding to a driving mode of an external electronic device indicated by the object 2910. For another example, an object 2931 corresponding to a driving mode of an external electronic device indicated by an object 2930 may be displayed around the object 2930.

An electronic device 101 may identify an input to an object indicating the driving mode. Based on the identified input, an electronic device 101 may transmit a signal for performing a driving mode to an external electronic device indicated by the object. For example, in response to receiving an input to an object 2931, an electronic device 101 may transmit, to an external electronic device (for example: an oven), a signal for changing a driving mode of the external electronic device (for example: the oven) indicated by an object 2930. An external electronic device may change a driving mode of an external electronic device, based on the received signal. For example, an electronic device 101 may identify an input to an object 2931. An electronic device 101 may transmit a signal for preheating, which is a driving mode indicated by an object 2931, to an oven. An oven may change a driving mode of the oven to preheating, based on the signal.

Figure 30:
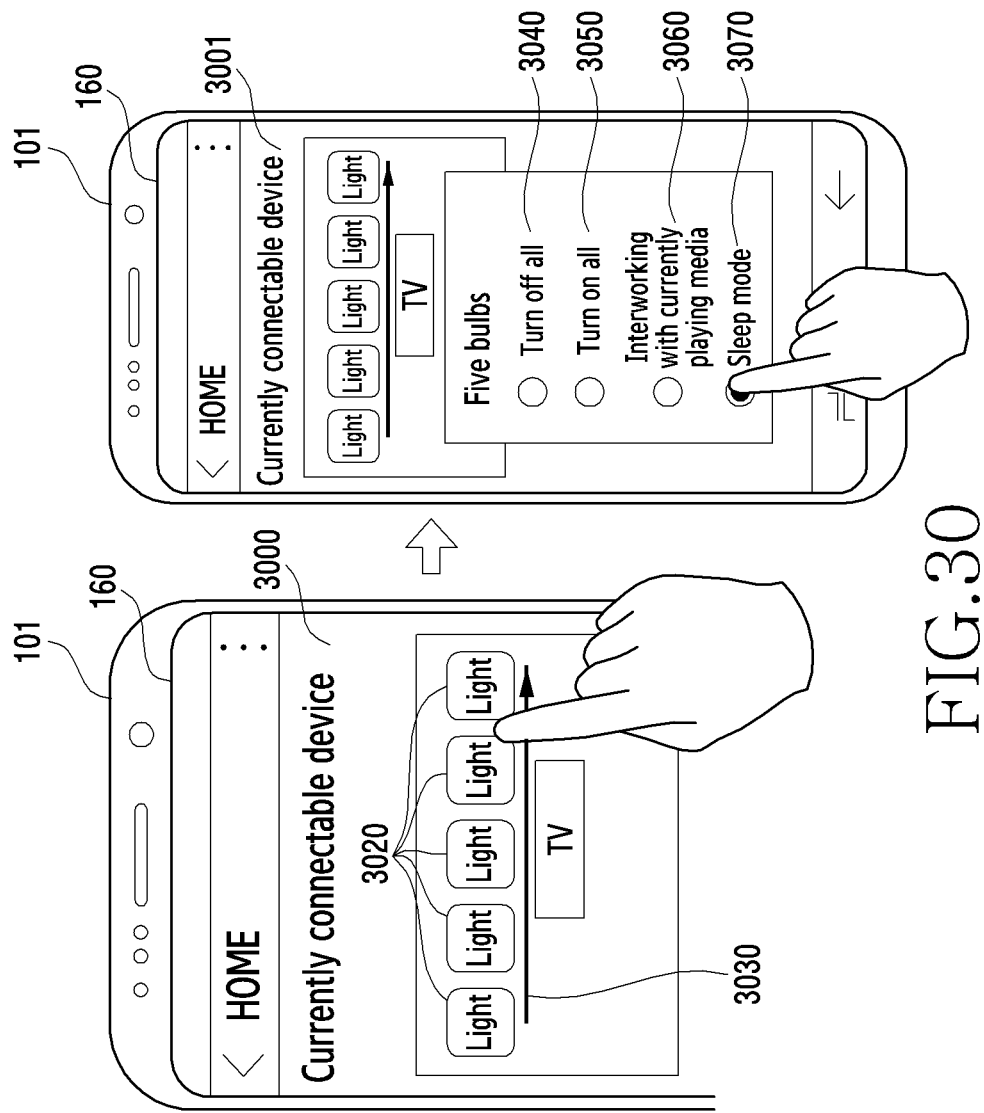
FIG. 30 illustrates an example of a screen for, in an electronic device, controlling a plurality of external electronic devices, according to various embodiments.

FIG. 30 illustrates an example of a screen for, in an electronic device 101, controlling a plurality of external electronic devices 210, according to various embodiments.

Referring to FIG. 30, an electronic device 101 (for example: a processor 120 of an electronic device 101) may display, on a display device 160, a screen 3000 for controlling a plurality of external electronic devices 210. An electronic device 101 may display, in a screen 3000, a plurality of objects indicating a plurality of external electronic devices 210, based on a location relation of a plurality of electronic devices 110.

For example, a plurality of external electronic devices 210 may include a plurality of IoT bulbs. An electronic device 101 may receive an input for selecting a plurality of objects 3020 indicating a plurality of IoT bulbs. An electronic device 101 may receive, via various methods, an input for selecting objects 3020 indicating a plurality of IoT bulbs. For example, various methods may include a drag or tap input. An electronic device 101 may receive a drag input 3030 for selecting a plurality of objects 3020 indicating IoT bulbs. An electronic device 101 may display a screen 3001 changed from a screen 3000, based on a drag input 3030.

An electronic device 101 may display, in a screen 3001, a list of a plurality of driving modes which may be performed using IoT bulbs. A list of a plurality of driving modes which may be performed using IoT bulbs may include at least one among an object 3040, an object 3050, an object 3060, or an object 3070. For example, an electronic device 101 may transmit a signal for turning off IoT bulbs indicated by a plurality of objects 3020 to the IoT bulbs, based on reception of an input to an object 3040. An electronic device 101 may transmit a signal for turning on IoT bulbs indicated by a plurality of objects 3020 to the IoT bulbs, based on reception of an input to an object 3050. An electronic device 101 may allow IoT bulbs indicated by a plurality of objects 3020 to interwork with currently playing media, based on an input for which an object 3060 is selected. For example, an electronic device 101 may transmit a signal for turning on or off IoT bulbs to the IoT bulbs, based on sound (for example: strength, volume, or tempo) of media which is being played. For another example, in case that media which is being played corresponds to a movie, an electronic device 101 may transmit a signal for reducing the illuminance of IoT bulbs to the IoT bulbs. In addition, an electronic device 101 may transmit a signal for adjusting the colors and illuminance of IoT bulbs to the IoT bulbs, based on genre information of media content which is currently being played. An electronic device 101 may transmit a signal for operating IoT bulbs indicated by a plurality of objects 3020 in a sleep mode to the IoT bulbs, based on an input for which an object 3070 is selected. For example, an electronic device 101 may transmit a signal for reducing the illuminance of IoT bulbs indicated by a plurality of objects 3020 to the IoT bulbs. An electronic device 101 may transmit a signal for turning off IoT bulbs indicated by a plurality of objects 3020 to the IoT bulbs after a predetermined period of time.

In case that a plurality of IoT bulbs has one driving mode, based on reception of an input for selecting a plurality of objects 3020 indicating the plurality of IoT bulbs, an electronic device 101 may configure, as the driving mode, driving modes of the plurality of IoT bulbs.

Figure 31:
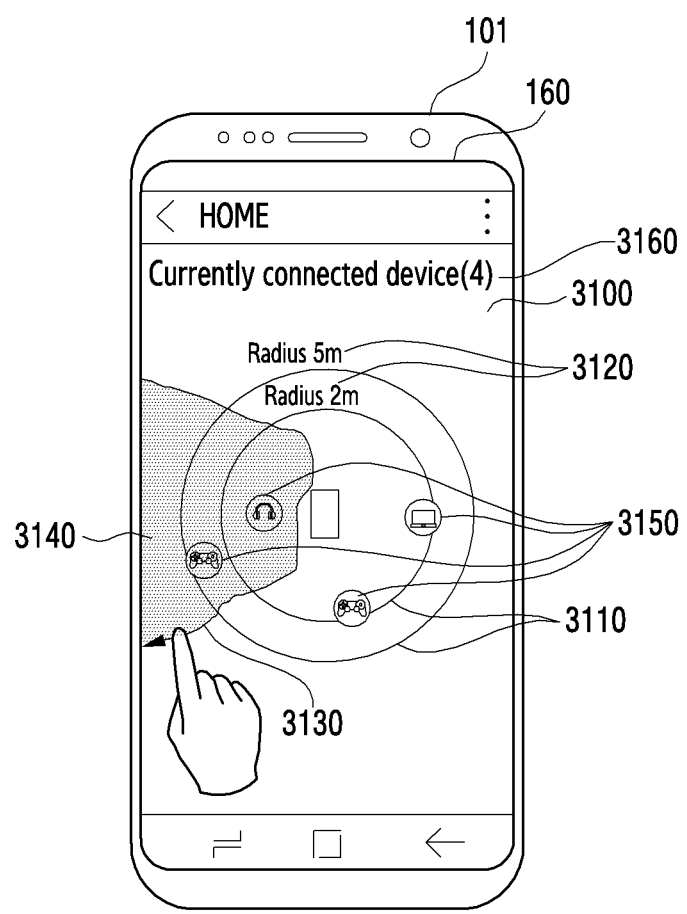
FIG. 31 illustrates another example of a screen for, in an electronic device, controlling a plurality of external electronic devices, according to various embodiments.

FIG. 31 illustrates another example of a screen for, in an electronic device 101, controlling a plurality of external electronic devices 210, according to various embodiments.

Referring to FIG. 31, an electronic device 101 (for example: a processor 120 of an electronic device 101) may display, on a display device 160, a screen 3100 for controlling a plurality of external electronic devices 210. An electronic device 101 may display, in a screen 3100, a plurality of circles 3110 indicating a distance from an electronic device 101, so as to display a plurality of objects 3150 indicating a plurality of external electronic devices 210. An electronic device 101 may display, in a screen 3100, a plurality of objects 3120 for indicating information (for example: a radius) on an area indicated by a plurality of circles 3110. An electronic device 101 may display, in a screen 3100 including a plurality of circles 3110, a plurality of objects 3150 indicating a plurality of external electronic devices 210, based on at least one among information (for example: a radius) on an area indicated by the plurality of circles 3110 or information on a location relation of the plurality of external electronic devices 210.

An electronic device 101 may change information (for example: a radius) on an area to be indicated through a plurality of circles 3110, for example, based on a user input. For example, an electronic device 101 may change a value indicating a minimum radius or a maximum radius of an area to be indicated through the plurality of circles 3110. An electronic device 101 may change the number of a plurality of circles 3110 or the sizes of the plurality of circles 3110. As described above, an electronic device 101 may display, in a screen 3100, a plurality of circles changed from a plurality of circles 3110. On an object 3160 indicating a description of an object displayed on a screen 3100, an electronic device 101 may together display the number of a plurality of objects 3150 indicating a plurality of external electronic devices 210 displayed in a plurality of circles 3110. In case that information (for example: a radius) on an area to be indicated through a plurality of circles 3110 is changed, an electronic device 101 may identify the number of a plurality of objects 3150 indicating a plurality of external electronic devices 210 displayed in the plurality of circles 3110. An electronic device 101 may change and display a part (for example: (4)) indicating the number of a plurality of objects 3150 indicating a plurality of external electronic devices 210 in an object 3160, based on a change in the number of the plurality of objects 3150 indicating the plurality of external electronic devices 210.

In various embodiments, an electronic device 101 may receive an input to at least one among a plurality of objects 3150 indicating a plurality of external electronic devices 210. For example, on a screen 3100, an electronic device 101 may receive a drag input 3130 for selecting at least one object among a plurality of objects 3150. An electronic device 101 may identify an area 3140 designated by a drag input 3130. An electronic device 101 may identify at least one object included in an identified area 3140. An electronic device 101 may connect at least one external electronic device corresponding to at least one identified object to each other.

Figure 32:
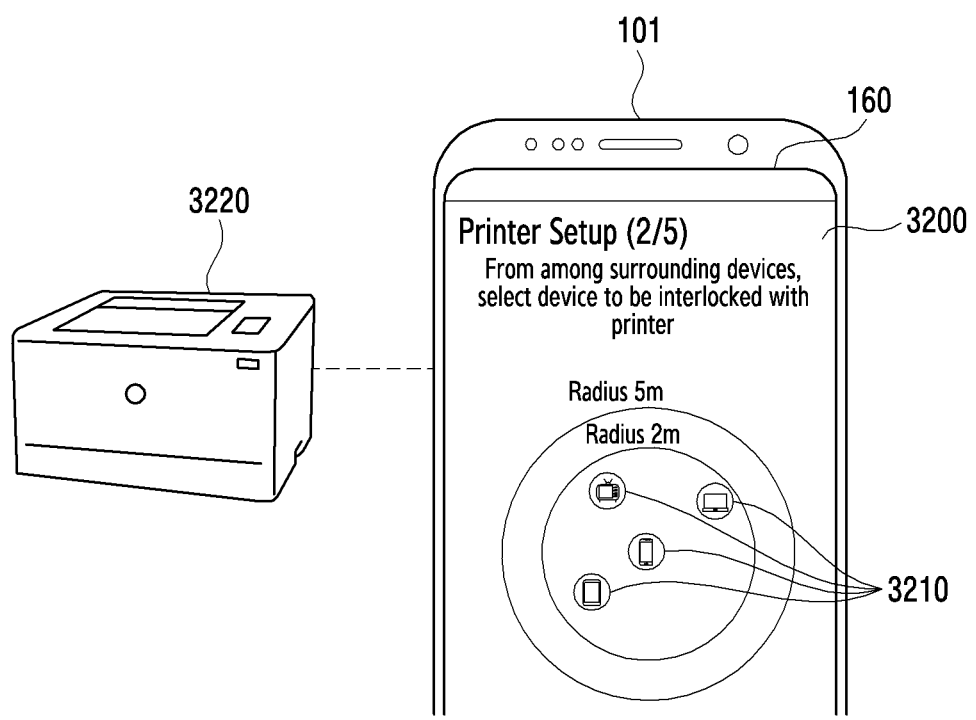
FIG. 32 illustrates an example of a screen for, in an electronic device, connecting one or more external electronic devices, according to various embodiments.

FIG. 32 illustrates an example of a screen for, in an electronic device 101, connecting one or more external electronic devices, according to various embodiments.

Referring to FIG. 32, based on execution of an application related to an external electronic device 3220 (for example: a printer), an electronic device 101 (for example: a processor 120 of an electronic device 101) may display a screen 3200 on a display device 160. For example, a screen 3200 may be a screen for configuring an external electronic device (for example: a smart phone or a notebook computer) for connection to an external electronic device 3220 (for example: a printer).

An electronic device 101 may display, in a screen 3200 of an application related to an external electronic device 3220 (for example: a printer), one or more objects 3210 indicating one or more external electronic devices (for example: a plurality of external electronic devices 210) which may be connected to an external electronic device 3220. An operation of displaying one or more objects 3210 in a screen 3200 may correspond to an operation of displaying a plurality of objects 3150 in a screen 3100 of FIG. 31. For example, an electronic device 101 may display, in a screen 3200, one or more objects 3210 indicating one or more external electronic devices, based on information on a location relation of one or more external electronic devices.

An electronic device 101 may receive an input (for example: a tap, a double tap, a long press, or a drag) for selecting at least one object indicating at least one external electronic device (for example: a smart phone or a notebook computer) for connection to an external electronic device 3220 (for example: a printer), from among one or more objects 3210 displayed in a screen 3200. Based on reception of an input for selecting at least one object from among one or more objects 3210, an electronic device 101 may connect an external electronic device 3220 and at least one external electronic device corresponding to at least one selected object. For example, to at least one among a first external electronic device corresponding to a first object selected from one or more objects 3210 or an external electronic device 3220, an electronic device 101 may transmit a signal for connection to an external electronic device 3220.

Figure 33:
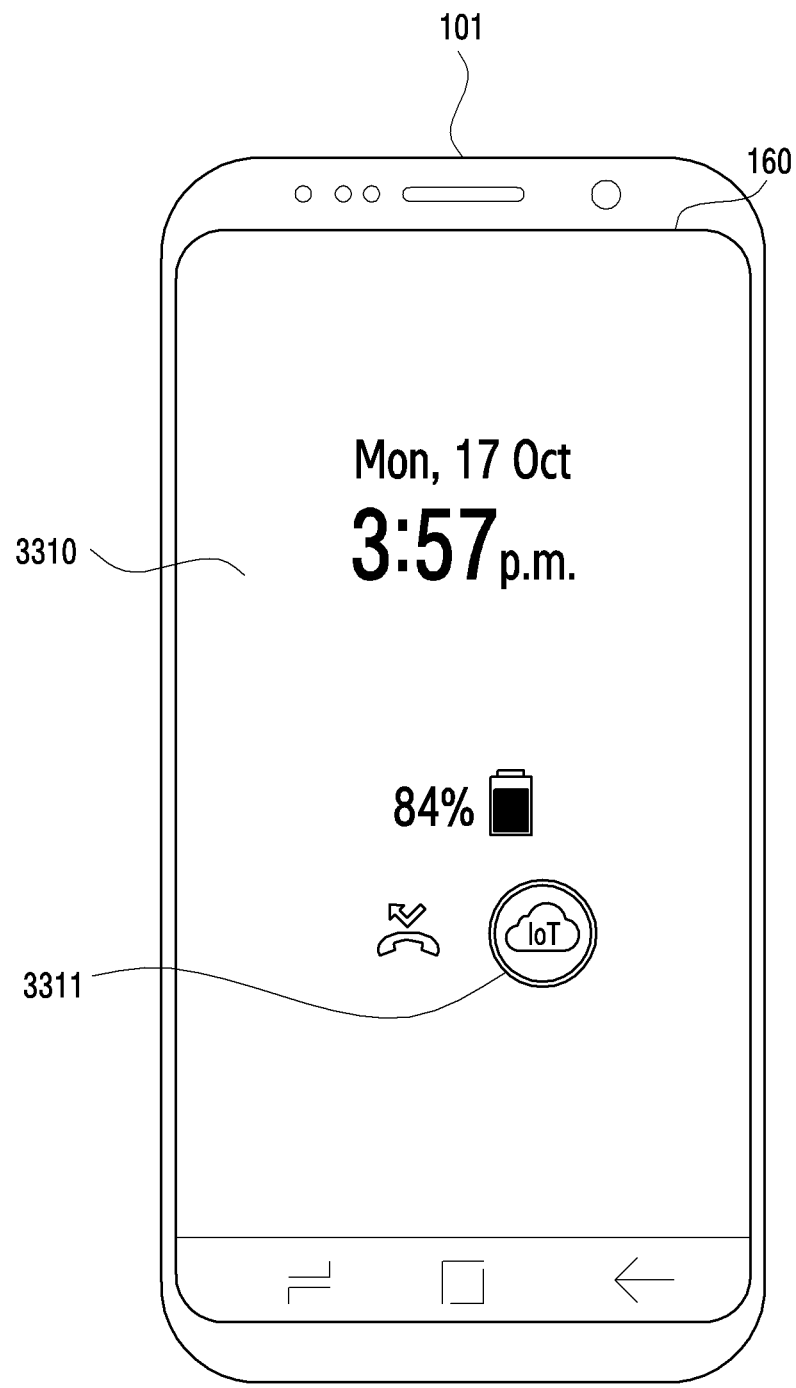
FIG. 33 illustrates an example of a screen for, in an electronic device, entering an application related to an external electronic device, according to various embodiments.

FIG. 33 illustrates an example of a screen for, in an electronic device 101, entering an application related to an external electronic device, according to various embodiments.

Referring to FIG. 33, an electronic device 101 (for example: a processor 120 of an electronic device 101) may display, on a display device 160, a lock screen 3310 including an object 3311 (for example: an icon) related to (an) external electronic device(s) (for example: a first external electronic device 211, a second external electronic device 212, or a plurality of external electronic devices 210). For example, an object 3311 (for example: an icon) related to an external electronic device may be displayed on a lock screen 3310. An electronic device 101 may execute an application related to an external electronic device, based on reception of an input to an object 3311 in a lock screen 3310. For example, an electronic device 101 may display a screen for controlling a plurality of external electronic devices 210 in response to receiving an input to an object 3311. A screen for controlling a plurality of external electronic devices 210 may include at least one among a user interface 2900 of FIG. 29, a screen 3000 or a screen 3001 of FIG. 30, a screen 3100 of FIG. 31, or a screen 3200 of FIG. 32. Another example of a screen for controlling a plurality of external electronic devices 210 will also be described later through FIGS. 34 to 36.

In a screen for controlling a plurality of external electronic devices 210 displayed based on reception of an input to an object 3311, an electronic device 101 may display a plurality of objects indicating the plurality of external electronic devices 210, based on information on a location relation of the plurality of external electronic devices 210.

In various embodiments, in case that an external electronic device which is not connected is identified, an electronic device 101 may display, on a lock screen 3310, an object displayed differently from an object 3311 related to a plurality of external electronic devices 210. For example, in case that an external electronic device which is not connected is identified, an electronic device 101 may display, on a lock screen 3310 of the electronic device 101, an object expressed with a different icon, a different color, or a different size from that of an object 3311.

Figure 34:
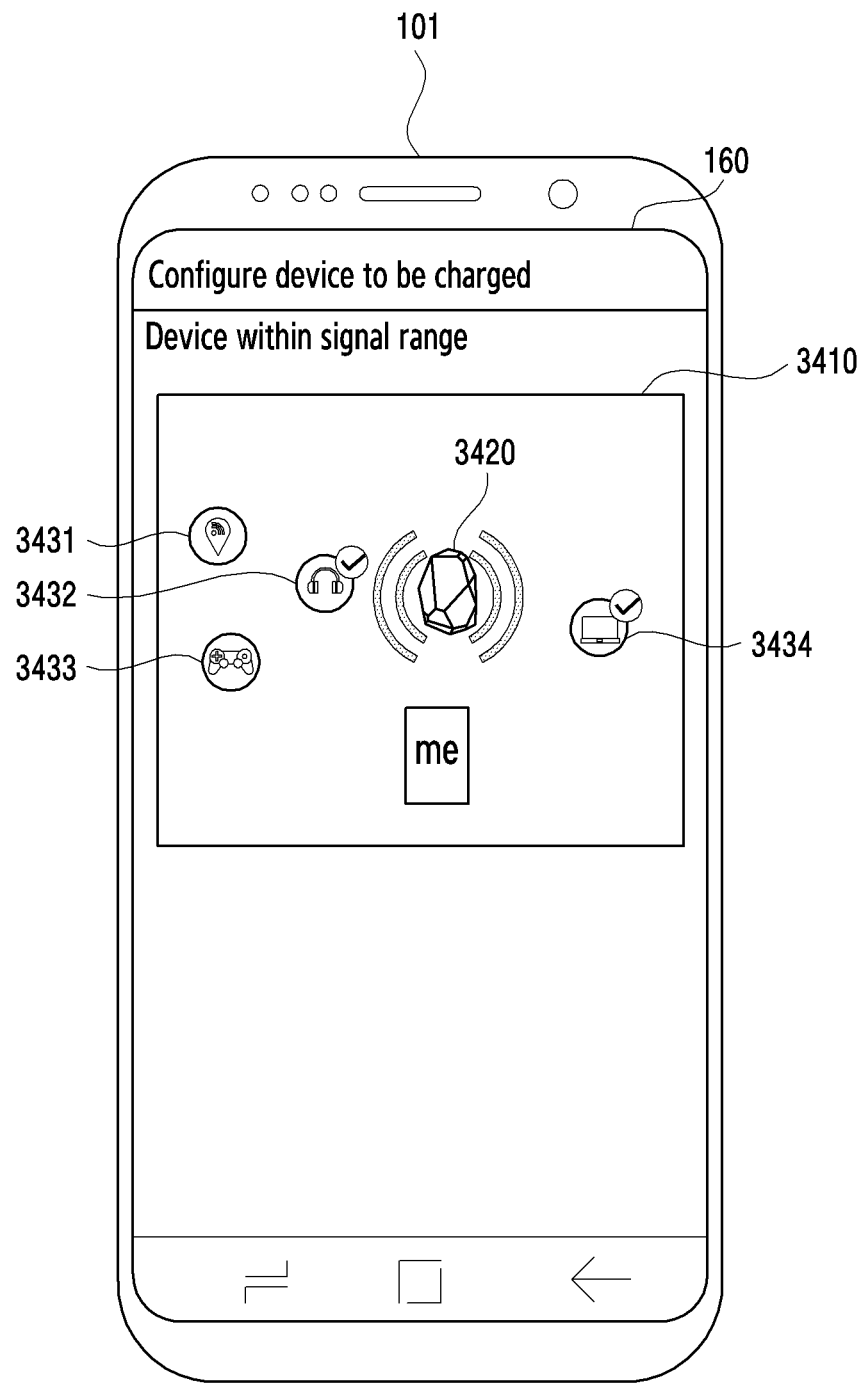
FIG. 34 illustrates another example of a screen for, in an electronic device, controlling a plurality of external electronic devices, according to various embodiments.

FIG. 34 illustrates another example of a screen for, in an electronic device 101, controlling a plurality of external electronic devices 210, according to various embodiments Referring to FIG. 34, an electronic device 101 (for example: a processor 120 of an electronic device 101) may display, on a display device 160, a screen 3410 related to wireless charging of one or more external electronic devices (for example: 211, 212, or 210). In a screen 3410, an electronic device 101 may display, by one among a plurality of external electronic devices 210, an object 3420 indicating a wireless charging device. An electronic device 101 may display, in a screen 3410, one or more objects indicating one or more external electronic devices which are wirelessly chargeable using a wireless charging device. One or more objects indicating one or more external electronic devices which are wirelessly chargeable may include an object 3431, an object 3432, an object 3433, or an object 3434. For example, an object 3420 indicating a wireless charging device and one or more objects indicating one or more external electronic devices may be displayed based on information on a location relation of a wireless charging device and a one or more external electronic devices. An electronic device 101 may display battery state information of an external electronic device together with one or more objects.

Based on reception of an input to at least one object among one or more objects (3431, 3432, 3433, and 3434), an electronic device 101 may transmit a control signal for wirelessly charging at least one external electronic device corresponding to the at least one object to at least one among the at least one external electronic device or a wireless charging device.

For example, an electronic device 101 may display an object 3420 indicating a wireless charging device at the center of a screen 3410. An electronic device 101 may configure (or change) a reach area of a radio wave output from a wireless charging device, based on a user input. For example, a reach area of a radio wave output from a wireless charging device may include at least one among the direction of a radio wave output from the wireless charging device, the strength of a radio wave output from the wireless charging device, or the reach distance of a radio wave output from the wireless charging device. For example, a user input for changing a reach area of a radio wave output from a wireless charging device may include at least one among a drag, a zoom-in input, or a zoom-out input.

An electronic device 101 may change (or configure) power transmitted from a wireless charging device to a plurality of external electronic devices 210 in a screen 3410. For example, based on a user input, an electronic device 101 may change (or configure) each of power transmitted from a wireless charging device to a first external electronic device 211 and power transmitted from the wireless charging device to a second external electronic device 212.

For example, in a situation where power transmitted to an earphone is 50% of the total available power of a wireless charging device and power transmitted to a notebook computer is 50% of the total available power of the wireless charging device, an electronic device 101 may receive, through a screen 3410, an input for increasing power transmitted to the earphone to 80% of the total chargeable power of the wireless charging device. Based on the input, an electronic device 101 may transmit, to a wireless charging device, a signal for increasing power transmitted to an earphone to 80% of the total available power of the wireless charging device and decreasing power transmitted to a notebook computer to 20% of the total available power of the wireless charging device. An electronic device 101 may increase a charging speed of an earphone by increasing power transmitted to the earphone.

Figure 35:
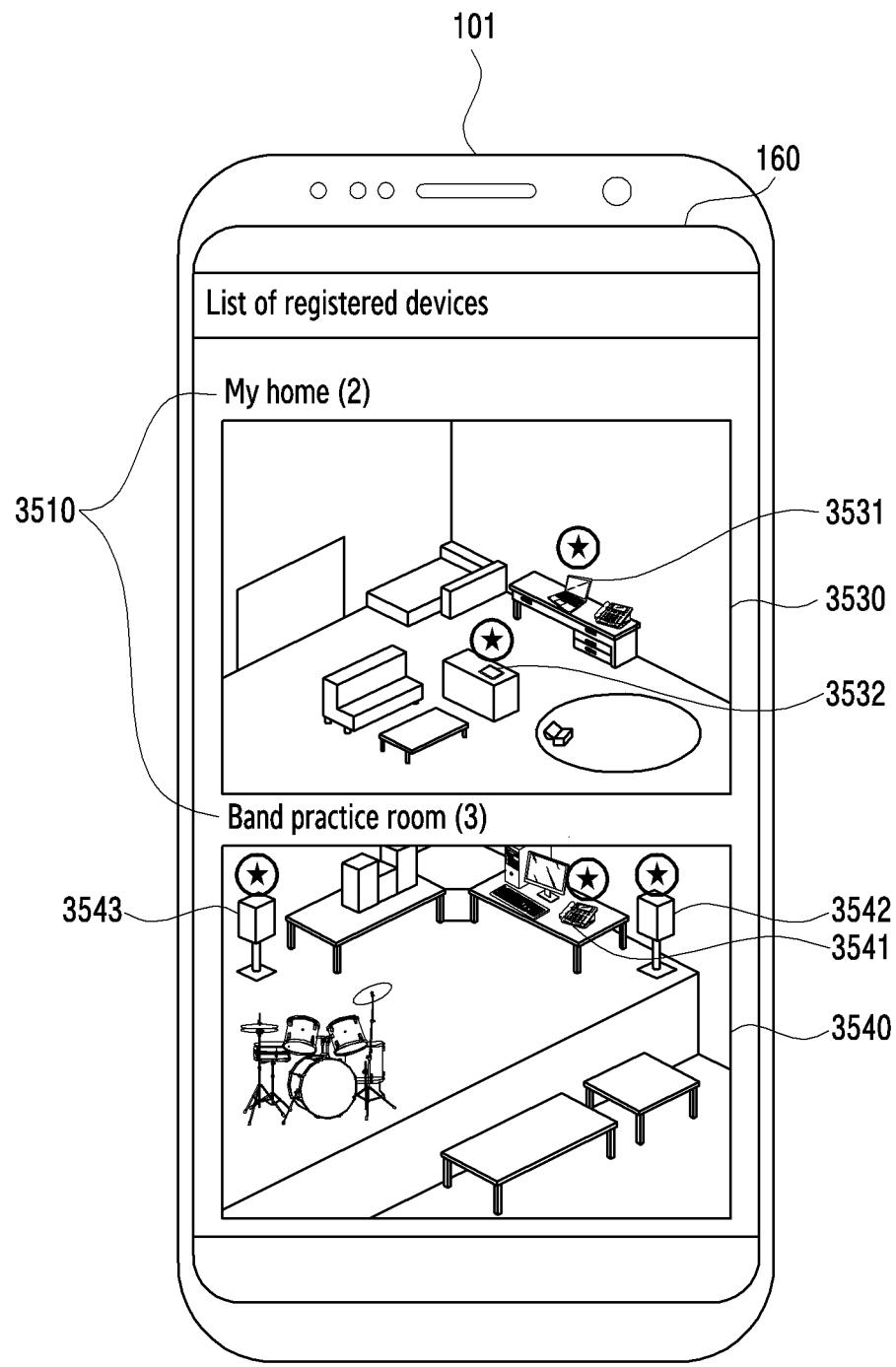
FIG. 35 illustrates an example of a screen for, in an electronic device, indicating a plurality of external electronic devices, according to various embodiments.

FIG. 35 illustrates an example of a screen for, in an electronic device 101, indicating a plurality of external electronic devices 210, according to various embodiments.

Referring to FIG. 35, an electronic device 101 (for example: a processor 120 of an electronic device 101) may display, on a display device 160, an image (for example: an image 3530 or an image 3540) indicating a surrounding environment including a plurality of external electronic devices 210, based on a location relation of the plurality of external electronic devices 210. The image (for example: the image 3530 or the image 3540) may include objects indicating a plurality of external electronic devices 210. An electronic device 101 may store the image (for example: the image 3530 or the image 3540) in the form of a snapshot. An electronic device 101 may transmit an image (for example: an image 3530 or an image 3540) to a server 108. An electronic device 101 may display an object (for example: an avatar or a character) indicating a user on an image (for example: an image 3530 or an image 3540). An electronic device 101 may receive an input for displaying various items (for example: a chair, a bag, and a table) additionally on the image (for example: the image 3530 or the image 3540). An electronic device 101 may further display objects indicating various items on an image (for example: an image 3530 or an image 3540), based on the received input.

An electronic device 101 may receive an input to at least one object indicating at least one external electronic device included in an image (for example: an image 3530 or an image 3540). Based on the input, an electronic device 101 may transmit, to at least one external electronic device, a signal for connecting at least one external electronic device corresponding to at least one object. According to various embodiments, an electronic device 101 may display a name 3510 of an image (for example: an image 3530 or an image 3540) together with the image. An electronic device 101 may display the number of a plurality of objects indicating a plurality of external electronic devices included in an image (for example: an image 3530 or an image 3540) together with a name 3510 of the image. According to an embodiment, in case that an object corresponds to an object (for example: an object 3531, an object 3532, an object 3541, an object 3542, or an object 3543) corresponding to a plurality of external electronic devices 210 controllable through an electronic device 101 among objects included in an image (for example: an image 3530 or an image 3540), the electronic device 101 may display that a corresponding external electronic device is an electronic device controllable through the electronic device 101. For example, an indicator such as star display, light display, or an arrow may be displayed on an object corresponding to a plurality of external electronic devices 210. For another example, an electronic device 101 may change the own color of an object corresponding to a plurality of external electronic devices 210 or display a notification text. For still another example, an electronic device 101 may additionally display an emoji or a speech bubble with an object corresponding to a plurality of external electronic devices 210. An electronic device 101 may intuitively indicate, through a visual indicator, which object is controllable through an electronic device 101.

Figure 36:
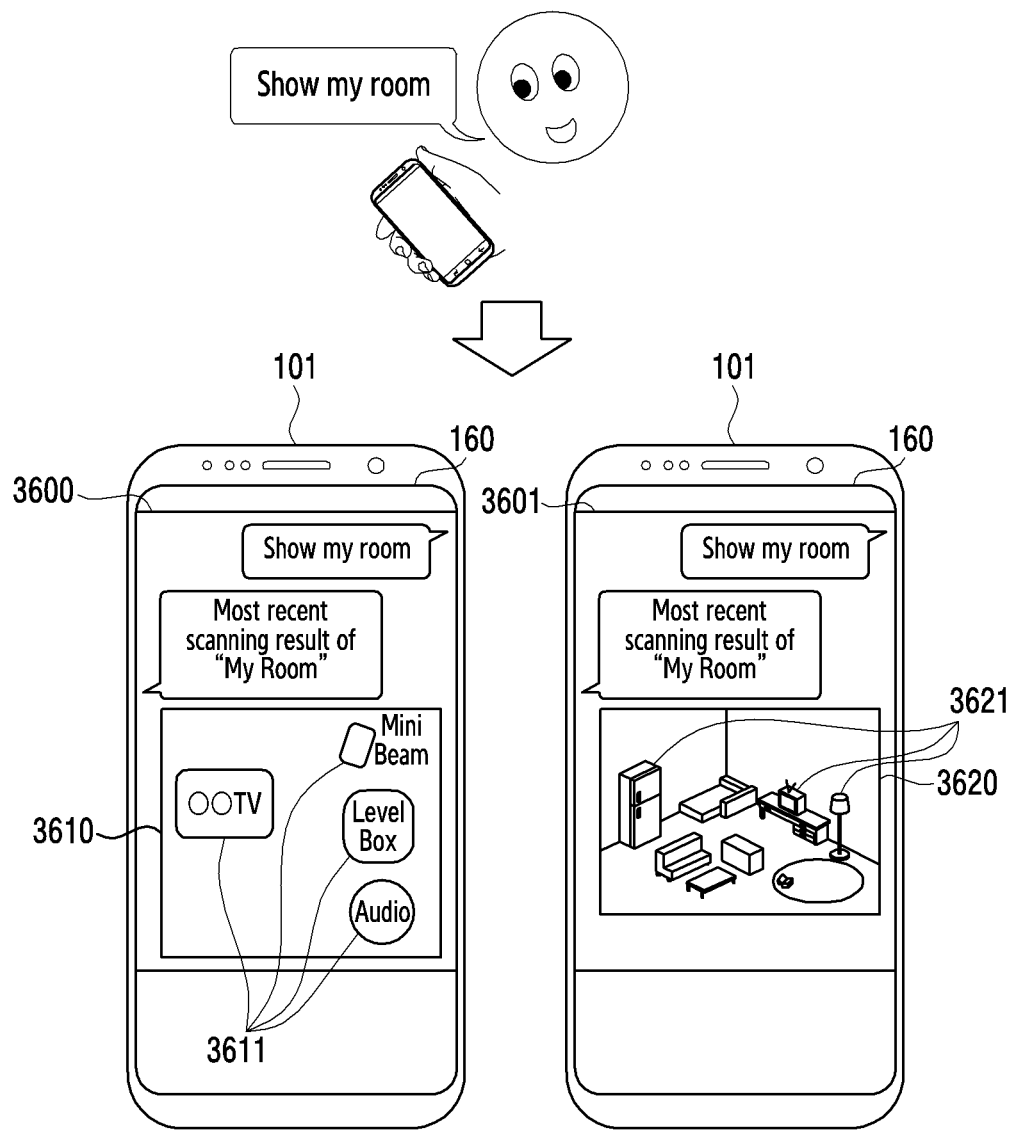
FIG. 36 illustrates an example of a method for, in an electronic device, displaying a screen related to a plurality of external electronic devices, according to various embodiments.

FIG. 36 illustrates an example of a method for, in an electronic device 101, displaying a screen related to a plurality of external electronic devices 210, according to various embodiments.

Referring to FIG. 36, an electronic device 101 (for example: a processor 120 of an electronic device 101) may receive, from the outside (for example: a user) of the electronic device 101, a voice input (for example: user utterance which is "show my room") for displaying a screen related to a plurality of external electronic devices 210. Based on reception of the voice input, an electronic device 101 may display a screen 3600 or a screen 3601. For example, an electronic device 101 may identify a designated word or phrase (for example: "my room") from user utterance which is "show my room". In a screen 3600 or a screen 3601, an electronic device 101 may display, on a display device 160, an image 3610 or an image 3620 stored with a name corresponding to an identified word or phrase. For example, based on a voice input for displaying a screen related to a plurality of external electronic devices 210, an electronic device 101 may display an image 3610 indicated in plane or may display an image 3620 indicated three-dimensionally. According to various embodiments, an electronic device 101 may be a device without display (for example: an artificial intelligence speaker). An electronic device 101 may receive, from the outside (for example: a user), a voice input (for example: user utterance which is "show my room") for displaying a screen related to a plurality of external electronic devices 210. An electronic device 101 may confirm, among a plurality of external electronic devices 210, an external electronic device which includes display and allows an input. An electronic device 101 may transmit information on an image 3610 or an image 3620 to the confirmed external electronic device. An electronic device 101 may perform control to display an image 3610 or an image 3620 on a confirmed external electronic device. An electronic device 101 may provide notification for notifying that a screen is displayed on a confirmed external electronic device. For example, in case that a screen is output through a TV, an electronic device 101 may output voice such as "the room is displayed on the TV". For another example, an electronic device 101 may control a screen of a TV to blink.

Figure 37:
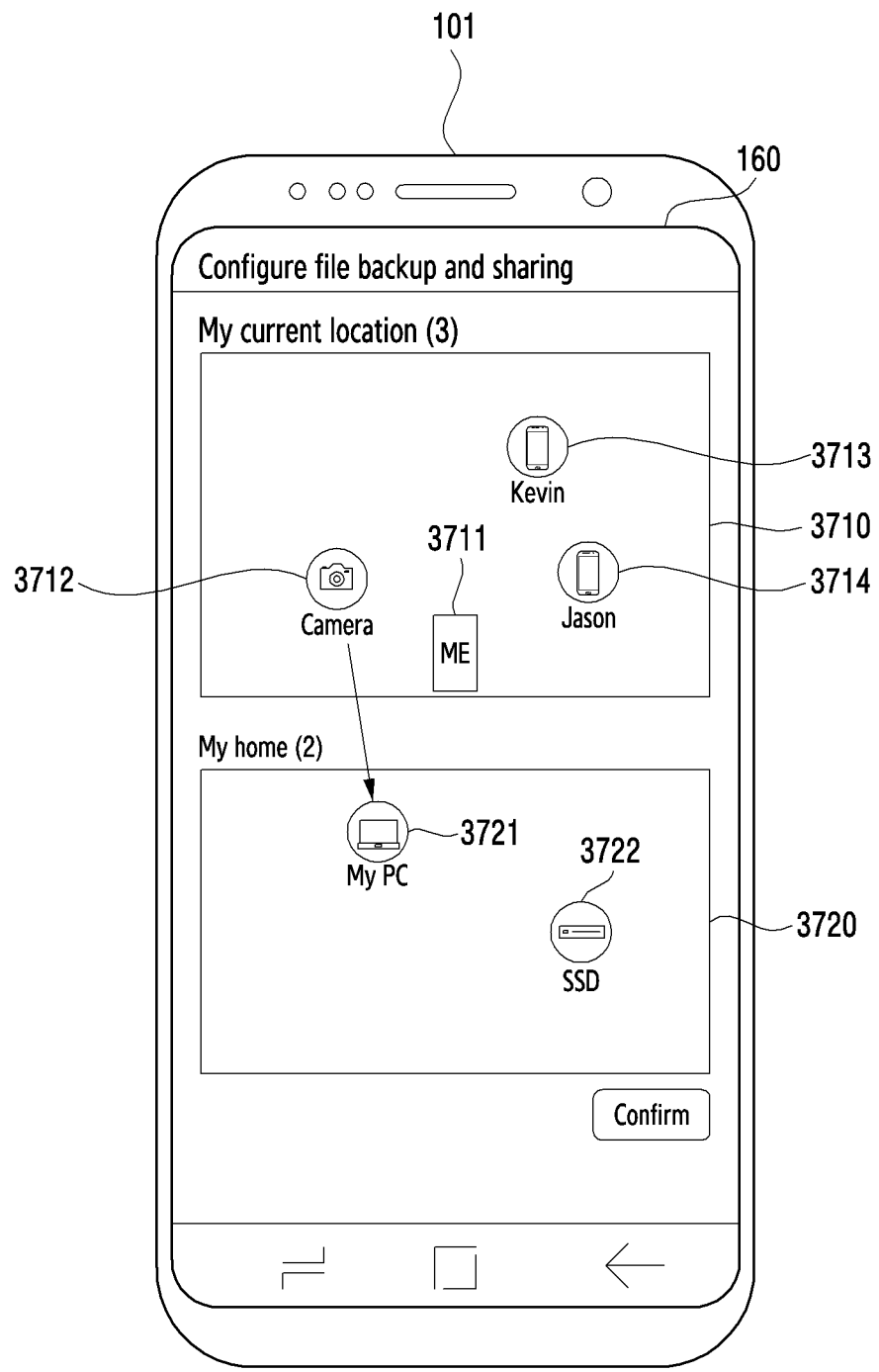
FIG. 37 illustrates an example of a method for, in an electronic device, controlling a plurality of external electronic devices through a server, according to various embodiments.

FIG. 37 illustrates an example of a method for, in an electronic device 101, controlling a plurality of external electronic devices 210 through a server 108, according to various embodiments.

Referring to FIG. 37, an electronic device 101 (for example: a processor 120 of an electronic device 101) may receive an input for configuring driving modes of a plurality of external electronic devices 210 to file backup and sharing modes. For example, file backup and sharing may indicate an operation of storing, in a server 108 or a second electronic device 212, a file stored in an electronic device 101 or a first external electronic device 211. According to various embodiments, based on a location relation of a plurality of external electronic devices 210, an electronic device 101 (for example: a processor 120 of an electronic device 101) may display, on a display device 160, an image (for example: an image 3710 or an image 3720) indicating a surrounding environment including the plurality of external electronic devices 210. The image (for example: the image 3710 or the image 3720) may include objects (for example: an object 3712, an object 3713, an object 3714, an object 3721, and an object 3722) indicating a plurality of external electronic devices 210 or an object (for example: an object 3711) indicating an electronic device 101. In various embodiments, an electronic device 101 may display, on a display device 160 of the electronic device 101, an image 3710 indicating external electronic devices (for example: a first external electronic device 211 and a second external electronic device 212) around the electronic device 101. An electronic device 101 may display, together with an image 3710, an image 3720 with a displayed object indicating other electronic devices (for example: a first external electronic device 211 and a second external electronic device 212) in a different space from the space of the electronic device 101. An electronic device 101 may receive inputs to an object indicating an external electronic device in an image 3710 and an object 3721 indicating another electronic device in an image 3720. An input may include a tap or drag input. According to an embodiment, an electronic device 101 may determine a direction of file transmission according to a sequence of a tap or a direction of a drag. For example, an object 3712 may indicate a camera. An object 3721 may indicate a PC in a different space from the space of an electronic device 101. An electronic device 101 may receive, via a drag input, an input for selecting an object 3712 indicating a camera and an object 3721 indicating a PC. A drag input may be an input connecting an object 3712 to an object 3721.

In various embodiments, an electronic device 101 may transmit a signal for transmitting, to a second external electronic device 212 (for example: a PC) in a different space from the space of the electronic device 101, a file stored in a first external electronic device 211 (for example: a camera) to the first external electronic device 211. An electronic device 101 may confirm whether or not a second external electronic device 212 may receive a file. In case that a second external electronic device 212 may receive a file, an electronic device 101 may control a file stored in a first external electronic device 211 to transmit the file to the second external electronic device 212 via a communication protocol (for example: wireless Internet) connected to an external network. In case that a second external electronic device 212 may not receive a file, an electronic device 101 may control a file stored in a first external electronic device 211 to transmit the filed to a server 108. A server 108 may receive a file from a first external electronic device 211. A server 108 may confirm whether or not a second external electronic device 212 may receive a file at certain time intervals. In case that a second external electronic device 212 may receive a file, a server 108 may transmit a file received from a first external electronic device 211 to a second external electronic device 212. A second external electronic device 212 may receive the file from a server 108.

Figure 38:
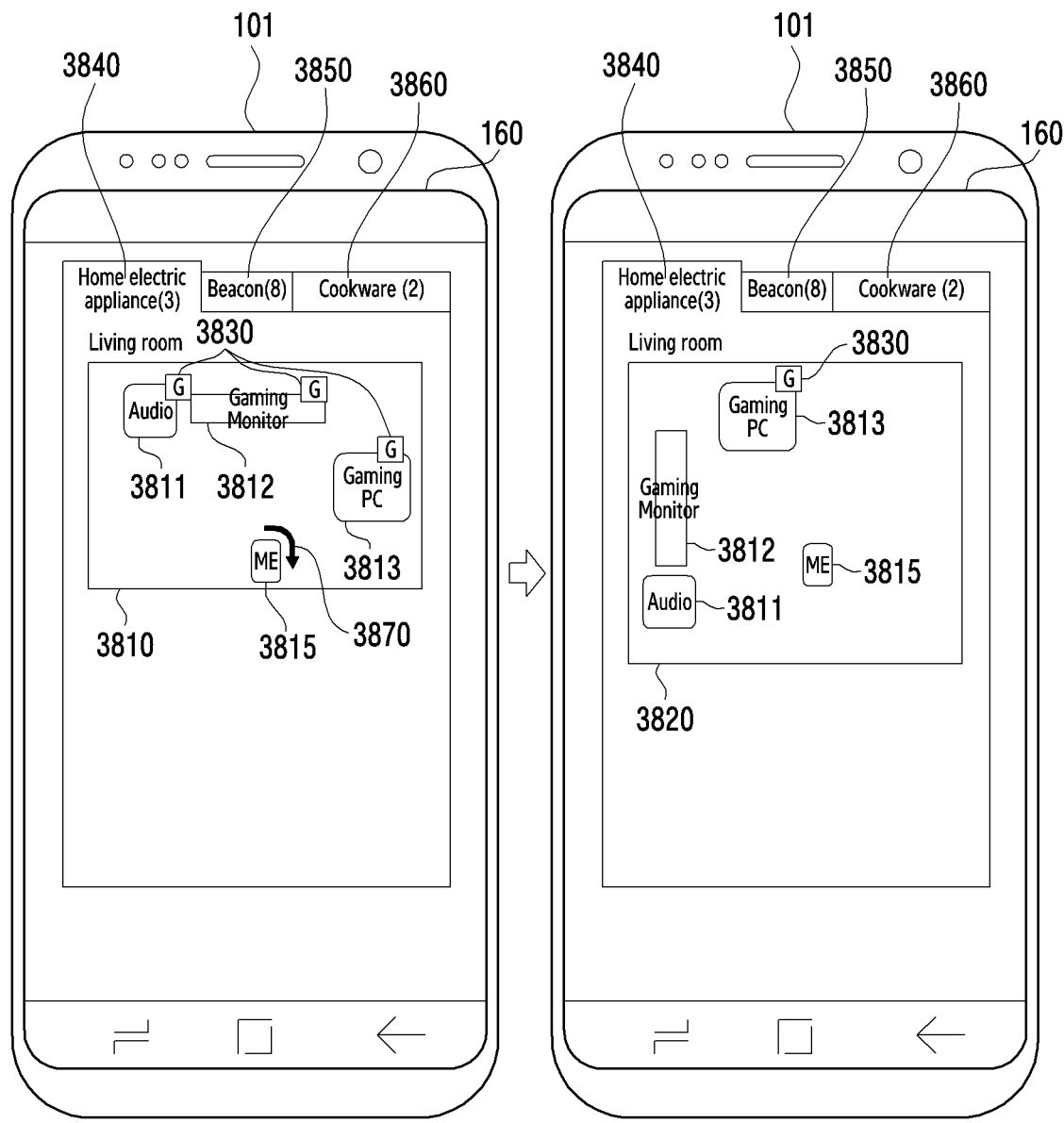
FIG. 38 illustrates an example of a screen for, in an electronic device, displaying objects indicating a plurality of external electronic devices connected in an ultrahigh frequency band, according to various embodiments.

FIG. 38 illustrates an example of a screen for, in an electronic device 101, displaying objects indicating a plurality of external electronic devices 210 connected in an ultrahigh frequency band, according to various embodiments.

Referring to FIG. 38, based on a location relation of a plurality of external electronic devices 210, an electronic device 101 (for example: a processor 120 of an electronic device 101) may display, on a display device 160, an image (for example: an image 3810 or an image 3820) indicating objects (for example: an object 3811, an object 3812, and an object 3813) indicating the plurality of external electronic devices 210 and an object (for example: an object 3815) indicating an electronic device 101. An electronic device 101 may additionally display a tab (for example: a tab 3840, a tab 3850, or a tab 3860) according to the type of a plurality of external electronic devices 210. An electronic device 101 may additionally display, on each of tabs, the number of objects indicating external electronic devices (for example: a first external electronic device 211 and a second external electronic device 212) included in an image according to each of the tabs.

In various embodiments, an electronic device 101 may establish connection to at least a part of a plurality of external electronic devices 210 in an ultrahigh frequency band (for example: a 60 Ghz communication band). On an object indicating a part of a plurality of external electronic devices 210 connected in an ultrahigh frequency band, an electronic device 101 may display, through a separate object (for example: an object 3830), whether or not a line of sight (LoS) is secured. For example, an electronic device 101 may display, through a separate object 3830, external electronic devices capable of providing high communication quality through communication in an ultrahigh frequency band by securing a line of sight. In case that an electronic device 101 rotates or moves, the electronic device 101 may detect, through an acceleration sensor, a gyro sensor, or an illuminance sensor, that a direction which a first point of the electronic device 101 faces has been changed. In case that a direction which a first point of an electronic device 101 faces is changed, the electronic device 101 may transmit a line-of-sight confirmation request signal to external electronic devices communicable in an ultrahigh frequency band. An electronic device 101 may receive a line-of-sight acknowledgment signal in response to a line-of-sight confirmation request signal from external electronic devices communicable in an ultrahigh frequency band.

According to an embodiment, an electronic device 101 may rotate 90 degrees to the right identically in the direction of an arrow 3870. An electronic device 101 may detect, through an acceleration sensor, a gyro sensor, and an illuminance sensor, that a direction which a first point of the electronic device 101 faces has been changed, and may transmit a line-of-sight confirmation request signal to external electronic devices communicable in an ultrahigh frequency band. External electronic devices communicable in an ultrahigh frequency band may transmit a line-of-sight acknowledgment signal in response to a line-of-sight confirmation request signal. An electronic device 101 may receive a line-of-sight acknowledgment signal from external electronic devices communicable in an ultrahigh frequency band. An electronic device 101 may display an image 3820 changed from an image 3810, based on the line-of-sight acknowledgment signal and a change range of a direction which a first point of the electronic device 101 faces according to the movement. An image 3820 may include an object 3830 indicating an external electronic device with a secured line of sight, together with objects (an object 3811, an object 3812, and an object 3813) indicating a plurality of external electronic devices 210, based on a line-of-sight acknowledgment signal. According to an embodiment, on the upper right side of an object (for example, an object 3813) indicating an external electronic device in which a changed line of sight is secured, an electronic device 101 may display an object 3830 indicating whether or not a line of sight is secured. According to an embodiment, an object 3830 may include a text, an emoji, or a speech bubble.

Figure 39:
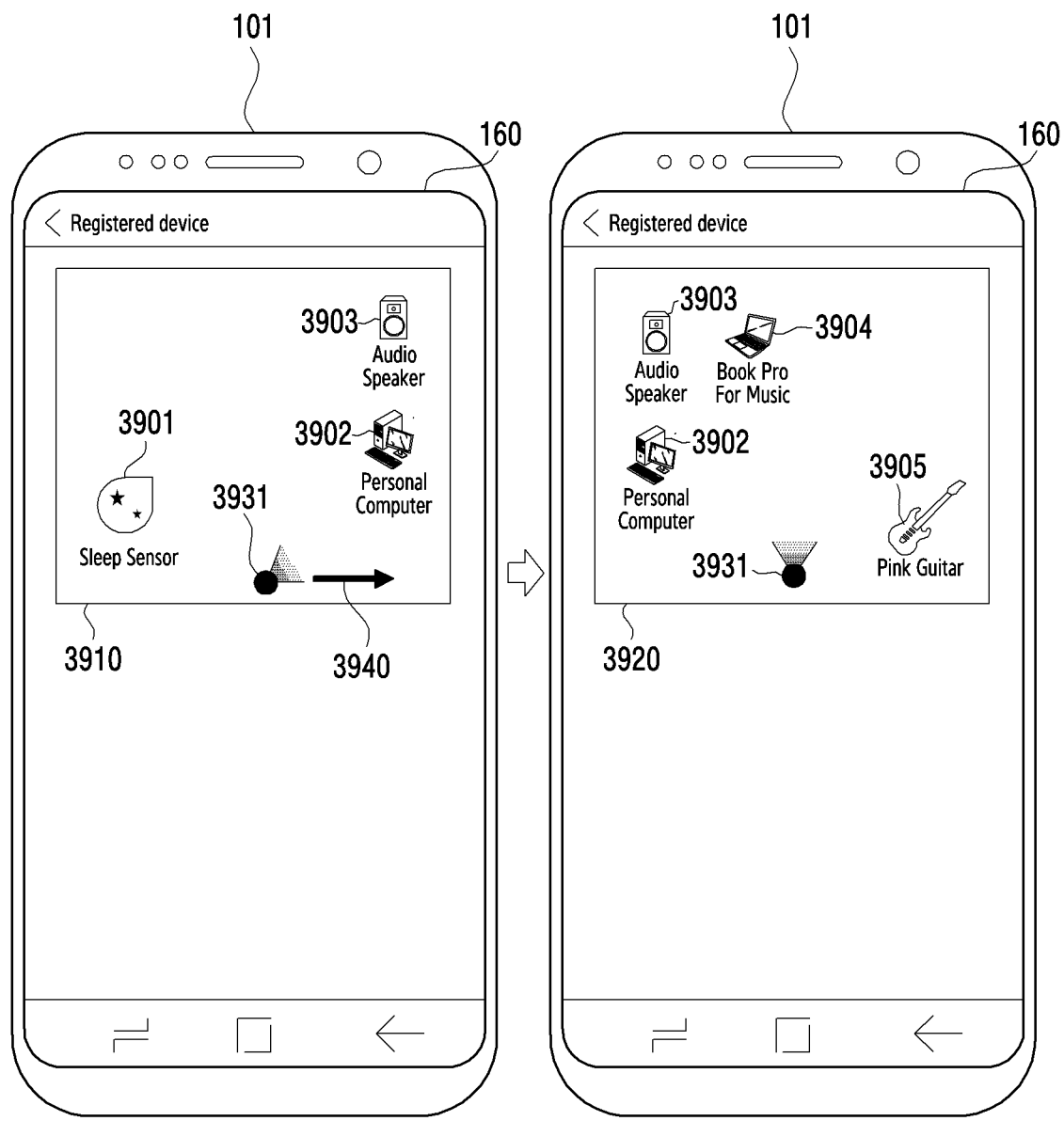
FIG. 39 illustrates an example of a screen for, in an electronic device, displaying objects indicating a plurality of external electronic devices, according to various embodiments.

FIG. 39 illustrates an example of a screen for, in an electronic device 101, displaying objects indicating a plurality of external electronic devices 210, according to various embodiments.

Referring to FIG. 39, an electronic device 101 (for example: a processor 120 of an electronic device 101) may display, on a display device 160, a screen (for example: a screen 3910 or a screen 3920) including a plurality of objects (for example: an object 3901, an object 3902, an object 3903, an object 3904, and an object 3905) indicating a location relation of a plurality of external electronic devices 210 with reference to a direction which a first point of the current electronic device 101 faces, and an object (for example: an object 3931) indicating the electronic device 101. In case that the movement of an electronic device 101 is sensed through an acceleration sensor, a gyro sensor, or a pedometer sensor, the electronic device 101 may reflect only the movement detected by the electronic device 101 to a screen (for example: a screen 3910 or a screen 3920) without changing locations of a plurality of objects indicating a location relation of a plurality of external electronic devices 210. For example, in case that a direction which a first point of an electronic device 101 faces is rotated 90 degrees to the right, an electronic device 101 may display an object 3931 after rotating the object by 90 degrees on a screen 3910. According to various embodiments, through an acceleration sensor, a gyro sensor, or a pedometer sensor, an electronic device 101 may confirm that a location of the electronic device 101 is changed as much as a reference distance or more or the rotation radius of the electronic device 101 becomes larger than a current display range. According to an embodiment, an electronic device 101 may move in the direction of an arrow 3940. In case that an electronic device 101 moves in the direction of an arrow 3940 and it is detected that a location of the electronic device 101 is out of a display range of a current screen 3910, the electronic device 101 may request, to an access point 202, information on a location relation of a plurality of external electronic devices 210. An electronic device 101 may receive information on a location relation of a plurality of external electronic devices 210 from an access point 202. An electronic device 101 may confirm at least one external electronic device located in an area corresponding to a direction which a first point of the electronic device 101 faces. Based on newly received information on a location relation of a plurality of external electronic devices 210 and at least one newly confirmed external electronic device located in an area corresponding to a direction which a first point of an electronic device 101 faces, the electronic device 101 may display, on a display device 160, a screen (for example: a screen 3920) including objects (for example: an object 3902, an object 3903, an object 3904, and an object 3905) indicating the plurality of external electronic devices 210. According to an embodiment, an electronic device 101 may confirm information on a location relation of a plurality of external electronic devices 210 via repeated performance according to certain time intervals immediately after it has been sensed that the electronic device 101 has been out of a screen radius displayed on the electronic device 101. An electronic device 101 may display a changed screen, based on the confirmed information on the location relation of the plurality of external electronic devices 210. According to an embodiment, in case that a location of an electronic device 101 is continuously changed, the electronic device 101 may display a screen changed in real time on a display device 160, based on a changed location. For example, in case that an electronic device 101 moves, an electronic device 101 may display a screen changed in real time on a display device 160, based on a changed location of the electronic device 101.

Figure 40:
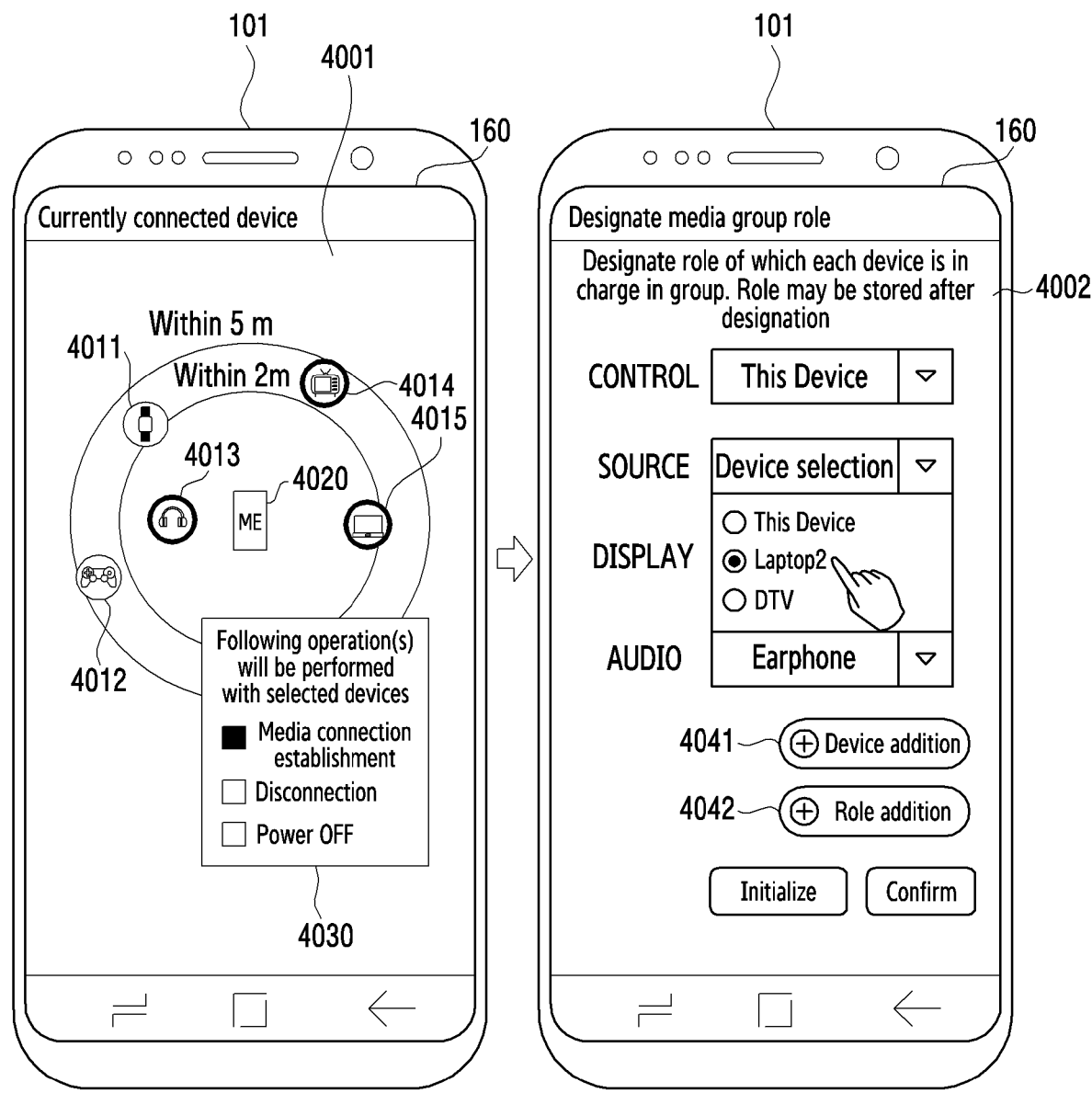
FIG. 40 illustrates an example of a screen for, in an electronic device, designating a driving mode of a selected external electronic device, according to various embodiments.

FIG. 40 illustrates an example of a screen for, in an electronic device 101, designating a driving mode of a selected external electronic device, according to various embodiments.

An electronic device 101 may display, on a display device 160, an interface (for example: an interface 4001) for controlling a plurality of external electronic devices 210, based on a location relation of the plurality of external electronic devices 210. The interface may include objects (for example: an object 4011, an object 4012, an object 4013, an object 4014, and an object 4015) indicating a plurality of external electronic devices 210 and an object (for example: an object 4020) indicating an electronic device 101. An electronic device 101 may receive an input to a part of objects indicating a plurality of external electronic devices 210. For example, an electronic device 101 may receive an input to an object 4013, an object 4014, or an object 4015. According to various embodiments, an electronic device 101 may display a layer (for example: a layer 4030) for configuring driving modes of external electronic devices corresponding to objects indicating a plurality of selected external electronic devices 210. An electronic device 101 may receive an input for selecting driving modes of external electronic devices corresponding to objects 4013, 4014, and 4015 indicating a plurality of selected external electronic devices 210. For example, an electronic device 101 may receive an input for selecting, as a media connection mode, driving modes of external electronic devices corresponding to objects 4013, 4014, and 4015 indicating a plurality of selected external electronic devices 210. According to an embodiment, an electronic device 101 may display an interface 4002 for media connection on a display device 160. An interface 4002 may include a dropdown list from which a control device may be selected, a dropdown list from which a source device may be selected, a dropdown list from which a screen display device may be selected, or a dropdown list from which a sound output device may be selected. An electronic device 101 may compose a dropdown list, based on information on functions (capabilities) of a plurality of selected external electronic devices 210. For example, in case that objects indicating a TV, an earphone, and a laptop are selected, an electronic device 101 may confirm information on a function of each of the TV, the earphone, or the laptop. An electronic device 101 may display the electronic device 101 and a laptop on a dropdown list from which a control device may be selected. An electronic device 101 may display the electronic device 101 and a laptop on a dropdown list from which a source device may be selected. An electronic device 101 may display the electronic device 101, a laptop, and a TV on a dropdown list from which a screen display device may be selected. An electronic device 101 may display the electronic device 101, a TV, a laptop, and an earphone on a dropdown list from which a sound output device may be selected.

According to an embodiment, an electronic device 101 may receive an input for configuring a driving mode of each of external electronic devices selected via the dropdown lists. An electronic device 101 may preconfigure and display a driving mode of an external electronic device which operates only in one driving mode among selected external electronic devices. For example, in case that an object 4013 indicating an earphone is selected, an electronic device 101 may configure and display an earphone as a sound output device on a dropdown list from which a sound output device may be selected. Even in case that an earphone is configured and displayed as a sound output device, an electronic device 101 may change a sound output device to another external electronic device (for example, a TV), based on a user input. According to an embodiment, an electronic device 101 may further display an object (for example: an object 4041) for adding, to an interface (for example: an interface 4002), an external electronic device which is not selected. According to an embodiment, an electronic device 101 may further display an object (for example: an object 4042) for adding, to an interface (for example: an interface 4002), a driving mode.

A method of an electronic device (for example: an electronic device 101) according to various embodiments as described above may include: receiving first information on a first external electronic device (for example: a first external electronic device 211 or a second external electronic device 212) and a second external electronic device (for example: a first external electronic device 211 or a second external electronic device 212) through at least one wireless communication circuit (for example: a wireless communication module 192 or a communication module 190) of the electronic device; determining, at least partly based on a signal acquired through the at least one wireless communication circuit and/or second information received through the at least one wireless communication circuit, a location and/or a direction of the first external electronic device and a location and/or a direction of the second external electronic device; providing, at least partly based on the determined location and/or the determined direction, a touch screen display with a graphical user interface (GUI) indicating the first external electronic device and the second external electronic device; receiving, through the touch screen display (for example: a display device 160) of the electronic device, a gesture input for selection of the first external electronic device and the second external electronic device; and transmitting, through the at least one wireless communication circuit, third information related to an operation of using the first external electronic device and the second external electronic device.

In various embodiments, the method may further include receiving the first information from at least one among the first external electronic device (for example: the first external electronic device 211 or the second external electronic device 212), the second external electronic device (for example: the first external electronic device 211 or the second external electronic device 212), an external server (for example: a server 108), or an access point (for example: an access point 202) which wirelessly communicates with the electronic device (for example: the electronic device 101).

In various embodiments, the method may further include receiving the second information from the access point (for example: the access point 202).

In various embodiments, the third information may include an ID of the first external electronic device (for example: the first external electronic device 211 or the second external electronic device 212), an ID of the second external electronic device (for example: the first external electronic device 211 or the second external electronic device 212), and information on the operation.

In various embodiments, the third information may include an IP address.

In various embodiments, the operation may include at least one among mirroring, streaming, or sharing.

In various embodiments, the first information may include functions (capabilities) of the first external electronic device (for example: the first external electronic device 211 or the second external electronic device 212) and the second external electronic device (for example: the first external electronic device 211 or the second external electronic device 212).

In various embodiments, the method may include storing the first information in a profile form.

In various embodiments, the first information may include account information of the first external electronic device (for example: the first external electronic device 211 or the second external electronic device 212) and the second external electronic device (for example: the first external electronic device 211 or the second external electronic device 212).

In various embodiments, the method may further include receiving the third information from an external server (for example: a server 108).

A method of an electronic device (for example: an electronic device 101) according to various embodiments may include: receiving, from another electronic device (for example: another electronic device 102), first data for indicating a location relation between each of a plurality of external electronic devices (for example: a plurality of external electronic devices 110) related to the other electronic device and the other electronic device; acquiring, at least based on the first data, second data for indicating a location relation of the electronic device and each of the plurality of external electronic devices; displaying, within a user interface of an application for connecting at least one external electronic device (for example: a first external electronic device 111 or a second external electronic device 112) among the plurality of external electronic devices and the electronic device, a plurality of objects indicating the plurality of external electronic devices and arranged based on the second data; detecting an input for at least one object among the plurality of objects; and transmitting, to at least one external electronic device indicated by the at least one object among the plurality of external electronic devices, a signal for connection.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
   at least one wireless communication circuit;
   a touch screen display;
   a processor operatively connected to the at least one wireless communication circuit and the touch screen display; and
   a memory operatively connected to the processor,
   wherein the memory stores instructions that, when executed, cause the processor to:
   receive first information on a first external electronic device and a second external electronic device through the at least one wireless communication circuit;
   determine, at least partly based on a signal acquired through the at least one wireless communication circuit and/or second information received through the at least one wireless communication circuit, a location and/or a direction of the first external electronic device and a location and/or a direction of the second external electronic device;
   provide, at least partly based on the determined location and/or the determined direction, the touch screen display with a graphical user interface (GUI) indicating the first external electronic device and the second external electronic device;
   receive, through the touch screen display, a gesture input for selection of the first external electronic device and the second external electronic device; and
   transmit, through the wireless communication circuit, third information related to an operation of using the first external electronic device and the second external electronic device.

2. The electronic device of claim 1, wherein the instructions cause the processor to receive the first information from at least one among the first external electronic device, the second external electronic device, an external server, or an access point which wirelessly communicates with the electronic device.

3. The electronic device of claim 2, wherein the instructions cause the processor to receive the second information from the access point.

4. The electronic device of claim 3, wherein the third information comprises an ID of the first external electronic device, an ID of the second external electronic device, and information on the operation.

5. The electronic device of claim 4, wherein the third information comprises an IP address.

6. The electronic device of claim 1, wherein the operation comprises at least one among mirroring, streaming, or sharing.

7. The electronic device of claim 1, wherein the first information comprises functions (capabilities) of the first external electronic device and the second external electronic device.

8. The electronic device of claim 1, wherein the instructions cause the processor to store the first information in a profile form.

9. An electronic device comprising:
   a display;
   a communication module; and
   a processor functionally connected to the display and the communication module,
   wherein the processor is configured to:
   receive, from an access point, first data for indicating a location relation between each of a plurality of external electronic devices related to the access point and the access point;
   acquire, at least based on the first data, second data for indicating a location relation of the electronic device and each of the plurality of external electronic devices;
   display, within a user interface of an application for connecting at least one external electronic device among the plurality of external electronic devices and the electronic device, a plurality of objects indicating the plurality of external electronic devices and arranged based on the second data;
   detect an input for at least one object among the plurality of objects; and
   transmit, to at least one external electronic device indicated by the at least one object among the plurality of external electronic devices, a signal for connection.

10. The electronic device of claim 9, wherein the first data comprises data about distances between the access point and each of the plurality of external electronic devices, and
    wherein the processor is configured to:
    identify, based on a signal received from each of the plurality of external electronic devices, third data about distances between each of the plurality of external electronic devices and the electronic device; and
    acquire, at least based on the first data and the third data, the second data.

11. A method of an electronic device, the method comprising:
    receiving first information on a first external electronic device and a second external electronic device through at least one wireless communication circuit of the electronic device;
    determining, at least partly based on a signal acquired through the at least one wireless communication circuit and/or second information received through the at least one wireless communication circuit, a location and/or a direction of the first external electronic device and a location and/or a direction of the second external electronic device;

providing, at least partly based on the determined location and/or the determined direction, a touch screen display with a graphical user interface (GUI) indicating the first external electronic device and the second external electronic device;

receiving, through the touch screen display, a gesture input for selection of the first external electronic device and the second external electronic device; and transmitting, through the at least one wireless communication circuit, third information related to an operation of using the first external electronic device and the second external electronic device.

12. The method of claim 11, further comprising receiving the first information from at least one among the first external electronic device, the second external electronic device, an external server, or an access point which wirelessly communicates with the electronic device.

13. The method of claim 12, further comprising receiving the second information from the access point.

14. The method of claim 13, wherein the third information comprises an ID of the first external electronic device, an ID of the second external electronic device, and information on the operation.

15. The method of claim 11, wherein the first information comprises functions (capabilities) of the first external electronic device and the second external electronic device.

* * * * *